United States Patent
Ishikawa

(10) Patent No.: US 7,200,272 B2
(45) Date of Patent: Apr. 3, 2007

(54) IMAGE PROCESSING METHOD STORING INPUT ENCODED DATA INTO A MEMORY

(75) Inventor: Tomoe Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 10/353,026

(22) Filed: Jan. 29, 2003

(65) Prior Publication Data
US 2003/0142871 A1   Jul. 31, 2003

(30) Foreign Application Priority Data

| Jan. 31, 2002 | (JP) | ............................. 2002-023951 |
| Oct. 18, 2002 | (JP) | ............................. 2002-304496 |
| Oct. 25, 2002 | (JP) | ............................. 2002-311764 |
| Oct. 30, 2002 | (JP) | ............................. 2002-316403 |

(51) Int. Cl.
  G06K 9/36   (2006.01)
  G06K 9/46   (2006.01)
(52) U.S. Cl. ...................................... 382/233; 382/239
(58) Field of Classification Search ................. 382/233
  See application file for complete search history.

(56) References Cited

U.S. PATENT DOCUMENTS

| 5,991,515 A * | 11/1999 | Fall et al. .................. 358/1.15 |
| 6,163,626 A * | 12/2000 | Andrew ....................... 382/240 |
| 6,792,153 B1 * | 9/2004 | Tsujii ......................... 382/239 |
| 6,879,726 B2 | 4/2005 | Sato et al. .................. 382/239 |
| 6,885,395 B1 * | 4/2005 | Rabbani et al. .......... 348/231.1 |
| 6,968,086 B1 * | 11/2005 | Fukuhara et al. ........... 382/233 |
| 6,973,217 B2 * | 12/2005 | Boliek et al. ............... 382/251 |
| 2003/0067627 A1 * | 4/2003 | Ishikawa et al. .......... 358/1.15 |

* cited by examiner

Primary Examiner—Jingge Wu
Assistant Examiner—Yuzhen Ge
(74) Attorney, Agent, or Firm—Fitzpatrick, Cella, Harper & Scinto

(57) ABSTRACT

In an image processing method and apparatus for decoding and displaying input encoded data, the upper limit value of the data size to be stored in a memory that stores fragmented encoded data which form image data is set. It is checked based on the data size already stored in that memory, the upper limit value, and the data size of the input encoded data, if that input encoded data can be stored in the memory. If it is determined that the input encoded data cannot be stored in the memory, a region to be deleted in the image data of the data stored in the memory is determined. Data included in the determined region to be deleted is deleted for each fragmented data as a unit. If it is determined that the input encoded data can be stored in the memory, or after the data is deleted, the input encoded data is stored in the memory.

8 Claims, 44 Drawing Sheets

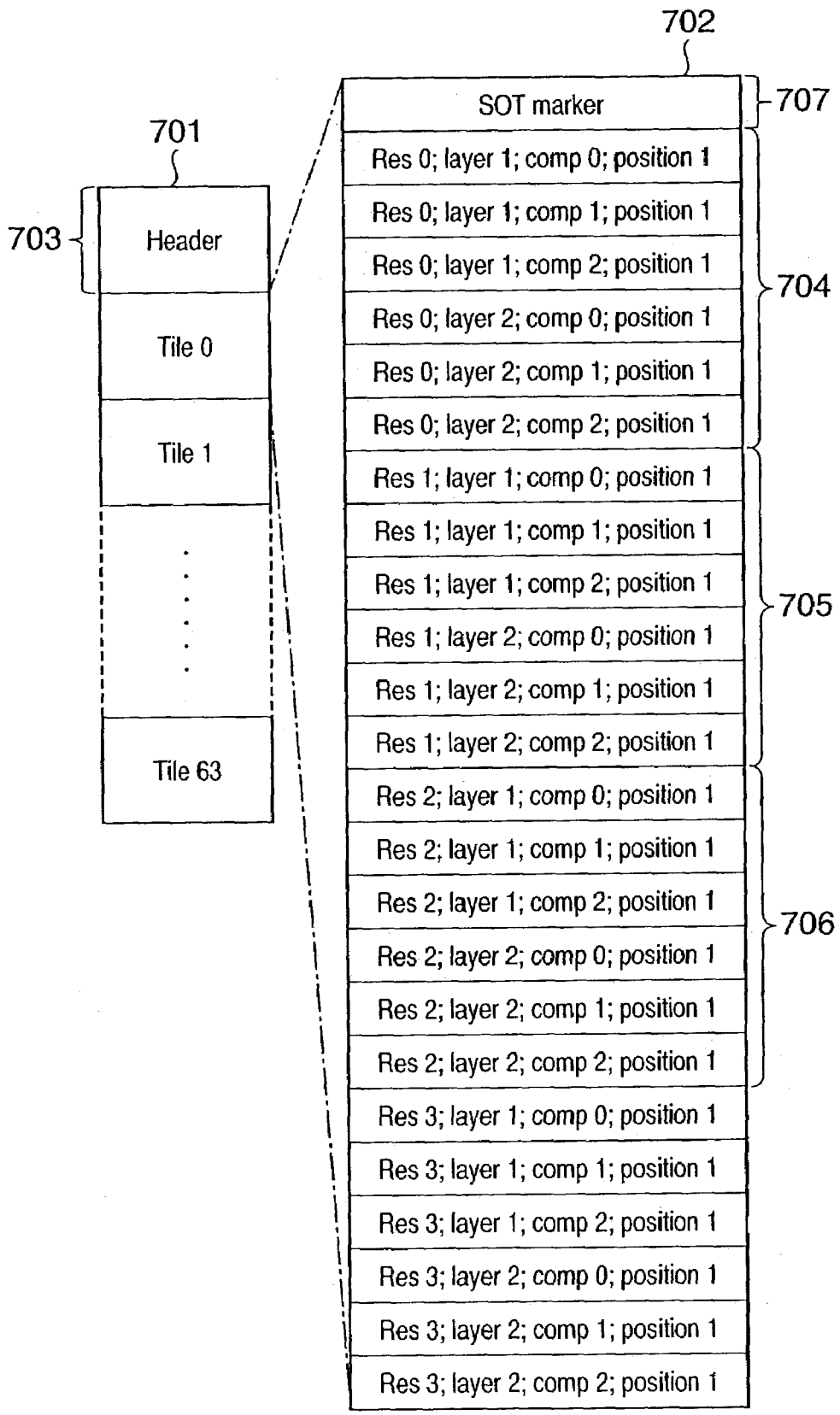

| Resolution level 0, Layer 1 | 5 [kbyte] |
| --- | --- |
| Resolution level 0, Layer 2 | 5 [kbyte] |
| Resolution level 1, Layer 1 | 10 [kbyte] |
| Resolution level 1, Layer 2 | 10 [kbyte] |
| Resolution level 2, Layer 1 | 15 [kbyte] |
| Resolution level 2, Layer 2 | 15 [kbyte] |

| DATA SIZE TO BE DELETED | 120 [kbyte] |
| --- | --- |

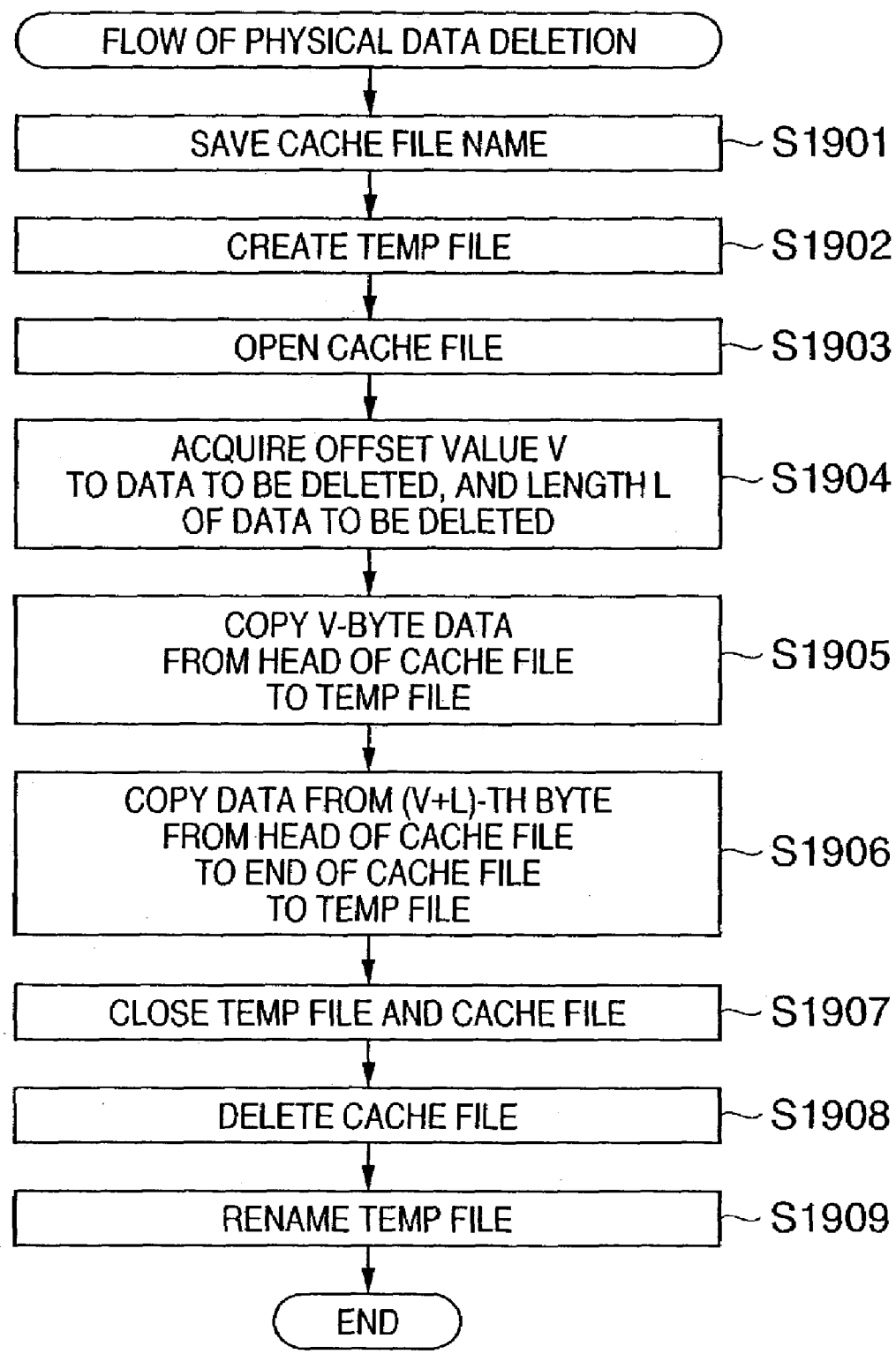

Resolution level 3

Resolution level 2

Resolution level 1

Resolution level 0

F I G. 26
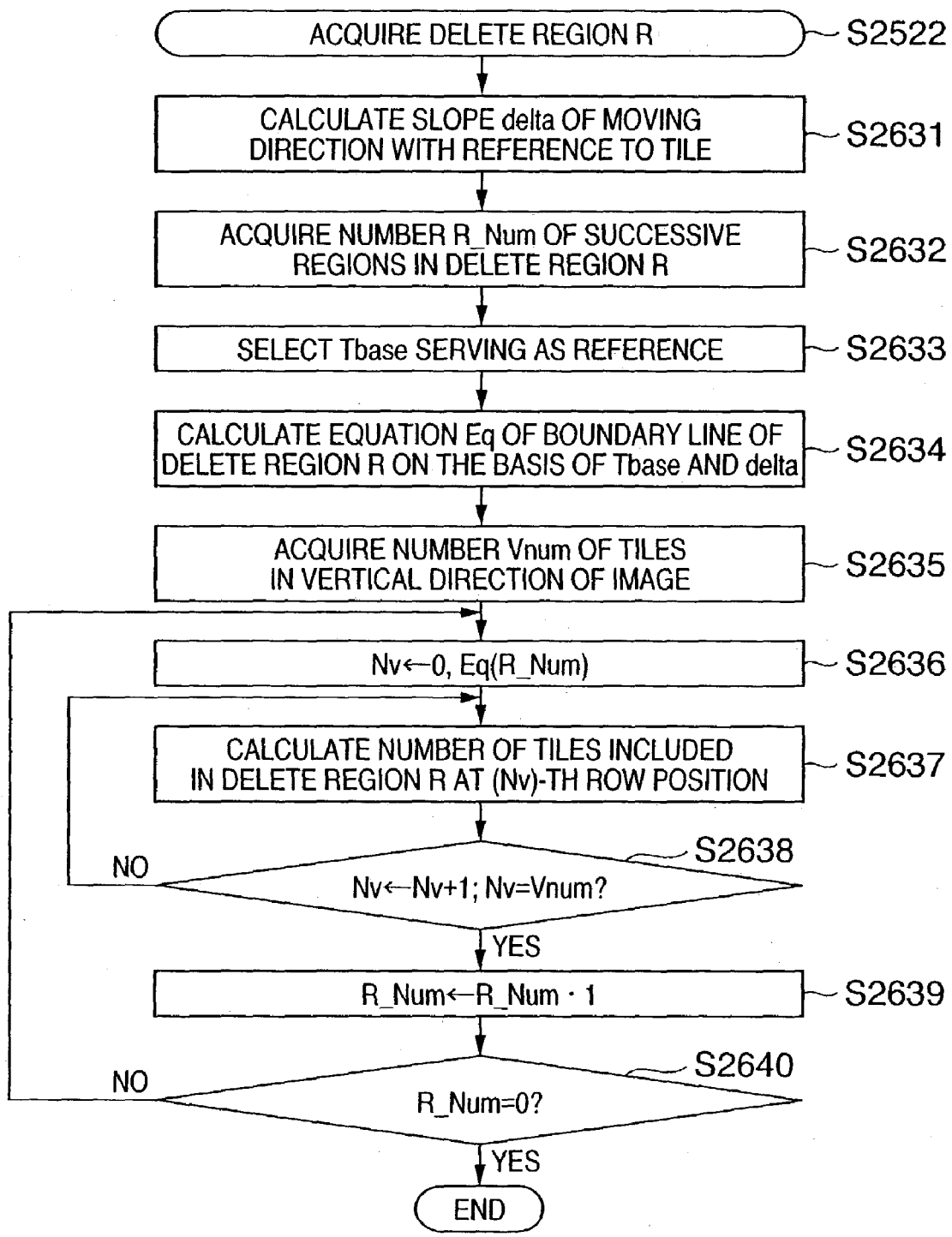

BEFORE DATA DELETION

DATA SIZES OF RESPECTIVE PACKETS

| Resolution level 0, Layer 1 | 10 [kbyte] |
| --- | --- |
| Resolution level 0, Layer 2 | 10 [kbyte] |
| Resolution level 1, Layer 1 | 20 [kbyte] |
| Resolution level 1, Layer 2 | 20 [kbyte] |

| DATA SIZE TO BE DELETED | 120 [kbyte] |
| --- | --- |

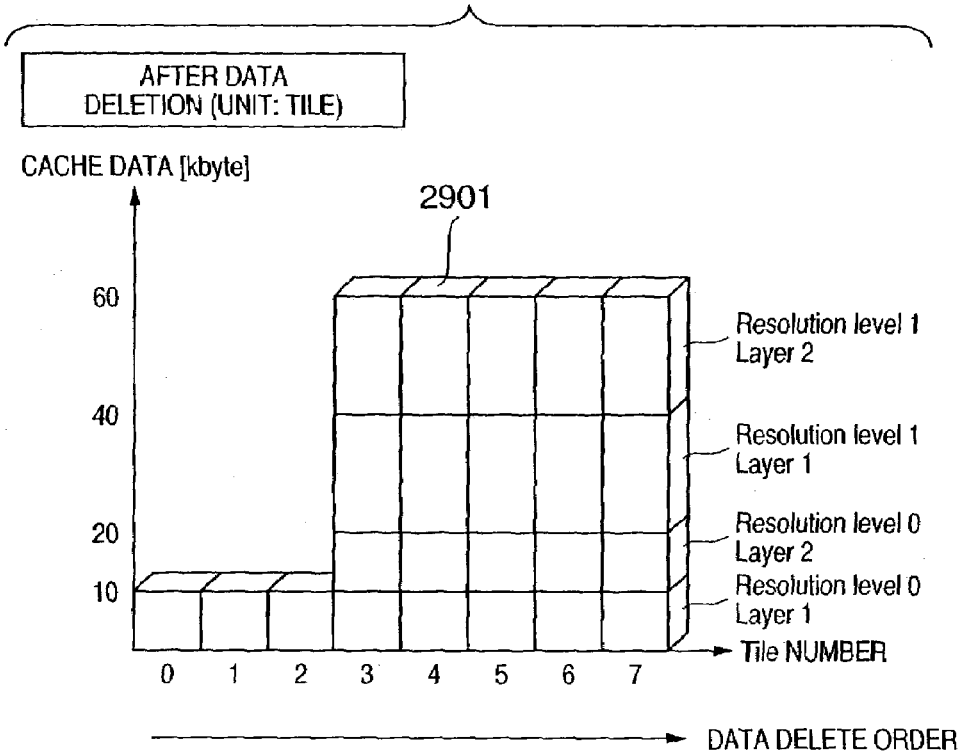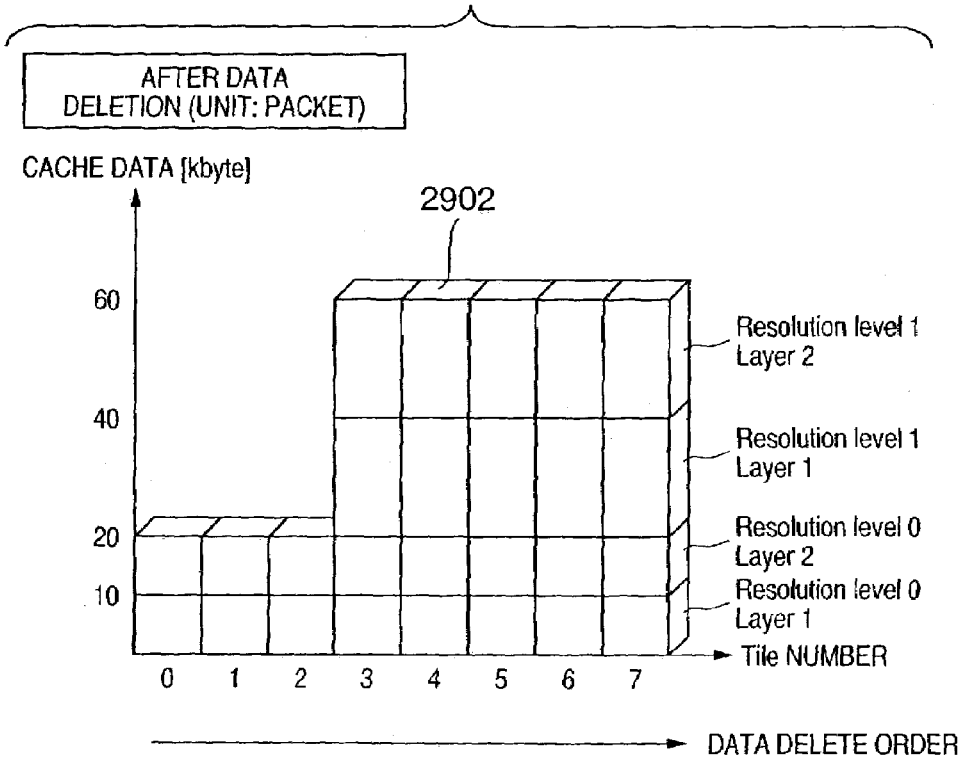

FIG. 34A

| CACHE OF Resolution 1 AND Layer 2 | 34001 |

| SOT marker | 707 |
| Res 0; layer 1; comp 0; position 1 | |
| Res 0; layer 1; comp 1; position 1 | 704 |
| Res 0; layer 1; comp 2; position 1 | |
| Res 0; layer 2; comp 0; position 1 | |
| Res 0; layer 2; comp 1; position 1 | 34003 |
| Res 0; layer 2; comp 2; position 1 | |
| Res 1; layer 1; comp 0; position 1 | |
| Res 1; layer 1; comp 1; position 1 | |
| Res 1; layer 1; comp 2; position 1 | 705 |
| Res 1; layer 2; comp 0; position 1 | |
| Res 1; layer 2; comp 1; position 1 | |
| Res 1; layer 2; comp 2; position 1 | |

34005

| Res 2; layer 1; comp 0; position 1 |
| Res 2; layer 1; comp 1; position 1 |
| Res 2; layer 1; comp 2; position 1 |
| Res 2; layer 2; comp 0; position 1 |
| Res 2; layer 2; comp 1; position 1 |
| Res 2; layer 2; comp 2; position 1 |

| Res 3; layer 1; comp 0; position 1 |
| Res 3; layer 1; comp 1; position 1 |
| Res 3; layer 1; comp 2; position 1 |
| Res 3; layer 2; comp 0; position 1 |
| Res 3; layer 2; comp 1; position 1 |
| Res 3; layer 2; comp 2; position 1 |

FIG. 34B

| CACHE OF Resolution 2 AND Layer 2 | 34002 |

| SOT marker | 707 |
| Res 0; layer 1; comp 0; position 1 | |
| Res 0; layer 1; comp 1; position 1 | 704 |
| Res 0; layer 1; comp 2; position 1 | |
| Res 0; layer 2; comp 0; position 1 | |
| Res 0; layer 2; comp 1; position 1 | |
| Res 0; layer 2; comp 2; position 1 | |
| Res 1; layer 1; comp 0; position 1 | 34004 |
| Res 1; layer 1; comp 1; position 1 | |
| Res 1; layer 1; comp 2; position 1 | 705 |
| Res 1; layer 2; comp 0; position 1 | |
| Res 1; layer 2; comp 1; position 1 | |
| Res 1; layer 2; comp 2; position 1 | |
| Res 2; layer 1; comp 0; position 1 | |
| Res 2; layer 1; comp 1; position 1 | |
| Res 2; layer 1; comp 2; position 1 | 706 |
| Res 2; layer 2; comp 0; position 1 | |
| Res 2; layer 2; comp 1; position 1 | 34006 |
| Res 2; layer 2; comp 2; position 1 | |

| Res 3; layer 1; comp 0; position 1 |
| Res 3; layer 1; comp 1; position 1 |
| Res 3; layer 1; comp 2; position 1 |
| Res 3; layer 2; comp 0; position 1 |
| Res 3; layer 2; comp 1; position 1 |
| Res 3; layer 2; comp 2; position 1 |

FIG. 38A

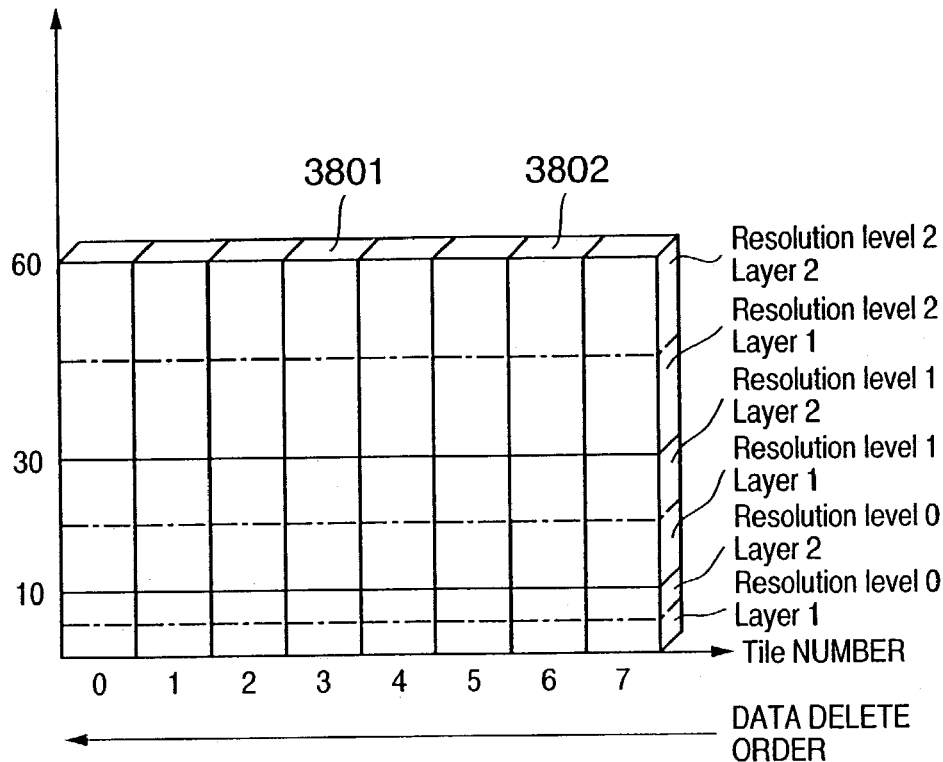

BEFORE DATA DELETION

CACHE DATA [kbyte]

3801  3802

Resolution level 2 Layer 2
Resolution level 2 Layer 1
Resolution level 1 Layer 2
Resolution level 1 Layer 1
Resolution level 0 Layer 2
Resolution level 0 Layer 1

Tile NUMBER

DATA DELETE ORDER

FIG. 38B

DATA SIZES OF RESPECTIVE PACKETS

| | |
|---|---|
| Resolution level 0, Layer 1 | 5 [kbyte] |
| Resolution level 0, Layer 2 | 5 [kbyte] |
| Resolution level 1, Layer 1 | 10 [kbyte] |
| Resolution level 1, Layer 2 | 10 [kbyte] |
| Resolution level 2, Layer 1 | 15 [kbyte] |
| Resolution level 2, Layer 2 | 15 [kbyte] |

| | |
|---|---|
| DATA SIZE TO BE DELETED | 120 [kbyte] |

FIG. 42A

FORMAT OF SIZ MARKER

| SIZ | Lsiz | Rsiz | Xsiz | Ysiz | XOsiz | YOsiz |

| XTsiz | YTsiz | XTOsiz | YTOsiz | Csiz |

Ssiz$^i$ YRsiz$^i$  Ssiz$^n$ YRsiz$^n$

XRsiz$^i$  XRsiz$^n$

FIG. 42B

| Parameter | Size(bits) | Value |
|---|---|---|
| SIZ | 16 | 0xFF51 |
| Lsiz | 16 | ... |
| Rsiz | 16 | ... |
| Xsiz | 32 | 2048 |
| Ysiz | 32 | 2048 |
| XOsiz | 32 | 0 |
| YOsiz | 32 | 0 |
| XTsiz | 32 | 256 |
| YTsiz | 32 | 256 |
| XTOsiz | 32 | 0 |
| YTOsiz | 32 | 0 |
| Csiz | 16 | 3 |
| Ssiz | 8 | ... |
| XRsiz$^i$ | 8 | ... |
| YRsiz$^i$ | 8 | ... |

1801 — Xsiz
1802 — Ysiz
1803 — XTsiz
1804 — YTsiz

FIG. 43A

ACCESS MANAGEMENT TABLE (INITIAL STATE) — 1901

| Tile No. | Last Access Time |
|---|---|
| 0 | NULL |
| 1 | NULL |
| 2 | NULL |
| ⋮ | ⋮ |
| 63 | NULL |

FIG. 43B

ACCESS MANAGEMENT TABLE (UPDATED 1) — 1902

| Tile No. | Last Access Time |
|---|---|
| 0 | 10:22:34 |
| 1 | 10:22:34 |
| 2 | 10:22:34 |
| ⋮ | ⋮ |
| 63 | 10:22:34 |

FIG. 43C

ACCESS MANAGEMENT TABLE (UPDATED 2) — 1903

| Tile No. | Last Access Time |
|---|---|
| 0 | 10:22:34 |
| 1 | 10:22:34 |
| ⋮ | ⋮ |
| 16 | 10:22:45 |
| ⋮ | ⋮ |
| 21 | 10:22:45 |
| ⋮ | ⋮ |
| 63 | 10:22:34 |

IMAGE PROCESSING METHOD STORING INPUT ENCODED DATA INTO A MEMORY

FIELD OF THE INVENTION

The present invention relates to a technique for decoding and displaying input encoded data and, more particularly, to an image processing method and apparatus, which receive and process JPEG2000 encoded data, which is in conformity with ISO/IEC-15444 and is segmented into tiles.

BACKGROUND OF THE INVENTION

On the Internet, users actively access WWW servers from Web browsers to browse document data, image data, and the like. This mechanism is implemented in such a manner that WWW servers used to disclose information on the Internet, and clients used to browse such information, are connected via the Internet, and each client can browse information disclosed by the servers. Each WWW server stores a document which is called a home page that describes information to be disclosed in HTML, and the Web browser on the client side accesses such home page to display it on the client computer. The Web browser on the client side can get required information by tracing links in displayed pages.

Furthermore, as a method of downloading files managed by the server, a File Transfer Protocol (to be abbreviated as FTP hereinafter) is known. This FTP is a mechanism for transferring a file on the server to a client server at a time via a network. As a protocol for fragmentarily accessing and displaying an image file, Flashpix/IIP is known. This IIP is a protocol optimal to the format "Flashpix" of an image data file, and partial access to image data is made for respective tiles specified by Flashpix.

On the other hand, when this IIP is directly applied to JPEG2000, since encoded data of each scalability in JPEG2000 is difference data based on data of scalability one level lower than that scalability, the client must cache received fragmentary encoded data.

However, when the client saves all these fragmentary encoded data, and finally browses the entire image with the highest resolution and highest SNR, all data of a JPEG2000 bitstream on the server are cached on the client side. This may cause the following problems. That is, in the client terminal with a small memory size, the memory overflows during browsing of an image, and an image according to a user's request can no longer be displayed.

Furthermore, since JPEG200 uses differential data, if the memory overflows, and newly received data is overwritten on the already cached data, an image (that the user wants) cannot be accurately displayed.

SUMMARY OF THE INVENTION

The present invention has been made in consideration of the above prior art, and has as its object to provide an image processing method and apparatus, which efficiently store fragmentarily input encoded data in a memory, and process the stored data.

It is another object of the present invention to provide an image processing method and apparatus, which preferentially delete encoded data in a deletable area in term of image display of those which have already been stored in a memory to eliminate the influence on image display, when it is determined that input encoded data cannot be stored in the memory, and store the input encoded data in the memory.

It is still another object of the present invention to provide an image processing method and apparatus, which make display according to a user's request, while preventing data overflow in a cache by deleting cache data, that does not influence a playback image, of cached encoded image data.

According to the present invention, the foregoing object is attained by providing an image processing method of decoding and displaying input encoded data, comprising; an input step of inputting fragmented encoded data which form image data; an upper limit value setting step of setting an upper limit value of a data size to be stored in a memory used to store the encoded data; a checking step of checking based on a data size stored in the memory, the upper limit value, and a data size of the encoded data input in the input step if the encoded data input in the input step can be stored in the memory; a region determination step of determining a region to be deleted in the image data; a delete step of deleting, when it is determined in the checking step that the encoded data input in the input step cannot be stored, data included in the region to be deleted, which is determined in the region determination step, for respective fragmented data, of data stored in the memory; and a control step of controlling, when it is determined in the checking step that the encoded data input in the input step can be stored, or after the data is deleted in the delete step, to store the encoded data input in the input step in the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view for explaining the configuration of JPEG2000 encoded data in a server;

FIG. 19 is a flow chart for explaining a process for deleting cache data from a cache file that saves a plurality of delete unit data;

FIG. 26 is a flow chart showing a process for specifying tiles contained in a delete region R in step S2522 in FIG. 25;

FIGS. 29A and 29B show an example of cache data in a delete region R after data deletion;

FIGS. 34A and 34B show an example of cache data of tiles in a client according to the sixth embodiment;

FIG. 33) according to the sixth embodiment;

FIGS. 38A and 38B depict views for explaining the cached state of tile data of the delete region R according to the sixth embodiment;

FIGS. 42A and 42B depict views for explaining an SIZ marker in a JPEG2000 main header;

FIGS. 43A to 43C depict views for explaining an example of an access management table according to the eighth embodiment of the present invention.

DETAILED DESCRIPTION OF THE PREFERRED EMBODIMENTS

Preferred embodiments of the present invention will be described in detail hereinafter with reference to the accompanying drawings.

First Embodiment

Figure 1:
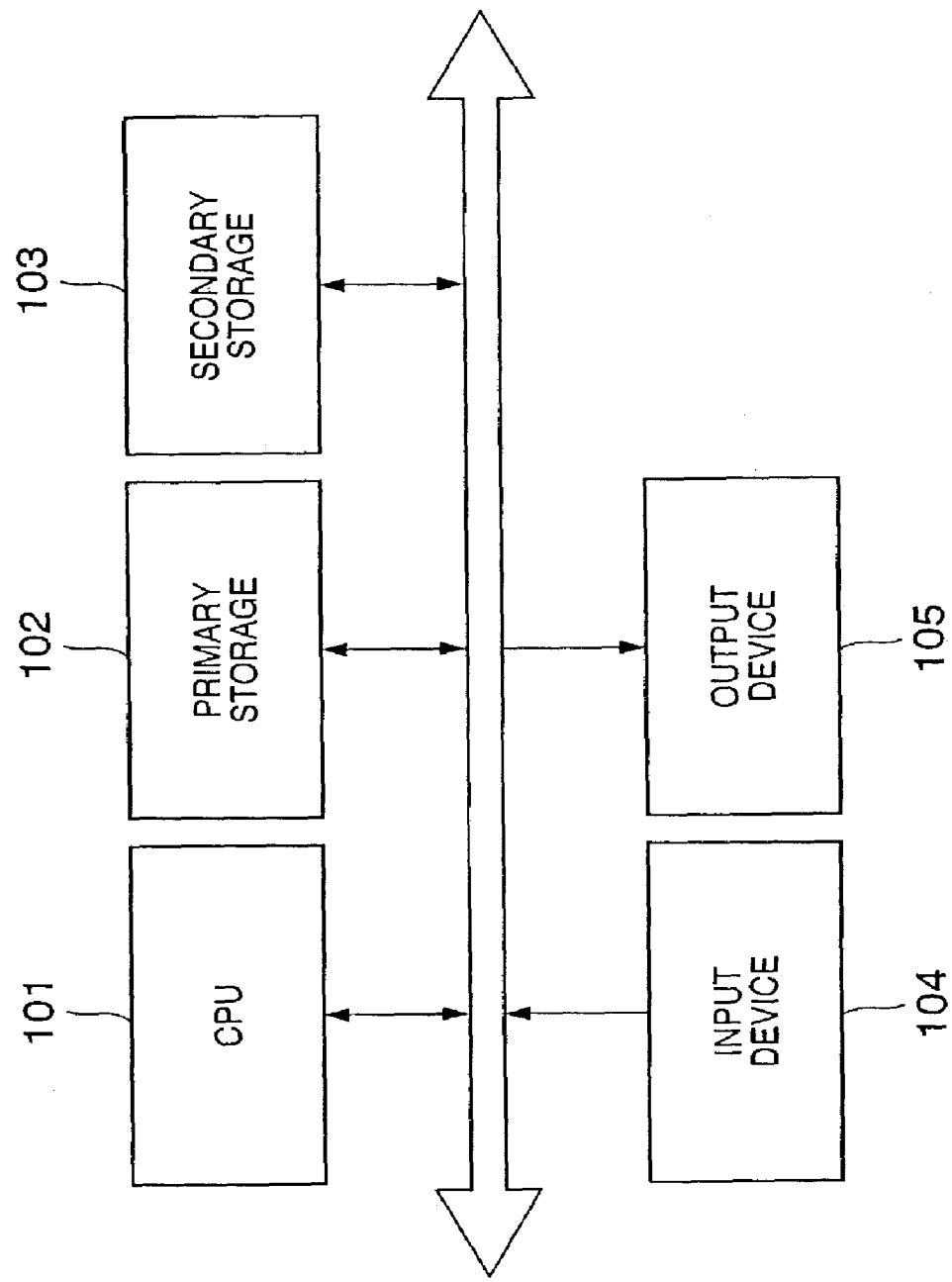
FIG. 1 is a schematic block diagram showing the arrangement of a client and server according to an embodiment of the present invention.

FIG. 1 depicts a schematic diagram of a system that implements this embodiment.

Referring to FIG. 1, a CPU 101 controls the operation of the overall system and, e.g., executes programs stored in a primary storage 102. The primary storage 102 mainly comprises a main memory (RAM), and loads and stores programs and the like stored in a secondary storage 103. The secondary storage 103 corresponds to, e.g., a hard disk or the like.

In general, the capacity of the primary storage 102 is smaller than that of the secondary storage 103, and programs, data, and the like that cannot be stored in the primary storage 102, are stored in the secondary storage 103. Also, data and the like that must be stored for a long period of time are stored in the secondary storage 103. In this embodiment, programs are stored in the secondary storage 103, and are loaded onto the primary storage 102 when they are executed by the CPU 101 to implement processes.

Reference numeral 104 denotes an input device, which includes, e.g., a keyboard, a pointing device such as a mouse and the like. The input device 104 is used to, e.g., send an interrupt signal to programs and the like, in response to user's operation. An output device 105 includes, for example, a monitor (display unit), printer, and the like. Although various configuration methods of this device are available, they are not the gist of this embodiment, and a description thereof will be omitted.

Figure 2:
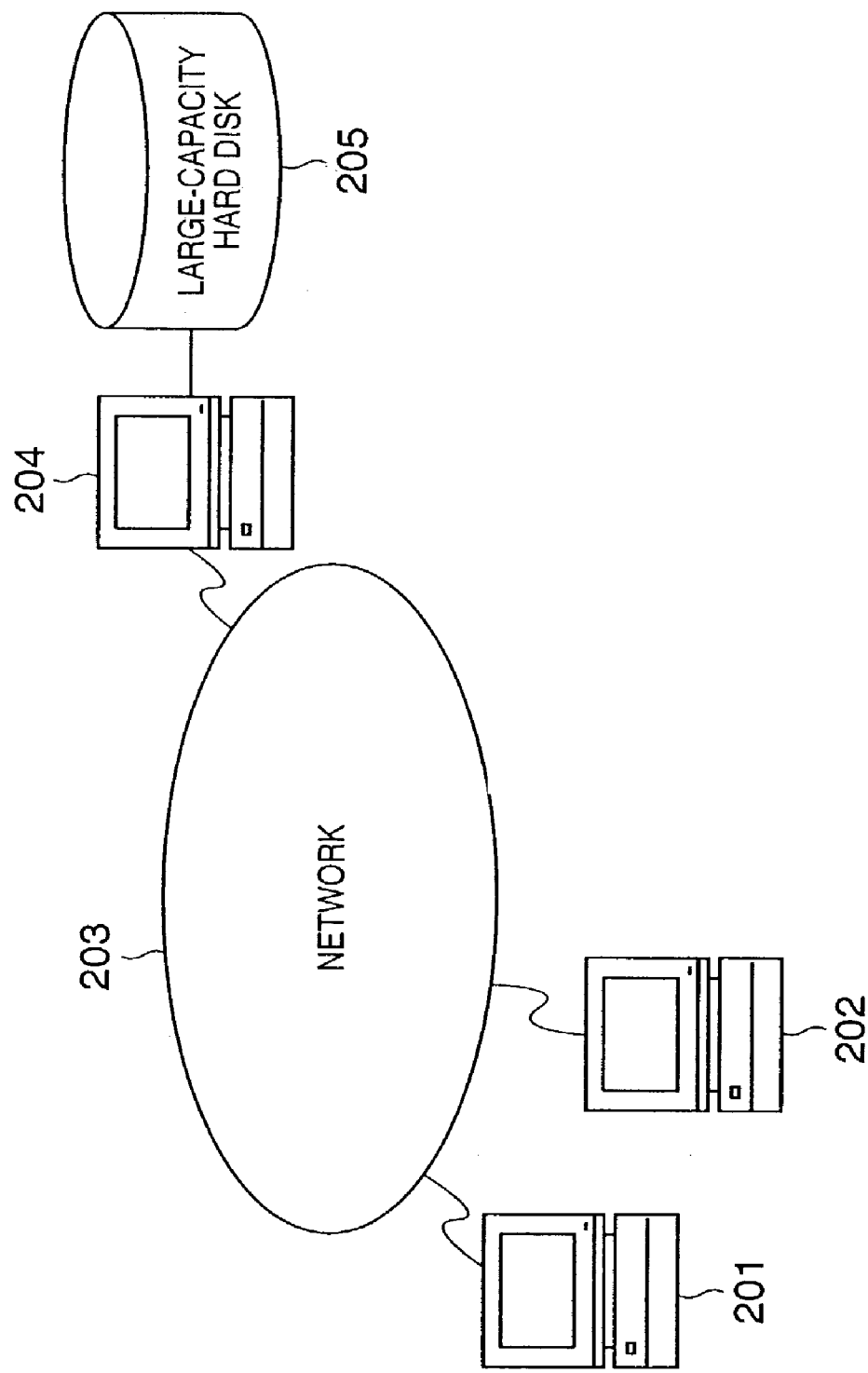
FIG. 2 depicts a view for explaining a connection form between the server and client, and a network according to the embodiment of the present invention.

FIG. 2 depicts a diagram for explaining an outline of a network system that implements this embodiment.

Users 201 and 202 respectively represent users' terminals, each of which comprises the arrangement described using FIG. 1. A plurality of users such as the users 201, 202, and the like can communicate with a server 204 via a network 203 via wired or wireless communications. The server 204 has a large-capacity storage device 205 which stores image files. The large-capacity storage device 205 corresponds to, e.g., a hard disk, magnetic disk, magnetic tape, and the like. This storage device 205 stores many image data that have been encoded by JPEG2000. In such arrangement, the users 201 and 202 (clients) can receive and save fragmented data from JPEG2000 encoded data stored in the server 204.

In this embodiment, a method that allows a client to fragmentarily receive and cache data of the already generated JPEG2000 encoded data file, and to delete the cached encoded data will be described.

The user (client) opens a home page using a Windows™ machine, and clicks a link to a JPEG2000 image described on that page. In this manner, fragmentary data, which are required to display the JPEG2000 image with an image size and resolution suitable for the purpose the user intended, are acquired and cached. In the following description, when the cached data size has exceeded a given limit value which is set in accordance with the user's cache size, a program which serves as a cache manager runs to delete the user's cache data.

General JPEG2000 encoded data will be explained first using FIG. 3.

Figure 3:
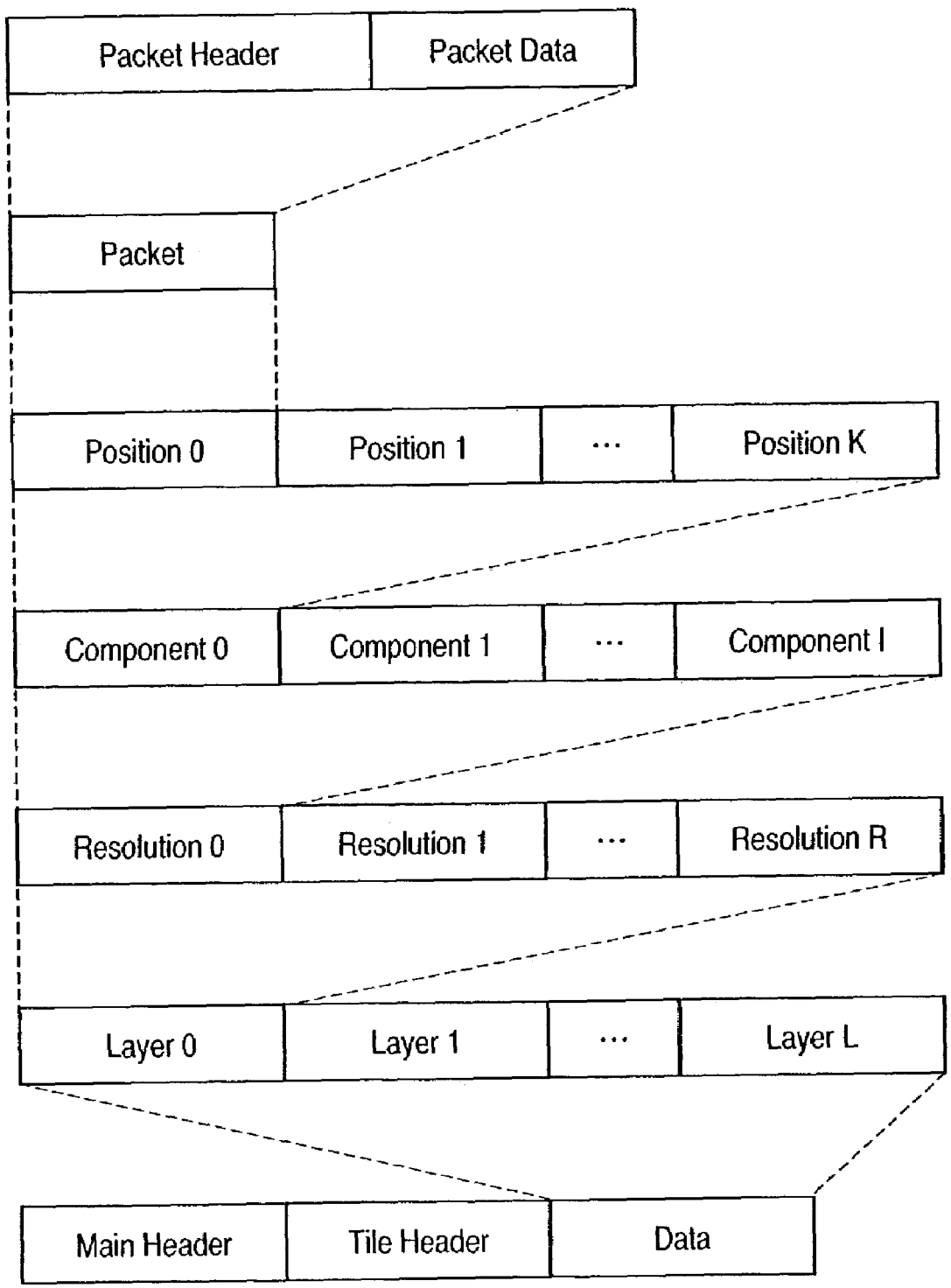
FIG. 3 shows the structure of JPEG2000 encoded data.

FIG. 3 shows the structure of a JPEG2000 file, which is recorded according to Layer-resolution level-component-position progression (to be abbreviated as LRCP hereinafter).

Figure 4:
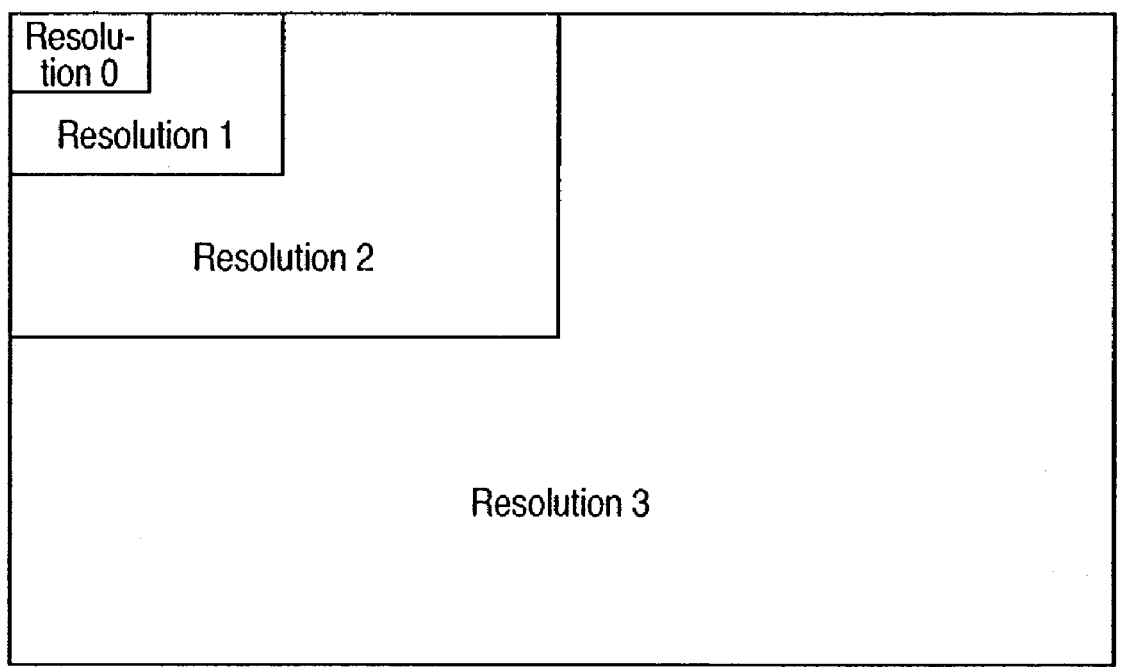
FIG. 4 depicts a view for explaining resolution scalability of JPEG2000.

According to the LRCP, data are recorded in the order of layer/resolution/component/position. Such arrangement of data is called a progression order. FIG. 4 shows the relationship between the resolutions (image sizes) and resolution numbers.

As shown in FIG. 4, the resolution number of an image with the lowest resolution is set to be "0", and the width and height of the image size are doubled as the resolution number increases by 1. Also, each layer stores data in ascending order of resolution number. The layer number corresponds to the S/N ratio of an image to be reconstructed to its original image, and the S/N ratio impairs as an image has a smaller layer number. In one JPEG2000 file, the maximum values of the resolution number, layer number, and component number are set in advance by an encoder, they are encoded according to these parameters, and the encoded information is stored in encoded data.

Each packet is made up of a packet header field that manages information of code-blocks stored in that packet, and encoded data of code-blocks.

Using such JPEG2000 encoded data, the user can receive only image data of his or her required part from the server 204 without acquiring all image data stored in the server 204. Note that a data unit that the user can receive may be a JPEG2000 packet or a code-block as an encoding unit smaller than the packet. In this embodiment, a packet is assumed as a data unit that the user receives from the server 204.

Figure 5:
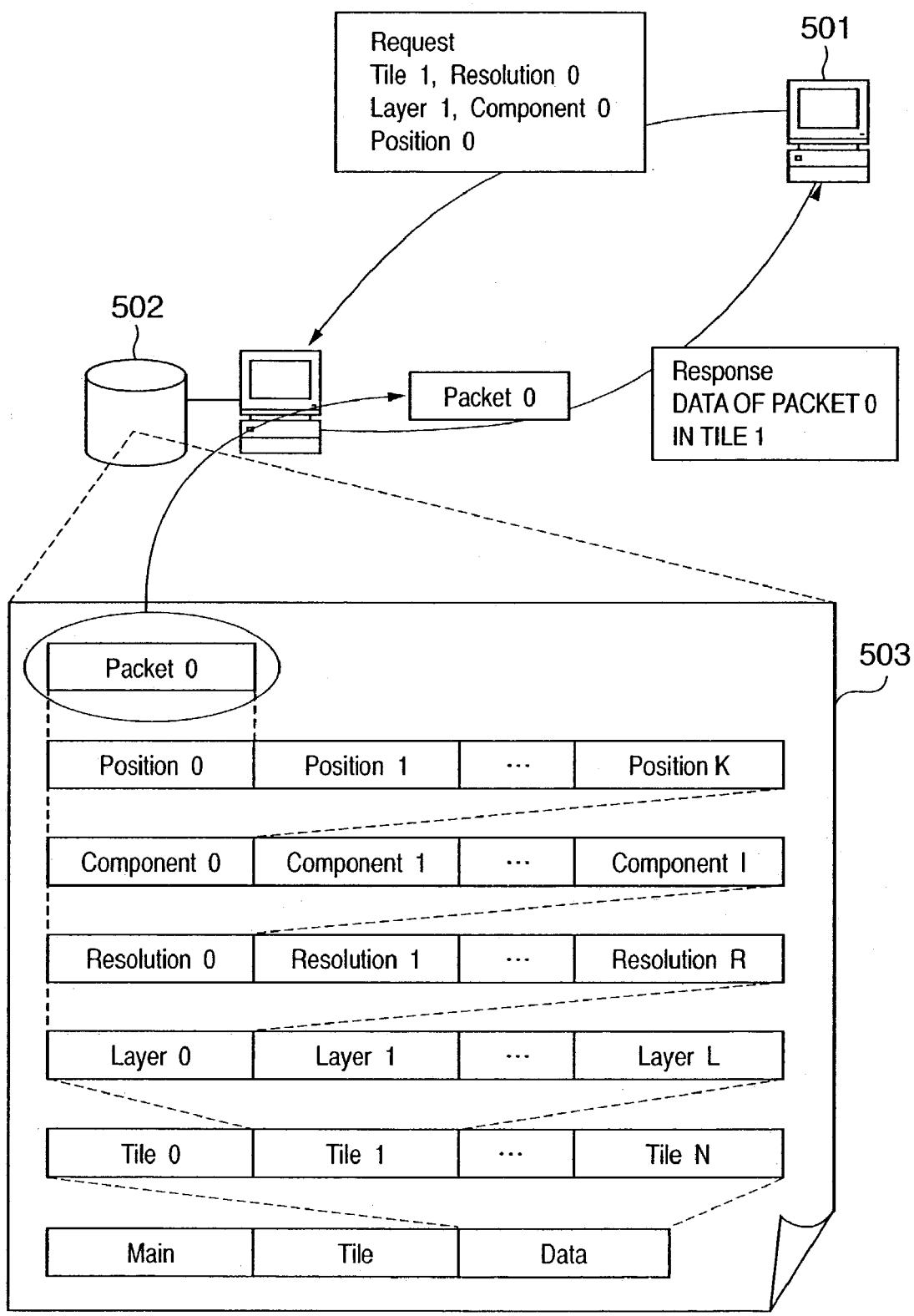
FIG. 5 depicts a view for explaining a communication protocol between a server and client in the embodiment of the present invention.

FIG. 5 is a view for explaining the concept of a request and response for each packet between the user and server.

A user 501 issues a data request to a server 502 by designating an image tile number, resolution level, layer, component, and position numbers. In the example of FIG. 5, this request contains tile number "1" (Tile 1), resolution level "0" (resolution 0), layer "1" (Layer 1), component "0" (Component 0), and position "0" (Position 0).

In response to this request, the server 502 analyzes a code stream of a designated image 503, extracts packet data (data of packet 0 in tile 1) corresponding to the designated tile number, resolution level, layer, component, and position numbers, and sends back the extracted packet data to the user 501.

Figure 6A:
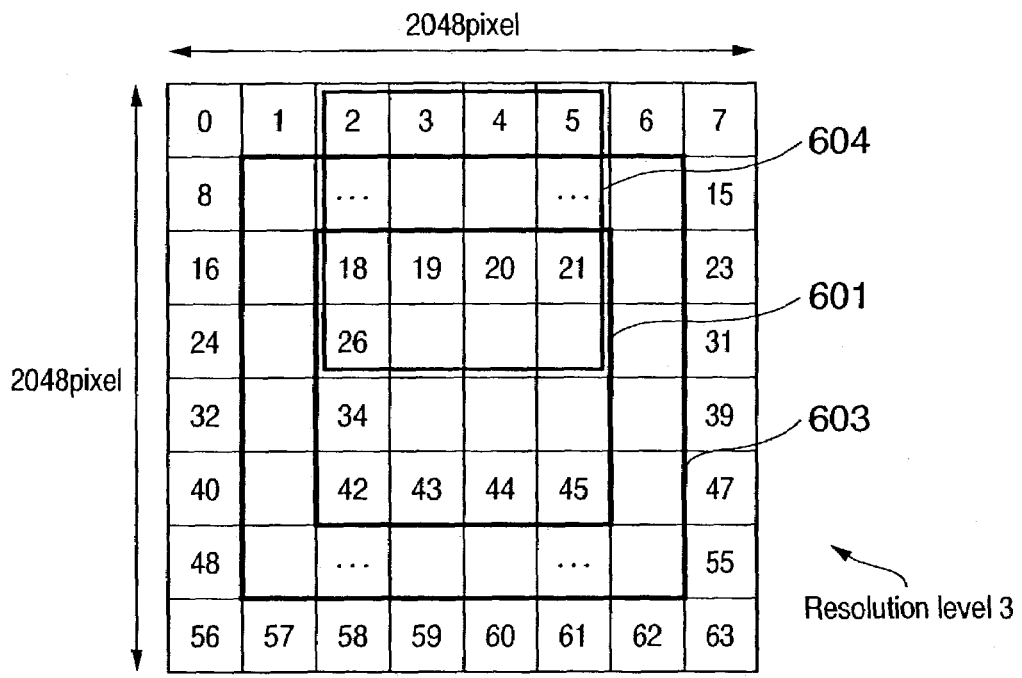
FIGS. 6A to 6D depict views showing an example of resolution scalability and tile segmentation of JPEG2000.
Figure 6B:
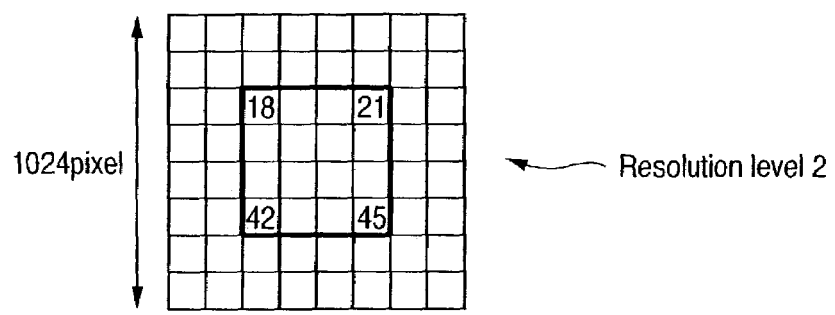
Figure 6C:
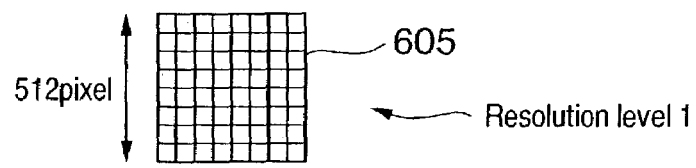
Figure 6D:

In this embodiment, assume that each original image stored in the server 502 has a maximum resolution size of 2048×2048 [pixels], and is segmented into 64 (=8×8) tiles, each of which has the number of components="3" and resolution levels 0 to 3, i.e., has hierarchies in four image size directions, and is divided into two layers (see FIG. 7). Respective tiles are assigned sequential numbers in turn from the upper left tile, as shown in FIG. 6A. Therefore, the server 502 saves data 701 in FIG. 7.

FIGS. 6A to 6D show segmentation examples of tiles corresponding to respective resolution levels (0 to 3), and FIG. 7 is a view for explaining the structure of JPEG2000 encoded data in the server 502.

[Deletion of Data for Each Tile]

The client 501 recognizes, in advance, the memory sizes of a cache memory that can be used to cache received encoded data, and erases bitstreams before the data size of cache data of fragmentary JPEG2000 bitstreams sent from the server 502 exceeds the size of the cache memory.

Figure 8:
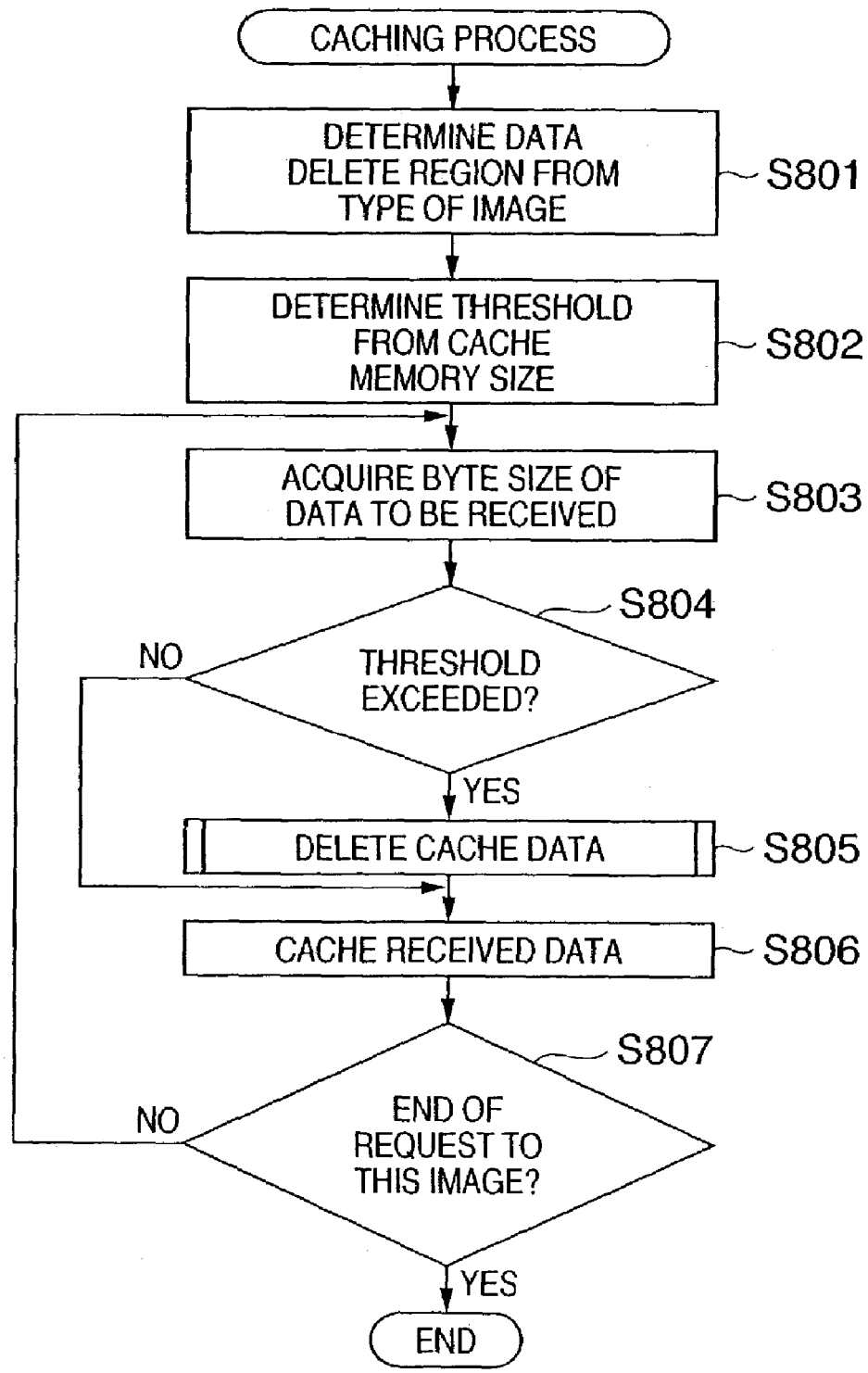
FIG. 8 is a flow chart showing a cache process in a client according to the first embodiment of the present invention.

This operation will be described below using the flow chart in FIG. 8. FIG. 8 is a flow chart showing a cache process of received data in the client 501.

In step S801, the type of image is specified, and a region R where data are to be preferentially erased of that image is determined in a tile unit, base on the type of image. For example, in case of a brochure image or the like, an image of a commercial product is normally laid out at the center of the image. Hence, in case of such image, a central region of that image is set as a region where data are preferentially cached and saved, and a peripheral region indicated by, e.g., hatching portion 901 in FIG. 9A, is set as a region where data are to be preferentially erased.

Figure 9A:
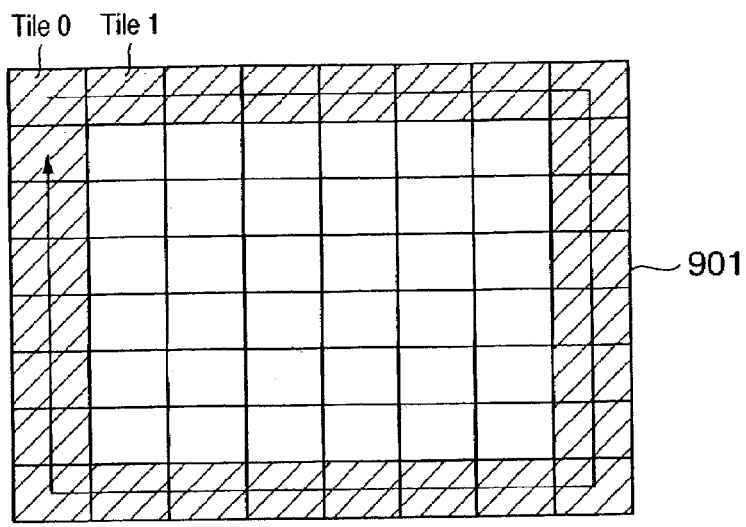
FIGS. 9A to 9C depict views for explaining a method of setting a delete region R of an image.
Figure 9B:
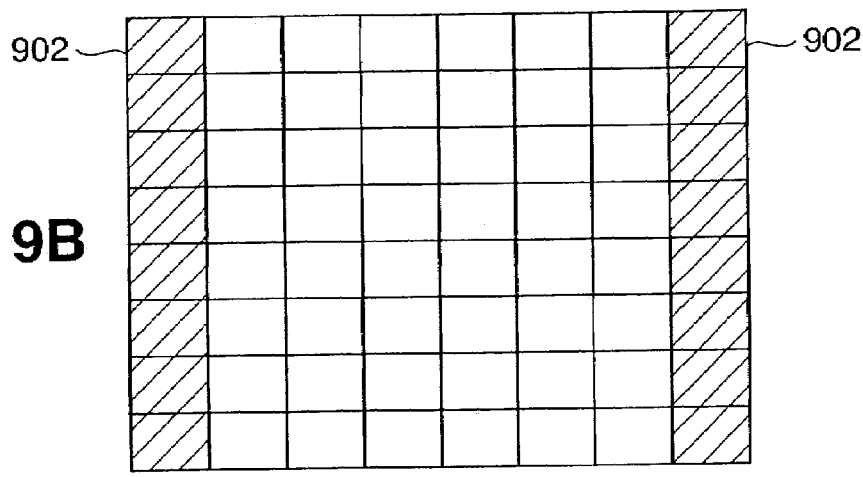
Figure 9C:
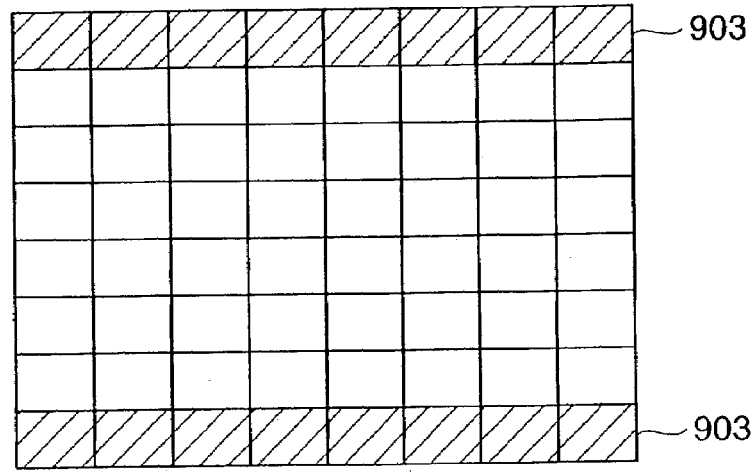

FIGS. 9A to 9C show an example of a region of an image where data are to be preferentially erased.

Depending on the types of images, right and left side regions 902 or upper and lower side regions 903 of an image may be set as a preferential data delete region, as shown in FIGS. 9B and 9C. Note that various methods of specifying the type of image may be used (e.g., the type of image may be specified based on information in a site or information sent from the server 502), but a description thereof will be omitted since such method is not the gist of the present invention.

The flow advances to step S802 to acquire the memory size of the terminal of the client 501, and a threshold value (size) used to determine whether cache data is deleted is determined. That is, the memory size used to cache received JPEG2000 packet data is determined. When a cacheable memory size is used 100%, the threshold value equals the cache memory size. However, when that memory saves data other than the fragmentary JPEG2000 encoded data, or when that system handles a plurality of JPEG2000 encoded data, the threshold value is preferably set to be smaller than the available memory size. For example, 2 Mbytes of a 3-Mbyte memory size are set as the threshold value of the cache size for this image. Upon determining the threshold value of the cache size, a memory capacity of a secondary storage medium such as a hard disk or the like may be used. However, in this embodiment, the threshold value is determined with reference to the memory size of the primary storage 102 for the sake of simplicity.

The flow advances to step S803 to acquire the number of bytes of the received fragmented JPEG2000 encoded data and receive the fragmented JPEG2000 encoded data. The flow advances to step S804 to determine if the threshold value set in step S802 is exceeded upon caching received bytes of the number acquired in step S803. That is, if a value obtained by subtracting the currently cached data size from the threshold value is larger than the data size acquired in step S803, it is determined that the threshold value is exceeded; otherwise, it is determined that the threshold value is not exceeded. If the threshold value is exceeded, the flow advances to step S805; otherwise, the flow jumps to step S806.

For example, if the data size of the already cached JPEG2000 packet data is 1.95 Mbytes, and the size of encoded data currently received in step S803 is 120 kbytes, since the total value of these data sizes exceeds the threshold value (2 Mbytes), the flow advances to step S805. In step S805, data is deleted from the cache data for each JPEG2000 tile, so as to suppress the cache data size to be equal to or smaller than the threshold value if the amount of encoded data acquired in step S803 are cached.

For example, if the size of encoded data currently acquired in step S803 is 120 kbytes, and the threshold value is 2 Mbytes, cached encoded data is deleted in step S805 until the cache data size becomes equal to or smaller than 1.88 [Mbytes]=2−0.12. In this case, data is deleted in turn from a tile, data of which is to be preferentially erased. The flow then advances to step S806 to cache the received encoded data. The flow advances to step S807 to check if the request for this image is completed. If the request is not completed yet, the flow returns to step S803 to wait for reception of the next encoded data. If the request is completed, this cache routine ends.

Figure 10:
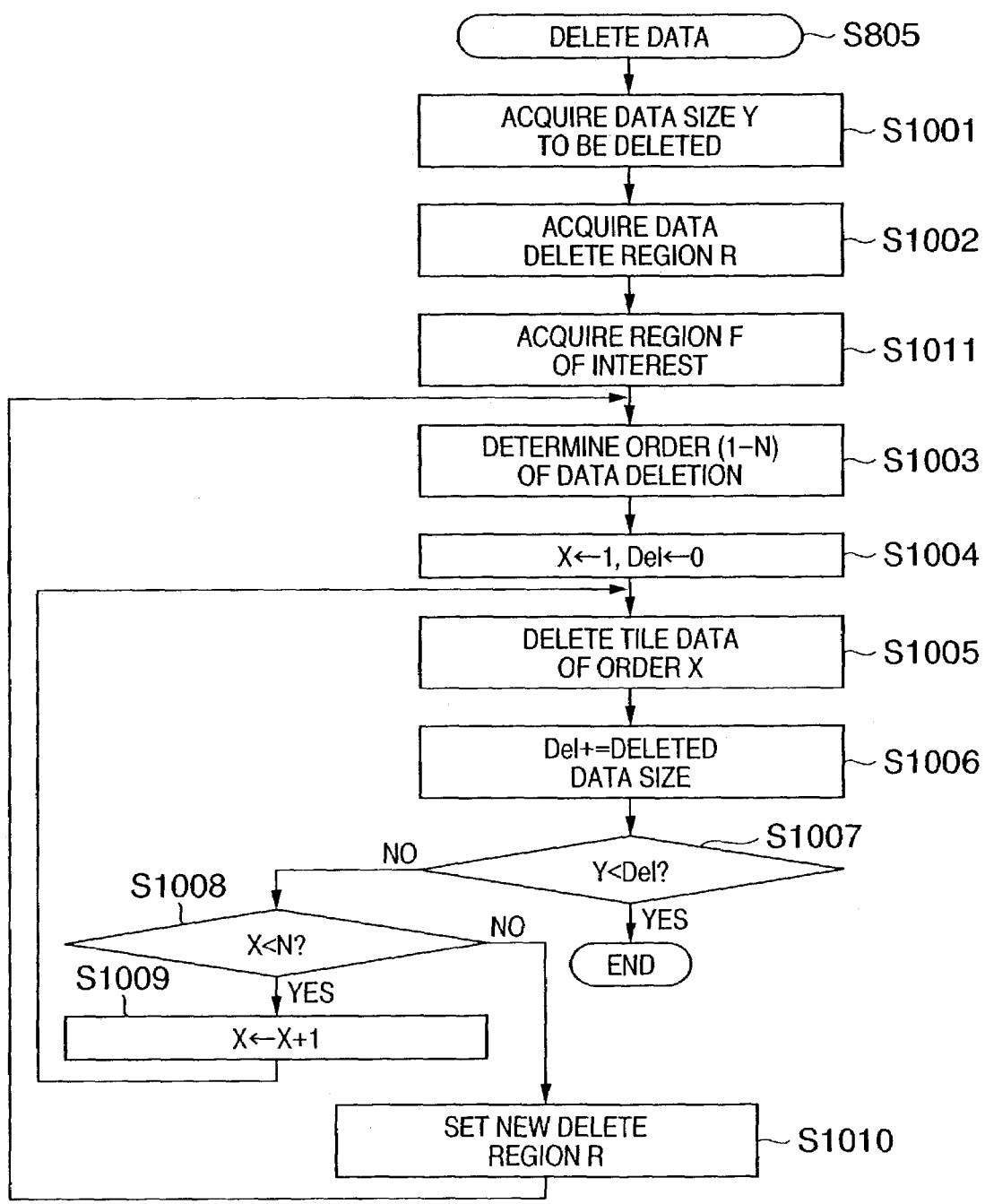
FIG. 10 is a flow chart showing a cache data delete process in step S805 in FIG. 8.

FIG. 10 is a flow chart showing the cache data delete process in step S805 in FIG. 8.

In step S1001, a data size Y to be deleted is acquired. For example, if the user has already displayed the entire image at maximum SNR of resolution level 1, this means that packet data which form resolution levels 0 and 1 of all tiles have been cached. That is, the main header data 703, header data 707 of respective tiles, a packet group 704 which forms resolution level 0, and a packet group 705 which forms resolution level 1 shown in FIG. 7 are saved in the cache memory on the client side. If the total data size of these data is 1.95 Mbytes, the threshold value is 2 Mbytes, and the received encoded data size is 120 kbytes, the data size Y to be deleted is calculated by Y=1.95+0.12−2.0=0.07 [Mbytes]=70 [kbytes]. That is, cache data of 70 kbytes or more must be deleted.

The flow advances to step S1002 to acquire the data delete region R from image information obtained in step S801 in FIG. 8. In this case, for example, the outermost tiles of the image are designated as the data delete region R, as indicated by 901 in FIG. 9A, on the basis of the information obtained in step S801.

The flow advances to step S1011 to acquire the current region F of interest. That is, the region which is currently displayed on a display unit of the output device 105 is acquired as the region of interest. The flow advances to step S1003 to determine an order in which tile data are deleted for tiles included in the data delete region R obtained in step S1002. If region F of interest overlaps the data delete region R, tiles within the overlapping portion are excluded from the delete region. In this embodiment, the order is determined based on the type of image obtained in step S801.

Assume that a region 601, formed by 16 tiles, the four corners of which are bounded by tiles with tile numbers "18", "21", "42", and "45" shown in FIG. 6A, corresponds to the current region F of interest, and it is determined that tiles outside this region of interest are deleted in turn clockwise, i.e., in the direction of an arrow in the region 901 of FIG. 9A. In FIG. 6A, numbers X=1, 2, . . . , 28 are assigned in the order of tiles with tile numbers "0" to "7", "15", "23", "31", "39", "47", "55", "63" to "56", "48", "40", "32", "24", "16", and "8". If region F of interest corresponds to a region 604, the four corners of which are bounded by tiles with tile numbers "2", "5", "26", and "29", numbers X=1, 2, . . . , 24 are assigned in the order of tile numbers "0", "1", "6", "7", "15", "23", "31", "39", "47", "55", "63" to "56", "48", "40", "32", "24", "16", and "8", except for tiles "2" to "5".

Figure 11:
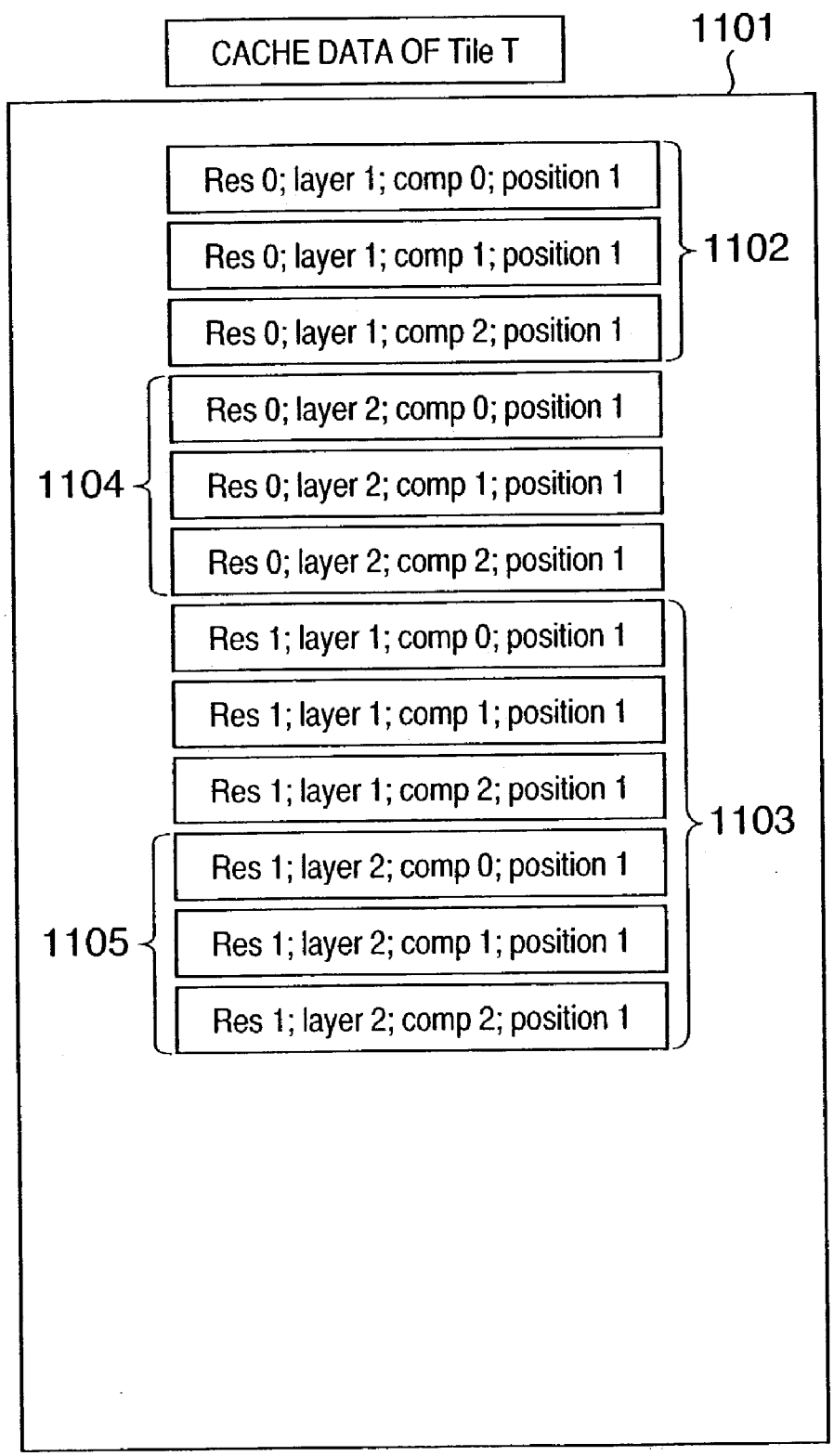
FIG. 11 shows an example of cache data of tile T in the client of the first embodiment.

The flow advances to step S1004 to initialize variables X and Del by substituting "1" in variable X which indicates the delete order of data, and "0" in variable Del used to calculate the deleted data size. The flow advances to step S1005 to delete all tile data assigned the numbers X, except for packet data corresponding to components of resolution level 0 and layer 1. For example, when cache data of tile with number "0" (tile 0) are represented by 1101 in FIG. 11, if X=1, nine packets indicated by 1103 and 1104 except for three packets 1102 which form resolution level 0 and layer 1 are deleted from the cache data of tile 0. The flow advances to step S1006 to add the data size of packets deleted in step S1005 to variable Del. For example, if the total data size of nine deleted packet data from which tile 0 is deleted, as shown in FIG. 11, is 55 kbytes, the value of variable Del is updated to Del=0+55=55 kbytes.

The flow advances to step S1007 to compare the data size Y to be deleted with the value of variable Del. If the deleted data size Del is larger than the data size Y to be deleted, this data delete process ends.

On the other hand, if it is determined in step S1007 that the deleted data size Del is smaller than the data size Y to be deleted, the flow advances to step S1008. That is, if the data size Y to be deleted is 70 kbytes, and the deleted data size (Del) is 55 kbytes, since data to be deleted still remain, the flow advances to step S1008. In this case, the aforementioned process is executed for the next tile to be deleted and, as a result, if the deleted data size is 50 kbytes, the value of variable Del becomes Del=55+50=105 kbytes. In this way, the deleted data size becomes larger than Y=70 kbytes, and this data delete process ends.

In step S1008, variable X indicating the delete number is compared with the number N of tiles in the delete region R. If variable X is smaller than the number N of tiles, the flow advances to step S1009 to increment variable X by +1; otherwise, the flow advances to step S1010. That is, it is checked in step S1008 if all encoded data of tiles of the set data delete region R are only data of resolution level 0 and layer 1. If tiles which are to undergo data deletion still remain, the flow advances to step S1009; if it is determined in step S1008 that all tile data in the region R are deleted, the flow advances to step S1010. In step S1009, variable X is incremented by 1 to specify the next tile which is to undergo data deletion in the delete region R.

On the other hand, in step S1010 a new delete region R is set again. For example, when the initially set delete region R is formed by the outermost tiles, as indicated by 901 in FIG. 9A, a region formed by the next outermost tiles, i.e., those bounded by frames 601 and 603 in FIG. 6A, is set again as a new delete region R.

When such cache data delete method is adopted, tile data in an important data region, which is determined in advance, are held, and only tile data with a low necessity level can be deleted. Since packet data other than data of resolution level 0 and layer 1, which have the smallest data size, are deleted for each tile at a time, a large, free cache space can be formed at a time, and the load imposed by the calculations of the deleted data size can be reduced.

Since data of resolution level 0 and layer 1 of respective tiles are held without being deleted, all tiles can be hold at least data of the lowest resolution. Hence, even when the user requests an image of higher resolution, an image decoded from the held encoded data can be temporarily displayed in an enlarged scale, and an image of a given tile portion can be prevented from being not displayed for a while after the image display request of that portion is inputted. Also, an image that allows the user to recognize the whole image can be quickly displayed. For example, assume that the delete region R includes tiles with numbers "0" to "5", and data up to resolution level 2 of respective tiles are saved, as shown in FIGS. 13A and 13B.

Figures 13A, 13B:
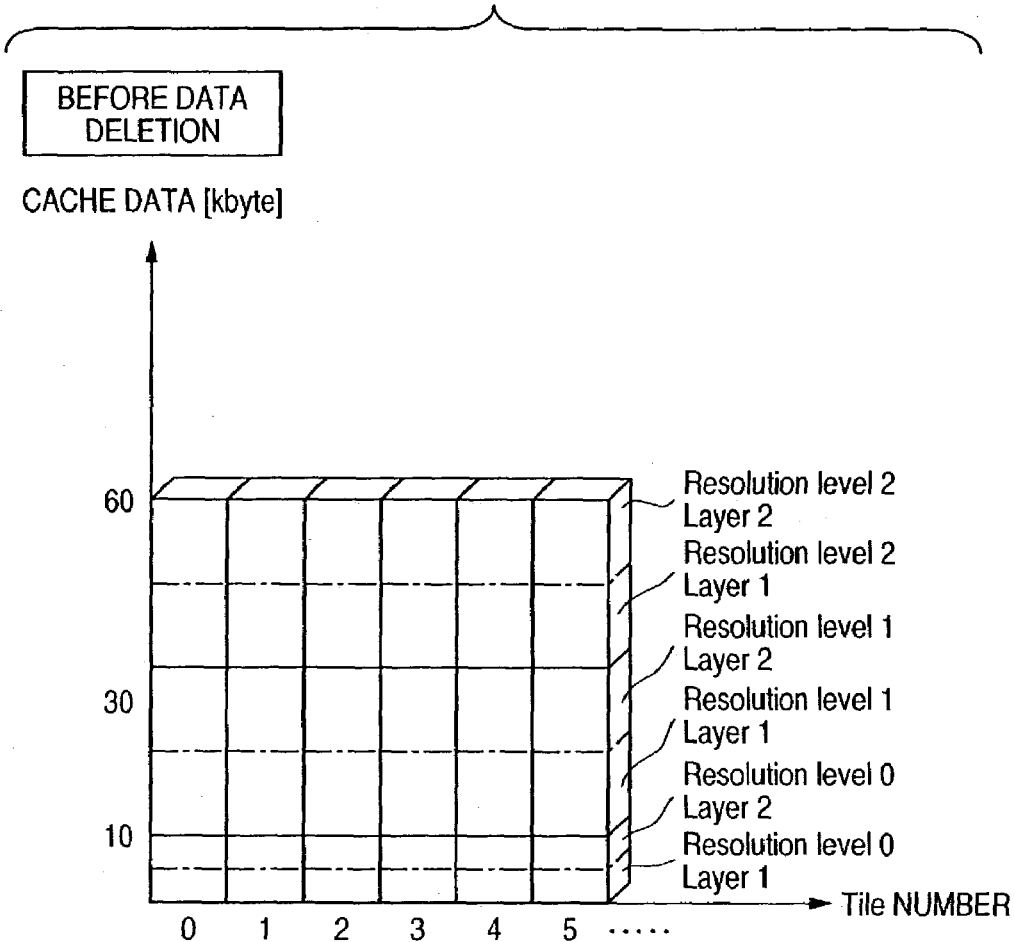
FIGS. 13A and 13B depict an example of cache data in a delete region R before deletion in the second embodiment.

FIG. 13A shows the data sizes of encoded data corresponding to respective tile numbers in correspondence with the resolution levels and layers, and FIG. 13B are views for explaining the cache data size of one tile data and the data size to be deleted, which correspond to resolution levels and layers.

Figure 14A:
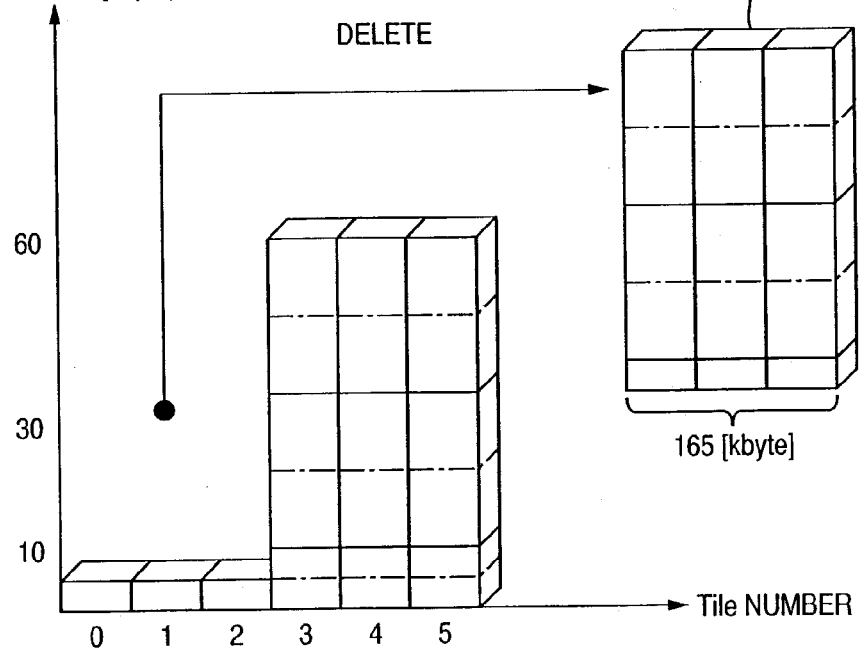
FIGS. 14A and 14B show deletion examples of cache data in the delete region R.

If cache data of tiles with numbers "0" to "5" are to be deleted in the order named, data 1401 for three tiles with numbers "0" to "2" must be deleted so as to delete 120-kbyte data, as shown in FIG. 14A. Hence, a total of 165 kbytes (55×3) must be deleted.

Note that the order in which tile data are deleted is not limited to the above embodiment, and other orders may be adopted.

Second Embodiment

[Data Deletion of Specified Tiles in Packet Unit]

In the first embodiment, a region with a low necessity level is estimated based on information of the type of image, which is acquired in advance, tiles are selected one by one from that region, and all packet data except for data of resolution level 0 and layer 1 in these selected tiles are deleted. However, a method of reducing the data size by dropping the SNR or resolution of all tiles included in the region in place of deleting all packets included in specific tiles except for data of resolution level 0 and layer 1 may be used. In this case, processes different from those in the first embodiment described above are step S1003 and subsequent steps in the cache data delete process shown in FIG. 10.

Figure 12:
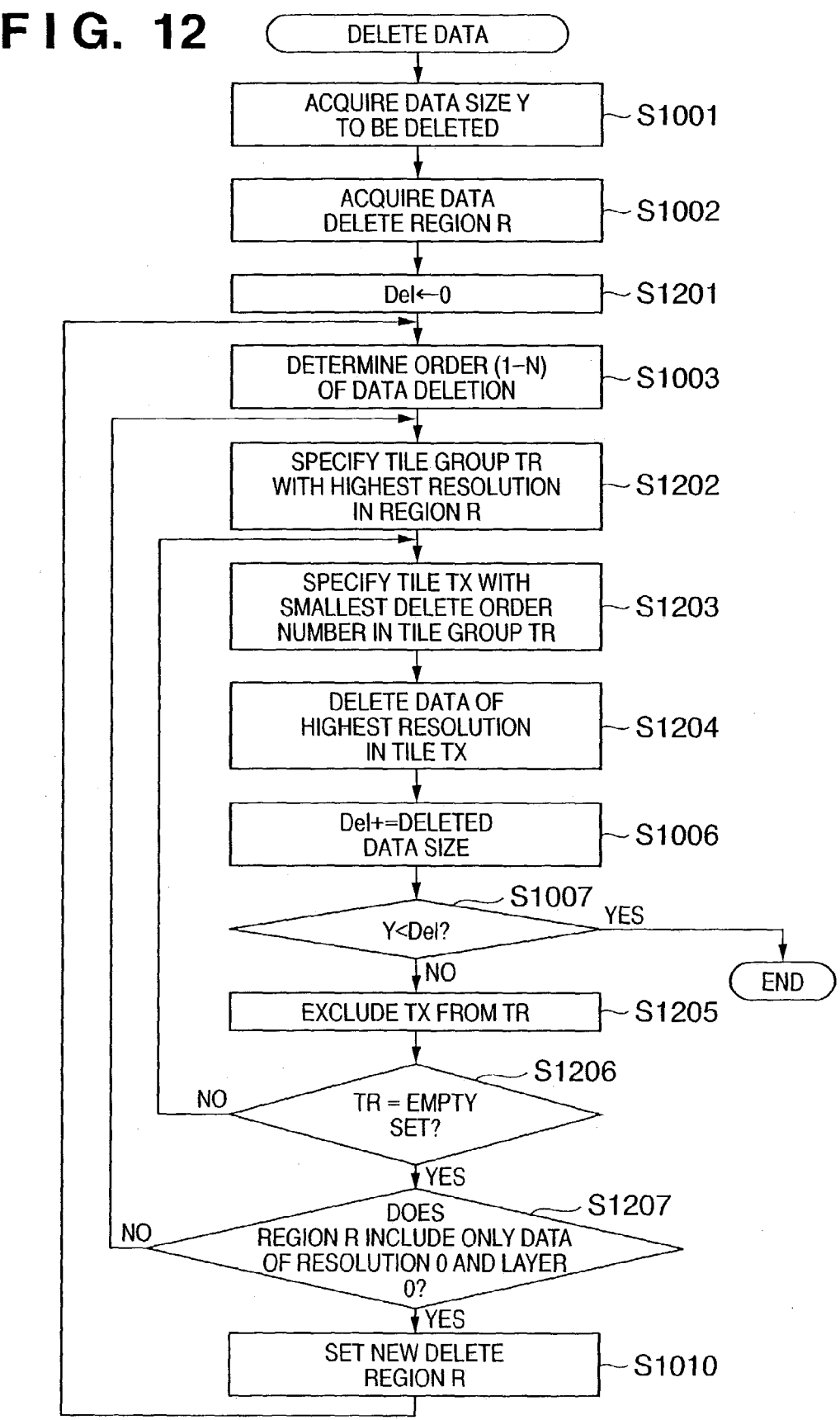
FIG. 12 is a flow chart showing a cache data delete process according to the second embodiment of the present invention.

The cache data delete process according to the second embodiment will be described below with reference to FIG. 12. Note that the same step numbers in FIG. 12 denote the steps which execute the same operations as in FIG. 10, and a description thereof will be omitted. Also, since the hardware arrangement and data structure in the second embodiment are the same as those in the first embodiment, a description thereof will be omitted.

In steps S1001 and S1002, the same operations as in the first embodiment are executed. In step S1201, variable Del used to calculate the deleted data size is initialized by setting "0" in it. In step S1003, the order in which data are deleted is assigned to respective tiles in the data delete region R as in the first embodiment.

The flow advances to step S1202 to specify a tile group TR with the highest resolution in the delete region R. For example, if the user has already displayed the entire image at maximum SNR of resolution level 1, this means that packet data which form resolution levels 0 and 1 of all tiles have been cached. That is, the main header 703, header data 707 of respective tiles, a packet group 704 which forms resolution level 0, and a packet group 705 which forms resolution level 1 shown in FIG. 7 are saved in the cache memory of the client 501. Note that the outermost tiles of an image are also designated as the data delete region R, as indicated by 901 in FIG. 9A. Since data up to the resolution of resolution level 1 are cached for all tiles included in the data delete region R, the tile group TR specified in step S1202 is equal to the region R, and includes 28 tiles with numbers "0" to "8", "15", "16", "23", "24", "31", "32", "39", "40", "47", "48", and "55" to "63".

The flow advances to step S1203 to specify a tile number TX of the first tile to be deleted. For example, a case will be explained below wherein a region 601, which is bounded by tiles with numbers "18", "21", "42", and "45" shown in FIG. 6A, corresponds to the current region F of interest, and data in the region 901 in FIG. 9A are to be deleted in the order of the direction of the arrow.

In FIG. 6A, if data are to be deleted in the order of tile numbers "0" to "7", "15", "23", "31", "39", "47", "55", "63" to "56", "48", "40", "32", "24", "16", and "8", number "0" is specified as the tile number TX of the first tile to be deleted. Conversely, if tile data are to be deleted counterclockwise, i.e., in the order of "8", "16", 24", . . . , "8" is specified as the tile number TX.

The flow advances to step S1204 to delete data of the highest resolution of the tile, which is designated by the tile number specified in step S1203. For example, if the tile number TX is "0" and data which form resolution level 0 and layer 1 are saved as tile data of number "0", as indicated by 1101 in FIG. 11, six packets 1103 which form resolution level 1 are deleted. If data included in the tile corresponding to the tile number TX are only data which form resolution level 0, packet data 1104 except for three packets 1102 that form resolution level 0 and layer 1, is deleted.

The flow advances to step S1006 to add the deleted data size to variable Del as in the first embodiment. It is then checked in step S1007 if the deleted data size is equal to or larger than the data size Y to be deleted, as in the first embodiment. If Y<Del, it is determined that a sufficient data size has been deleted, and the process ends. However, if data to be deleted still remain (Y>Del), the flow advances to step S1205. In step S1205, the tile with the number TX specified in step S1204, from which cache data has been deleted in the immediately preceding process, is excluded from the tile group TR as a preferential data delete candidate. For example, if tile data with number "0" is deleted in step S1204 from the tile group TR including 28 tiles, the tile with number "0" is excluded from that tile group TR, and the number of tiles included in the tile group TR is decreased to 27.

The flow advances to step S1206 to check if tiles to be deleted still remain in the tile group TR as a preferential data delete candidate. If tiles to be preferentially deleted still remain in the tile group TR, the flow returns to step S1203; otherwise, the flow advances to step S1207.

More specifically, when the tile group TR as a preferential data delete candidate include 28 tiles, as described above, if step S1205 is executed 28 times for that tile group TR, the number of tiles that remain in the tile group TR becomes "0", and the highest resolution level of the delete region R lowers by one.

It is determined in step S1207 if cache data of all tiles included in the delete region R are only packet data which form resolution level 0 and layer 1. If all tiles include only data which form resolution level 0 and layer 1, since that the delete region R does not include any tile data that can be deleted, a new delete region R must be set. If it is determined in step S1207 that the new delete region R must be set, the flow advances to step S1010. On the other hand, if data that can be deleted still remain in the delete region R in step S1207, the flow returns to step S1202.

More specifically, assume that the delete region R includes tiles with numbers "0" to "5", and data up to resolution level 2 are saved as respective tile data, as shown in FIGS. 13A and 13B.

Figure 14B:
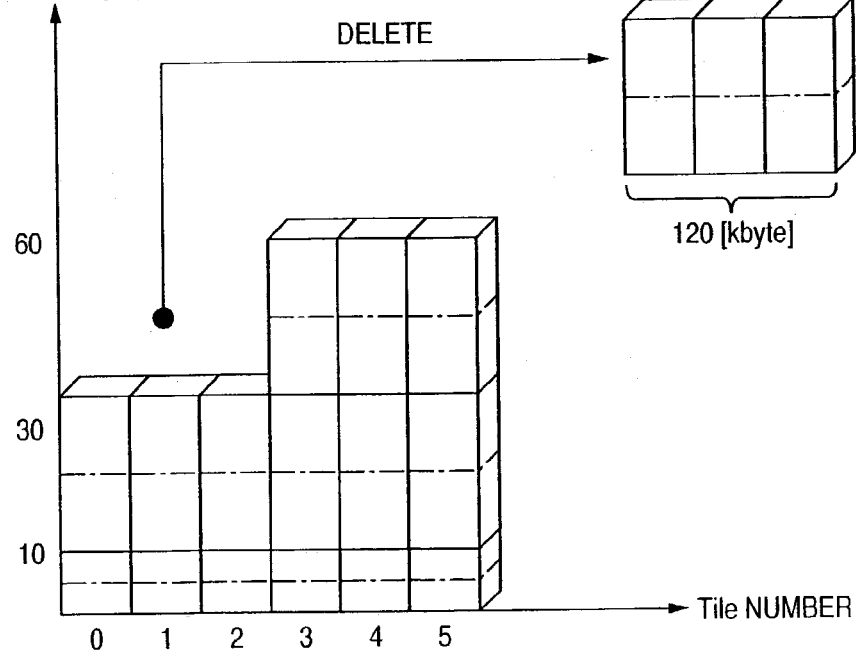

If cache data of tiles with numbers "0" to "5" are to be deleted in the order named, data 1402 (FIG. 14B) of resolution level 2 for tiles with numbers "0" to "3" must be deleted so as to delete 120-kbyte data.

In the second embodiment, data of all tiles included the delete region R are deleted little by little in turn from those with higher resolution. Therefore, even when a region included in the delete region R is browsed, many tile data included in that region are more likely to remain, and the number of packet data requested to the server 502 can be reduced.

In the second embodiment, data in the delete region R are deleted in turn from those with higher resolution. Also, substantially the same processes can be implemented if data are deleted in the SNR direction. In this case, the tile group TR specified in step S1202 is a set of tiles having the highest SNR, i.e., tiles, many layers of which have been cached. Also, data to be deleted in step S1204 is tile data with the highest SNR in a tile corresponding to the number TX. For example, if 12 packets 1101 (FIG. 11) are saved as cache data of the tile corresponding to the number TX, since data with the highest SNR of cache data are deleted, a total of six packets, i.e., three packets 1105 which form resolution level 1 and layer 2, and three packets 1104 which form resolution level 0 and layer 2, are deleted.

Alternatively, substantially the same processes can be implemented when the data size to be deleted upon deleting tile data in turn from those with higher resolution is compared with the data size to be deleted upon deleting tile data in turn from those with higher SNR, and the delete method that can assure a larger data size to be deleted is selected. For example, if 12 packets 1101 (FIG. 11) are saved, when tile data are to be deleted in turn from those with higher resolution, six packet data 1103 are deleted; when tile data are to be deleted in turn from those with higher SNR, a total of six packets, i.e., three packets 1104 and three packets 1105, are deleted. Hence, in this case, the data size of the six packets 1103 to be deleted by the method according to the resolution is compared with that of a total of six packets, i.e., the three packets 1104 and the three packets 1105 to be deleted by the method according to the SNR, and packets are deleted by the method that can assure a larger data size to be deleted.

Third Embodiment

[Delete Method in Consideration of ROI of JPEG2000 Image]

In the first and second embodiments, the type of image is acquired, and the delete region R of the image is determined based on the type of the image. This method can automatically determine the delete region R without requiring any special calculations. However, an image, whose delete region R can be automatically determined based on only the type of image, is limited to, e.g., a brochure image or the like, and it is difficult to apply the above method to general images. By contrast, a region which is designated with a region ROI in advance in a JPEG2000 bitstream is determined as an important region, and a region other than the region ROI can be determined as the delete region R.

Figure 15:
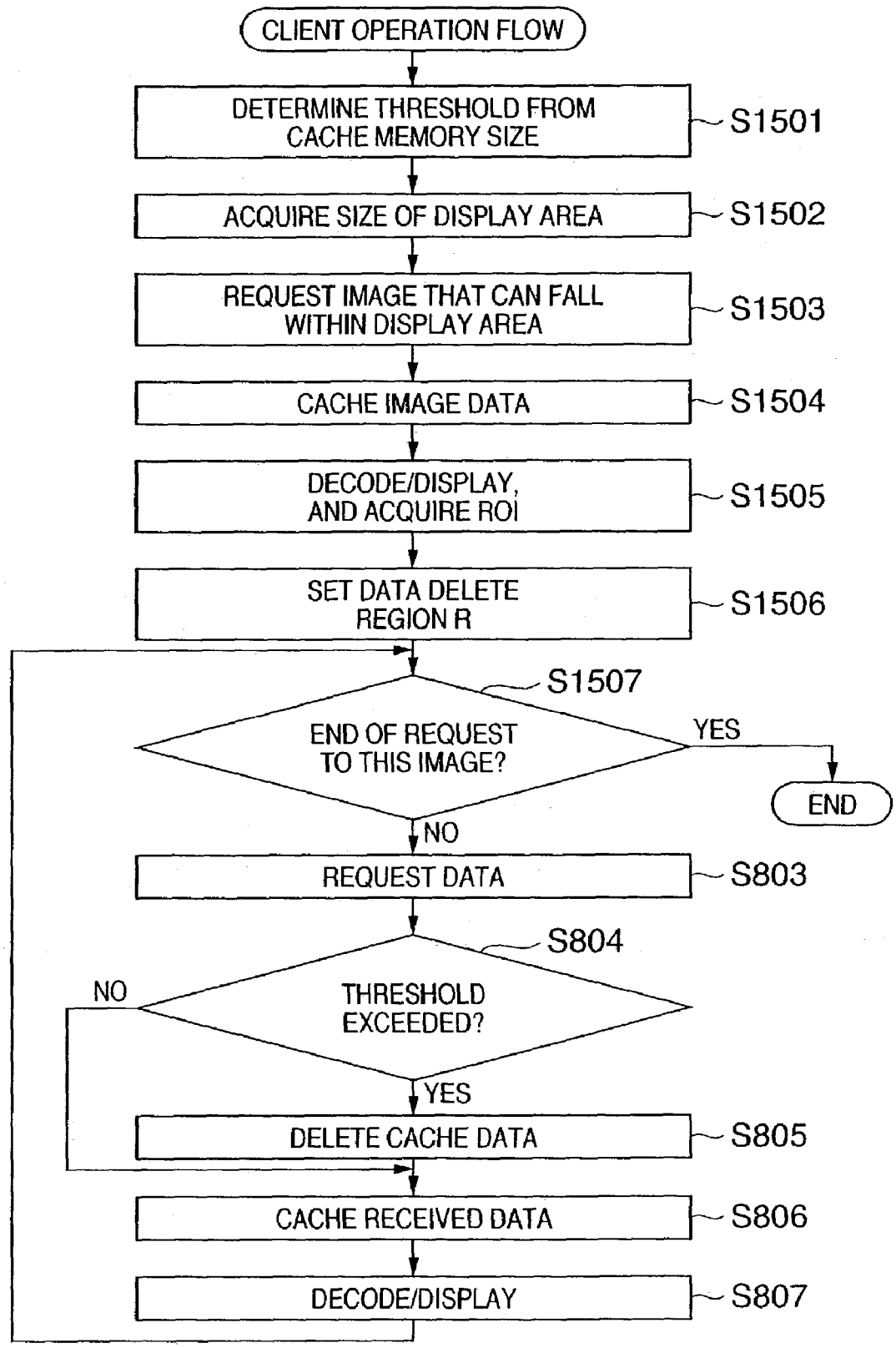
FIG. 15 is a flow chart for explaining a process in a client according to the third embodiment of the present invention.

The flow of the process in the client according to the third embodiment will be described below using the flow chart in FIG. 15.

In the third embodiment, assume that each original image stored in the server 502 has a maximum resolution size of 2048×2048 [pixels], and is segmented into 64 (=8×8) tiles, each of which has the number of components=3 and resolution levels 0 to 3, i.e., has hierarchies corresponding to four resolution levels (image sizes), and is divided into two layers, as in the first and second embodiments. Respective tiles are assigned sequential numbers in turn from the upper left tile, as shown in FIG. 6A. Therefore, the server 502 saves data 701 in FIG. 7.

The third embodiment is different from the first and second embodiments described above in only a process that acquires an ROI region from a decoder to determine the delete region R. Hence, the same step numbers in the flow chart of FIG. 15 that shows the operation of the client 501 of the third embodiment denote the steps that execute the same operations as in the flow chart in FIG. 8 above, and a description thereof will be omitted. Since the hardware arrangement and data structure in the third embodiment are the same as those in the first embodiment, a description thereof will be omitted.

In step S1501, the memory size of the client 501 is acquired to determine the threshold value used to check if cache data is to be deleted, as in step S802 in the first and second embodiments. That is, the memory size used to cache the currently received JPEG2000 packet data is determined. For example, if the memory size is 3 Mbytes, 2 Mbytes are set as the threshold value of the cache for this image. In step S1502, the size of an image display area of the client 501 is acquired. In step S1503, the client requests the server 502 to send data which form an image of a resolution that has a size falling within the display area. For example, if the image display area acquired in step S1502 is 512×512 pixels, an image 605 of resolution level 1 in FIG. 6C can fall just within this area, the client requests data which form resolution level 1. The flow advances to step S1504, and the client receives and saves image data sent from the server 502 in response to the request in step S1503. Therefore, when the client requests an image of layer 2 as the maximum SNR of resolution level 1, the main header 703 of an image, tile headers 707 of respective tiles, image data of resolution level 0 and layer 2, and image data of resolution level 1 and layer 2 of respective tiles shown in FIG. 7 are cached.

The flow advances to step S1505 to decode and display an image on the basis of the data obtained in response to the request in step S1503, and to specify the position of an ROI region. Since region information of ROI is not stored as independent information in encoded data, the ROI region can be determined only after the encoded data is decoded using a JPEG2000 decoder. By executing such decoding process for each tile, it can be determined if that tile includes an ROI region. Since the client requests resolution data that allows the entire image to be displayed within the display area in step S1503, the entire image is decoded once, and the position of the ROI region can be specified at that time.

Figure 16A:
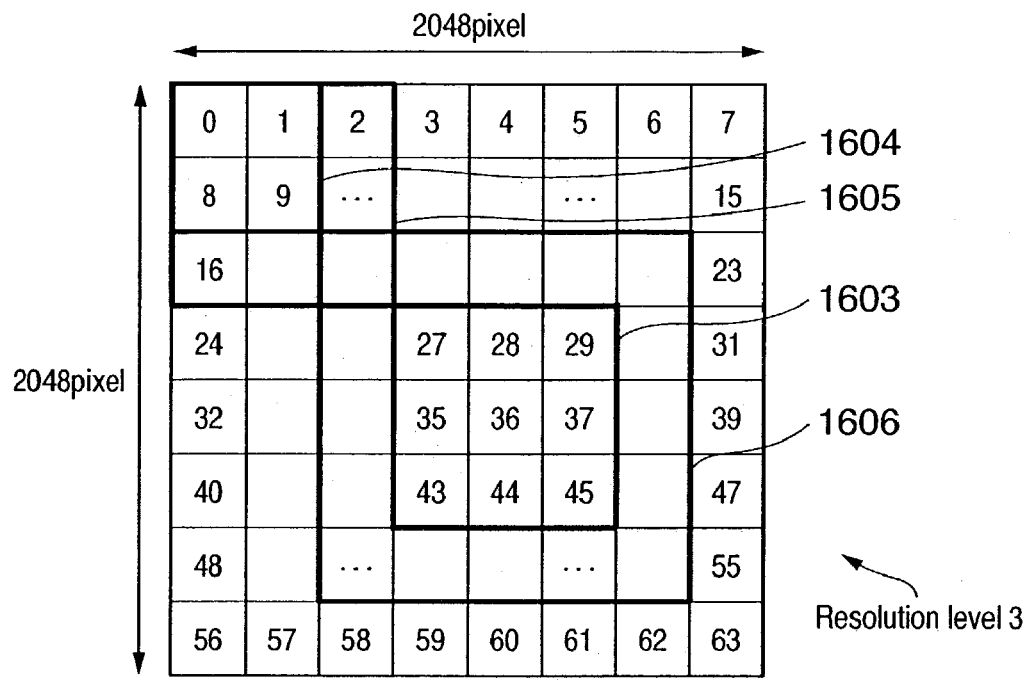
FIGS. 16A to 16D depict an example of JPEG2000 resolution scalability, a region of interest, and a delete region according to the third embodiment.
Figure 16B:
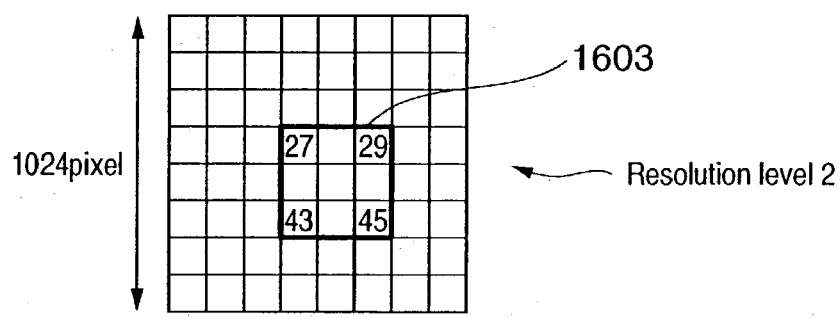
Figure 16C:
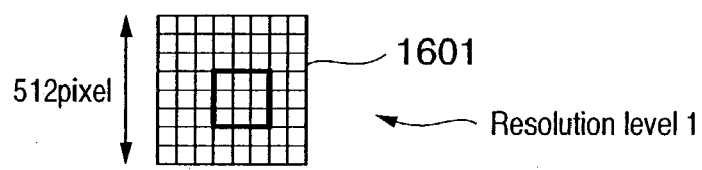
Figure 16D:

For example, as shown in FIG. 16A, a region 1603 which is formed of nine tiles, the four corners of which are bounded by tiles with numbers "27", "29", "43", and "45", is specified as the ROI region. In step S1506, a delete region R of cache data is set. In the third embodiment, since cache data in the ROI region are left, and other data are deleted, a tile group other than tiles that include the ROI region obtained in step S1505 is set as the delete region R. However, if a portion other than the ROI region corresponds to a region of interest of user's choice, that region is excluded from the delete region R. For example, if the user browses a region 1604 including upper left four tiles of an image of resolution level 3 in FIG. 16A in an enlarged scale, four tiles with numbers "0", "1", "8", and "9" are excluded from the delete region R.

In consideration of user's scroll operation, a the region 1604 of interest, or a region 1605 or 1606 including a tile group outside the ROI region 1603 is determined as a region to be cached, and a tile portion except for that region is set as the delete region R. It is determined in step S1507 if the client 501 has completed browsing of this image. If browsing of this image is completed, this flow ends. If a browsing request still remains, the flow advances to step S803. In step S803 and subsequent steps, the same operations as in the first embodiment are executed.

The method of acquiring the ROI region is not limited to that of this flow. For example, in the third embodiment, since the client 501 requests to display the entire image on its display unit in step S1503, tiles where the ROI region is present in the entire image are consequently determined by decoding the entire image once in step S1505. However, a partial region of the image may be displayed initially. In such case, by decoding respective tiles of the partial region, it can be determined if each tile of the displayed partial region includes the ROI region, and cache data can be deleted using this information.

As a delete unit of data, either the method of deleting data other than packet data which form resolution level 0 and layer 1 for respective tiles as in the first embodiment, or the method of dropping data in the delete region R little by little in turn from those of higher resolution or SNR as in the second embodiment, may be implemented.

Also, as for the cache method in the first, second, and third embodiments, a method of caching data is not particularly limited as long as cached packet data can be individually deleted. However, regardless of the cache method used, data must be physically deleted from the memory since the cache size need be suppressed to fall within a limit range.

Figure 17:
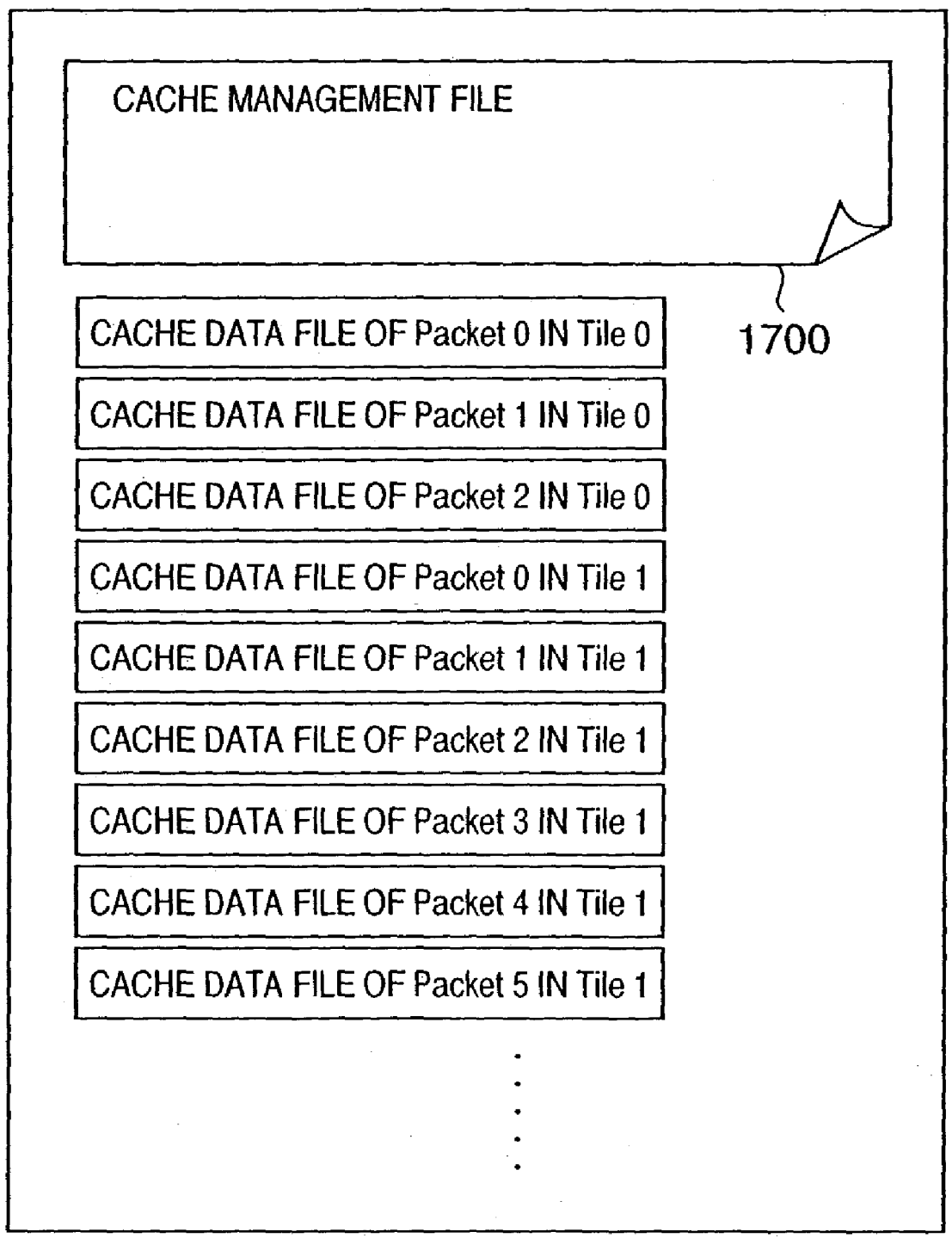
FIG. 17 depicts a view for explaining an example wherein cache data files are generated for respective cache data to be deleted.

FIG. 17 is a view for explaining an example wherein cache data files are created for respective delete units.

As shown in, e.g., FIG. 17, a file is created for each data delete unit such as a tile, packet, code-block, or the like, and a management file 1700 that manages such files is also created. Upon deleting data, a method of deleting a file which caches data to be deleted, and then updating the management file 1700 may be used. In such cache method, it is easy to physically delete data from the memory.

Figure 18B:
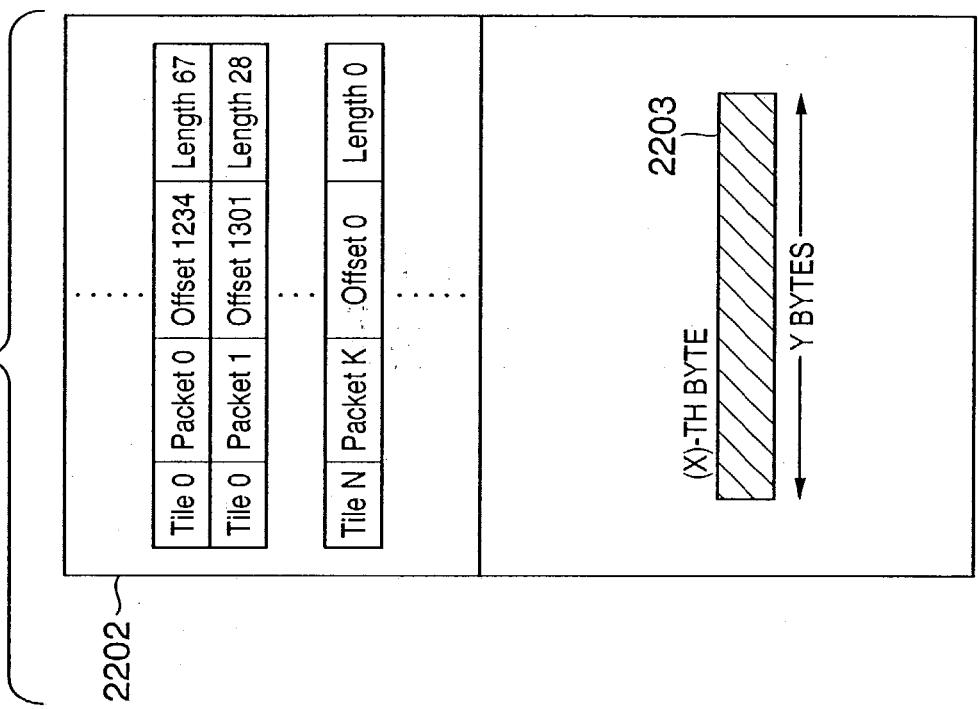
FIGS. 18A and 18B depict views for explaining an example wherein a plurality of delete unit data are cached in a single cache file.
Figure 18A:
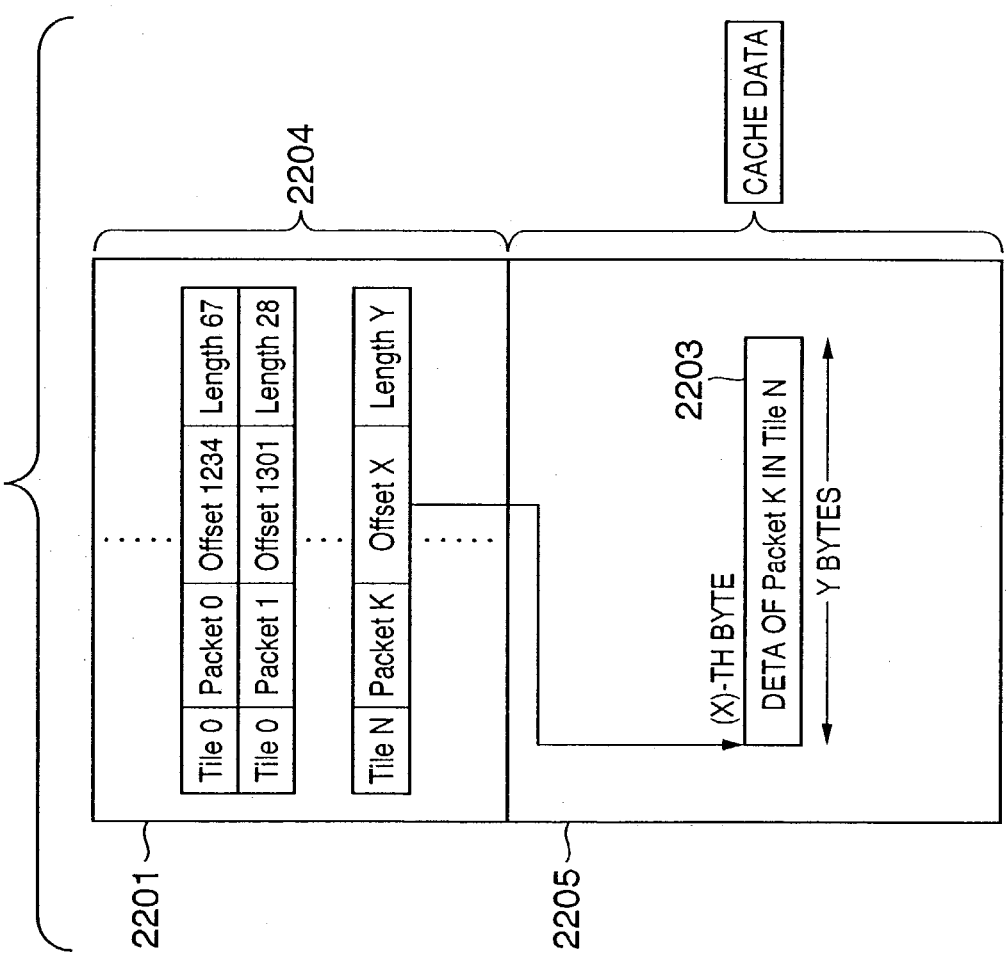

FIGS. 18A and 18B are views for explaining an example wherein a plurality of delete unit data are cached in a single cache file. FIG. 18A shows a state before deletion of data "Packet K" in "Tile N", and FIG. 18B shows a state after deletion.

In FIGS. 18A and 18B, reference numerals 2201 and 2202 denote cache files; numeral 2204 denotes cache management data of the cache file 2201; and numeral 2205 denotes cache data managed by the cache management data 2204. In this case, a plurality of data units to be deleted such as a tile, packet, code-block, and the like are saved together in a single cache file. In this case, since cache data are managed using a single cache file, data management is facilitated, but a space which is physically left after cache data is erased (e.g., a space 2203 in the cache file 2202 in FIG. 18B) must be filled. That is, in the example shown in FIG. 18B, subsequent data must be shifted forward by Y bytes corresponding to the space 2203 where data of Packet K in Tile N was saved.

FIG. 19 is a flow chart for explaining the cache data delete process in the cache file shown in FIGS. 18A and 18B.

In step S1901, the file name of a cache from which data is to be deleted is saved. In this case, for example, if the file name of a cache from which data is to be deleted is "abc.iip2k", that name is saved. The flow advances to step S1902 to create a Temp file (temporary file). This file is finally used as that after deletion of cache data, and a file with a temporary name such as "temp.iip2k", "abc_tmp.iip2k", or the like is created to avoid the same file name. In this case, a file with the name "temp.iip2k" is created. The flow advances to step S1903 to open the cache file from which data is to be deleted. The flow advances to step S1904 to acquire an offset value V to data to be deleted, and a length L of the data to be deleted. In the example in FIGS. 18A and 18B, since data of "Packet K" in "Tile N" is to be deleted, V=X (bytes) and L=Y (bytes) are held. The flow advances to step S1905 to copy V-byte data from the head of the cache file to the Temp file from the head of the Temp file. Hence, data including the cache management data 2204 is copied to the Temp file. The flow advances to step S1906 to copy data from that at the (V+L)-th byte position to the end of the cache file to the end of the Temp file. The flow advances to step S1907 to close both the Temp and cache files. The flow advances to step S1908 to delete the cache file. Therefore, at this time, the file "abc.iip2k" is deleted, and the file "temp.iip2k" is saved. The flow then advances to step S1909 to change the name of the Temp file to the cache file name saved in step S1901. In this embodiment, "temp.iip2k" is changed to "abc.iip2k" in this step. As a result, the file size can be physically reduced.

When this method is adopted, two files nearly the same sizes are present in the cache memory in step S1907 even temporarily. Therefore, upon determining the threshold value based on the cache memory size in step S802 in FIG. 8, the threshold value nearly half the available memory size must be set in consideration of the above point. Various other cache creation methods are available, but a description thereof will be omitted, since they are not the gist of the present invention.

Fourth Embodiment

An arrangement according to the fourth embodiment of the present invention will be described below. In the fourth embodiment, assume that each original image stored in the server 204 (FIG. 2) has a maximum resolution size of 3840×3840 [pixels], and is segmented into 255 (=15×15) tiles, each of which has the number of components=3 and resolution levels 0 to 3, i.e., has hierarchies corresponding to four image size directions, and is divided into two layers.

FIGS. 20A to 20D depict views for explaining the data structures of respective hierarchies of an original image.

Figure 20A:
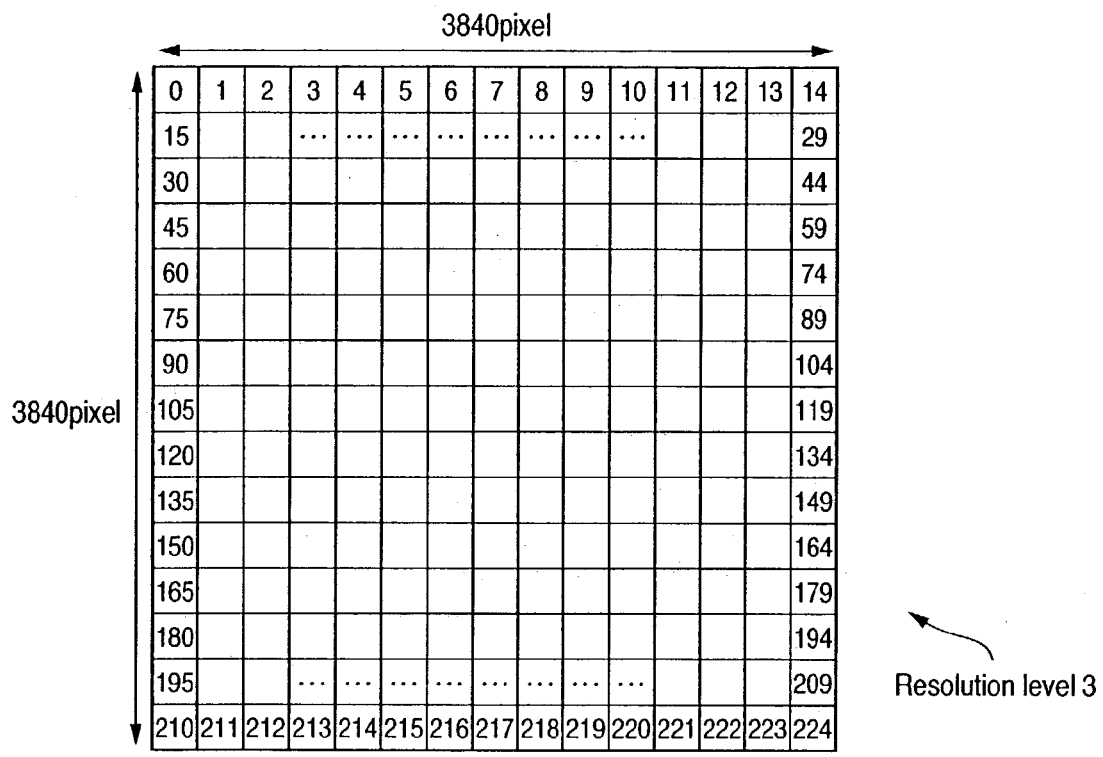
FIGS. 20A to 20D depict views for explaining the data structures of respective hierarchies of an original image according to the fourth embodiment of the present invention.

As shown in FIG. 20A, respective tiles which form the original image are assigned sequential numbers in turn from the upper left tile. Hence, the server 204 saves data 701 in FIG. 7.

Figure 20B:
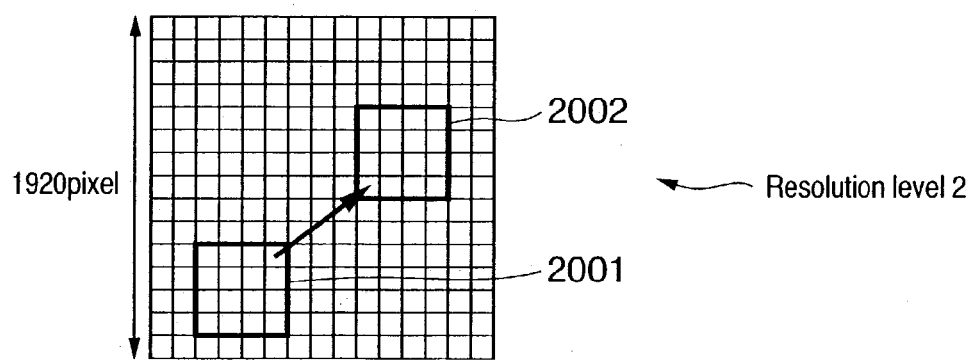
Figure 20C:
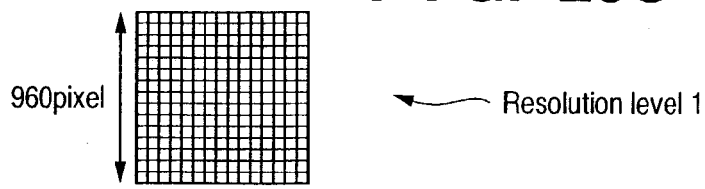
Figure 20D:

Assume that the user issues the first display request to display the entire image with resolution level 1 and maximum SNR, and then issues the second display request to display a part of the image in an enlarged scale, i.e., a region 2001 in FIG. 20B with resolution level 2 and maximum SNR. Also, all these data are cached.

Figure 21:
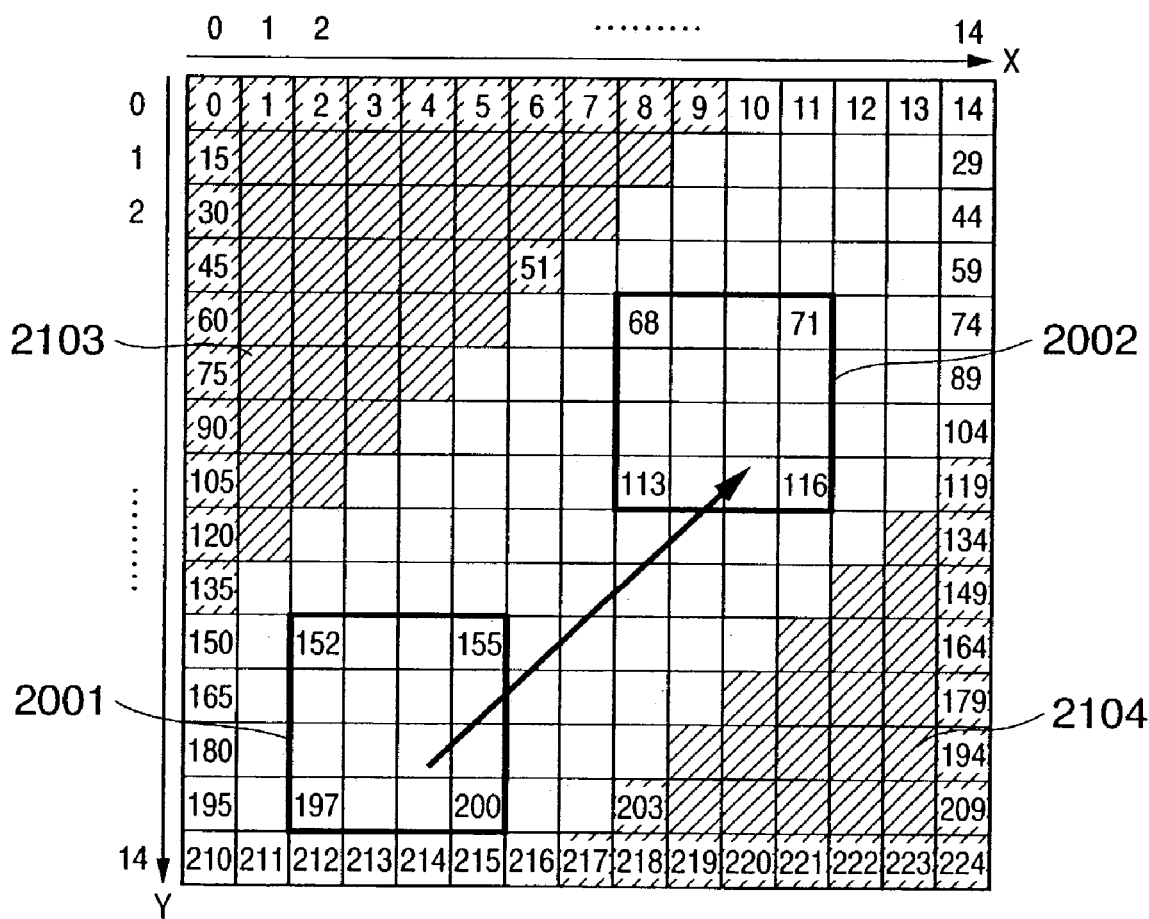
FIG. 21 shows the structure of resolution level 2 in FIG. 20B.

FIG. 21 shows the structure of resolution level 2 in FIG. 20B.

Figure 22A:
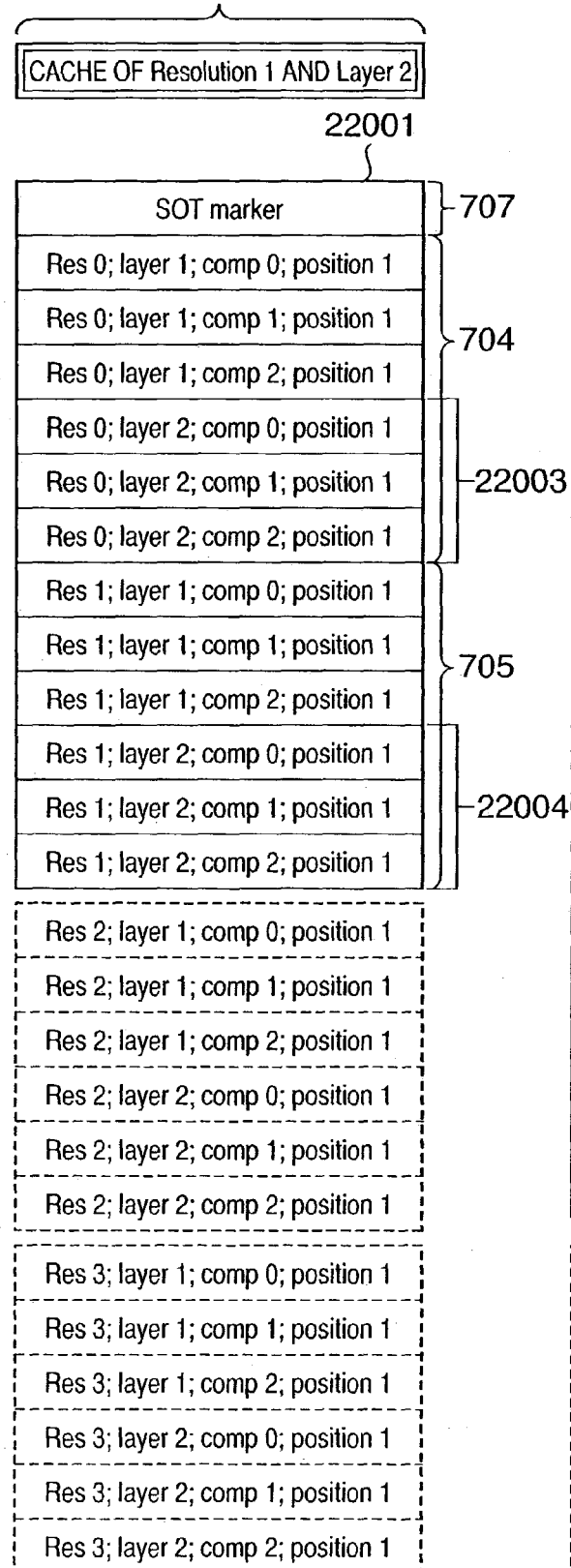
FIGS. 22A and 22B depict views for explaining an example of cache data of tiles in a client according to the fourth embodiment.
Figure 22B:
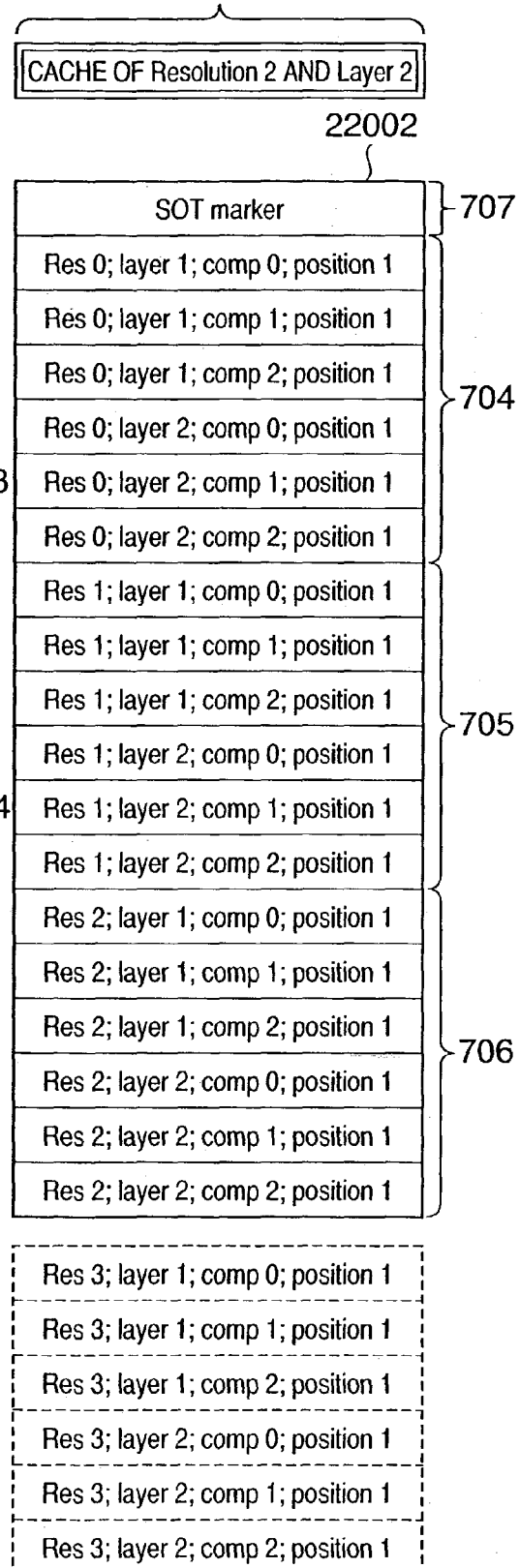

A cache of the user 201 (202) has already saved data 703 of the main header, packet groups 704 and 705 which form resolution levels 0 and 1 of all tiles, and a packet group 706 which forms resolution level 2 of 16 tiles 152 to 155, 167 to 170, 182 to 185, and 197 to 200 included in the region 2001, of the image shown in FIG. 7. That is, data indicated by 22002 in FIG. 22B are cached for 16 tiles included in the region 2001, and data indicated by 22001 in FIG. 22A are cached for other tiles. In this state, the user issues the third display request to display a region 2002 by scrolling the image from the region 2001. That is, the user requests to display the region 2002 with resolution level 2 and maximum SNR, i.e., layer 2.

Figure 23:
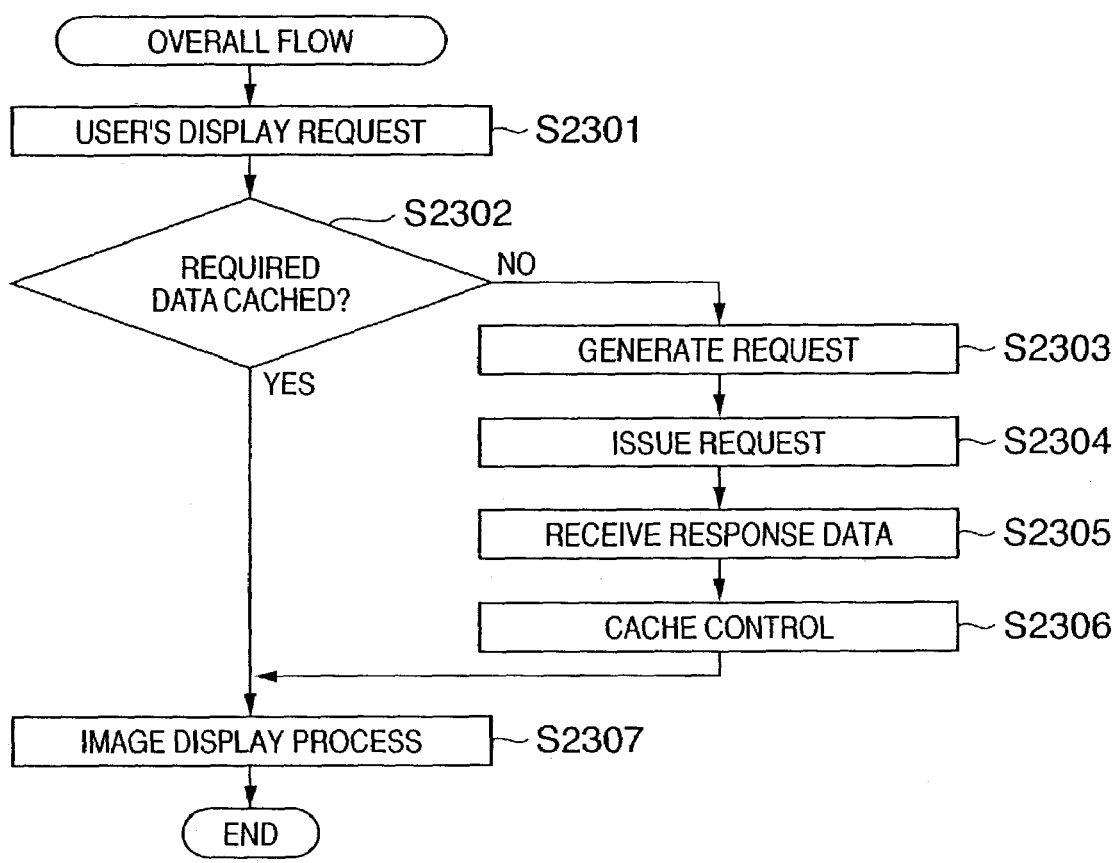
FIG. 23 is a flow chart for explaining the flow of processes of the entire network system according to the fourth embodiment.

FIG. 23 is a flow chart showing the flow of the process of the entire network system according to the fourth embodiment of the present invention. In the fourth embodiment, the system arrangement and data structure are the same as those in the above embodiments.

In step S2301, the display request issued by the operator of the user 201 is accepted. In the fourth embodiment, the operator has issued the display request to display the region 2002 shown in FIG. 20B with maximum SNR and resolution level 2. The flow advances to step S2302 to compare the display request accepted in step S2301 with cached data at that time so as to determine if data which can meet the display request are cached. If the cache has already contained all required data, the flow advances to step S2307 to display an image according to that display request.

However, if it is determined in step S2302 that the cached data cannot meet the display request, the flow advances to step S2303. In the fourth embodiment, since the region 2001 of FIG. 20B is displayed with the maximum resolution SNR and resolution layer 2 so far, the cache has cached the data 703 of the image main header, a data group 22002 in FIG. 22B for 16 tiles 152 to 155, 167 to 170, 182 to 185, and 197 to 200 included in the region 2001, and a data group 22001 in FIG. 22A for other tiles. Hence, in order to meet the display request acquired in step S2301, a packet group 706 which form resolution level 2 of 16 tiles 68 to 71, 83 to 86, 98 to 101, and 113 to 116 included in the region 2002 is deficient. For this reason, in step S2303 a request for requesting the server 204 to send such deficient data is generated. In the fourth embodiment, a request that requests the packet group 706 which forms resolution level 2 and layer 2 of the 16 tiles included in the region 2002 is generated in step S2303. The flow advances to step S2304 to issue the request generated in step S2303 to the server 204. In step S2305, response data (requested packet data group) from the server 204 is received. The flow advances to step S2306 to cache the data received in step S2305. The flow advances to step S2307 to execute the display process of an image using the data cached in this way, thus displaying the image requested in step S2301. In this way, upon completion of the process shown in this flow, the region 2002 is displayed with resolution level 2 and layer 2 in the fourth embodiment.

[Data Deletion in Tile Unit]

Figure 24:
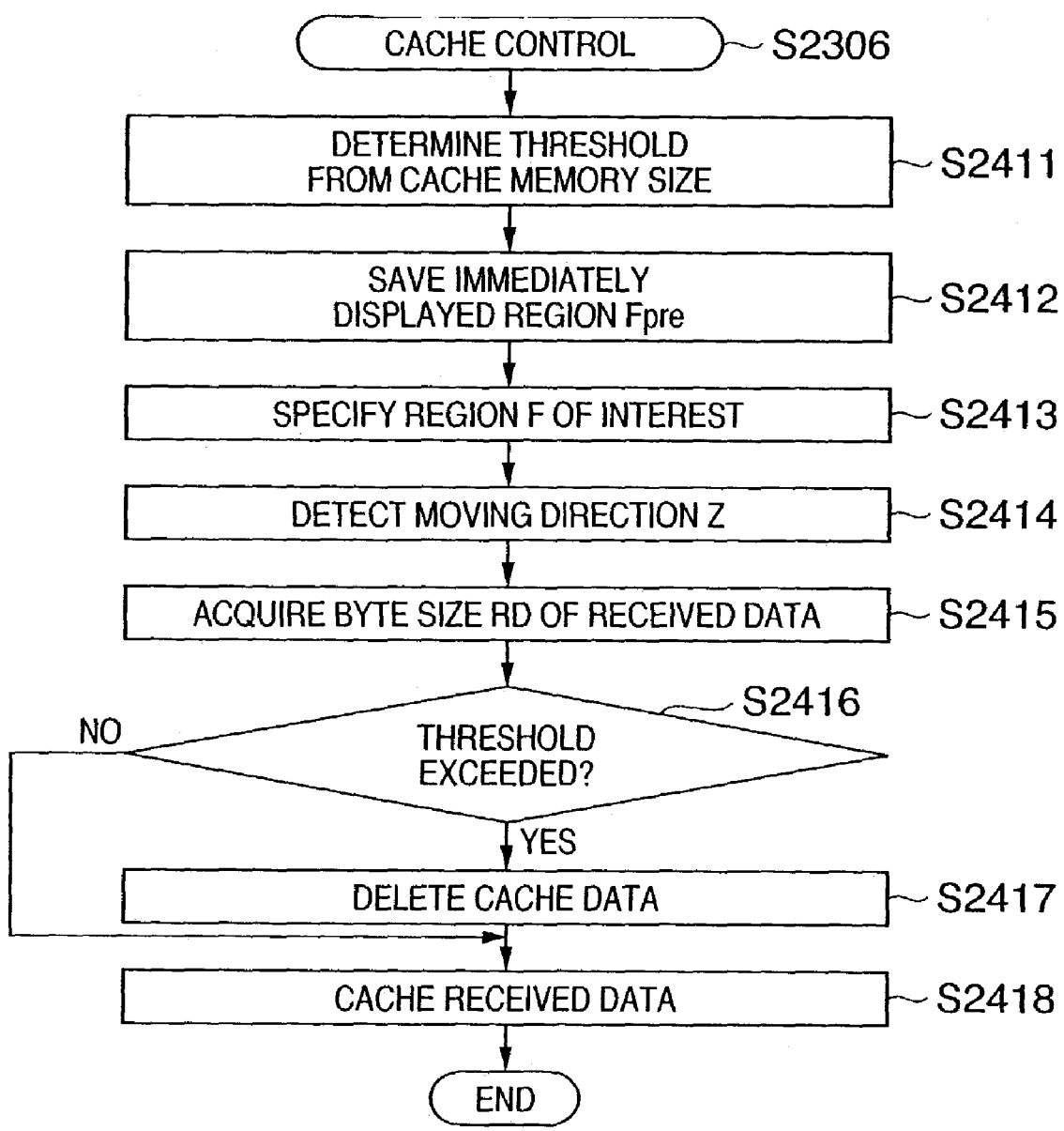
FIG. 24 is a flow chart showing a cache control process in step S2306 in FIG. 23 according to the fourth embodiment of the present invention.

The cache control process in step S2306 in FIG. 23 will be described below with reference to the flow chart of FIG. 24. FIG. 24 is a flow chart showing the cache control process in step S2306 in FIG. 23.

In step S2411, the memory size of the user 201 (202) is acquired to determine a threshold value used to determine if cache data is to be deleted. If the user (client) assigns 100% of an available memory size to a cache memory of fragmentarily received JPEG2000 encoded data, that threshold value becomes equal to the memory size of the cache memory. However, if data (e.g., meta information of an image or the like) other than the fragmentarily received JPEG2000 encoded data is to be saved in the single memory, the threshold value becomes smaller than the available memory size. Or when the single system caches a plurality of JPEG2000 encoded data, the threshold value of the memory size that can be used per image is set to be smaller than the available memory size. For example, 2 Mbytes of a 3-Mbyte memory size assigned to the cache memory are set as the threshold value of the cache.

Upon determining the threshold value of the cache, a secondary storage medium such as a hard disk or the like may be used. However, in the fourth embodiment, the threshold value is determined with reference to the memory size for the sake of simplicity.

The flow then advances to step S2412 to save a region Fpre displayed before the current data reception. In the fourth embodiment, since the user who displayed the region 2001 (FIG. 20B) of resolution level 2 has issued the display request to display the region 2002 by scrolling the image without changing the resolution level, the region Fpre corresponds to the region 2001.

The flow advances to step S2413 to specify a region to be displayed by the current data reception as a region F of interest. In the fourth embodiment, the region 2002 to be displayed after scrolling corresponds to this region F of interest. The flow advances to step S2414 to detect a moving direction Z on the basis of the previously displayed region Fpre and the region F of interest. As a method of detecting the-moving direction Z, various methods may be used (e.g., a method of checking the moving directions of four tiles of the previously displayed region Fpre and the region F of interest, a method of acquiring information of the moving direction using a mouse or the like by the user from an application, and so forth). However, since such methods are not essentially related to the principal object of the present invention, a description thereof will be omitted.

The flow advances to step S2415 to acquire a byte size RD [bytes] of fragmentary JPEG2000 encoded data to be received. In the fourth embodiment, the total data size of the packet group (FIG. 7) which forms resolution level 2 of the 16 tiles (FIG. 21) bounded by tiles 68, 71, 113, and 116 at the four corners of the region F of interest corresponds to number RD of bytes. The flow advances to step S2416 to determine whether the threshold value determined in step S2411 is exceeded upon caching the received data with the byte size RD acquired in step S2415. If it is determined that the threshold value is exceeded, the flow advances to step S2417; otherwise, the flow jumps to step S2418. This checking process can be implemented by comparing a value obtained by subtracting the already cached data size from the threshold value obtained in step S2411 with the byte size acquired in step S2415.

For example, if the threshold value determined in step S2411 is 2 Mbytes, and the already cached JPEG2000 packet data size is 1.95 Mbytes, a cacheable data size is 50 kbytes (=2 (Mbytes)−1.95 (Mbytes)). At this time, if the byte size RD of the data to be received acquired in step S2415 is 120 kbytes, since 50 kbytes<120 kbytes, it is determined that the threshold value is exceeded if the data to be newly received is directly cached, and the flow advances to step S2417. In step S2417, data are deleted from cache data for respective tiles so that the cache size becomes equal to or smaller than the threshold value even when the byte size acquired in step S2415 is cached. For example, if the byte size RD acquired in step S2415 is 120 kbytes, and the threshold value determined in step S2411 is 2 Mbytes, cache data are deleted in step S2417 until the cached data size becomes equal to or smaller than 1.88 Mbytes (=2 (Mbytes)−120 (kbytes)). The flow advances to step S2418 to cache the received data, thus ending this cache control process.

The cache data delete process in step S2417 in FIG. 24 will be described below with reference to the flow chart in FIG. 25.

In step S2521, a data size Yd to be deleted from the cache is acquired, and "0" is substituted in variable Del used to count the data size deleted by the current data delete process. In the fourth embodiment, since all data required to display the region 2001 have been cached, the cache saves the image main header data 703, the data 22002 (FIG. 22B) which form resolution level 2 and layer 2 of the 16 tiles included in the region 2001, and the data 22001 (FIG. 22A) which form resolution level 1 and layer 2 of all tiles other than the region 2001. If the total size of these data is 1.95 Mbytes, the threshold value is 2 Mbytes, and the received data size is 120 kbytes, the data size Yd to be deleted can be acquired as 70 kbytes (=1.95+0.12−2.00=0.07 (Mbytes)). That is, cache data of 70 kbytes or more must be deleted.

The flow advances to step S2522 to acquire a delete region R of data on the basis of the moving direction Z of the screen acquired in step S2414. This acquisition method will be described in detail later. In the fourth embodiment, assume that a triangular region 2103 which includes corner tiles 0, 9, and 135, and a triangular region 2104 including corner tiles 119, 217, and 224 are specified as the data delete region R, as shown in FIG. 21.

The flow advances to step S2523 to determine an order of data to be deleted for respective tiles included in the data delete region R acquired in step S2522. As the method of determining the order of data to be deleted, a method of assigning numbers in turn from tiles closer to the previously displayed region Fpre in the delete region R, a method of assigning numbers in turn from tiles farthest from the current region of interest in the delete region R, a method of assigning numbers in turn from the edge of the image to be parallel to the moving direction Z of the screen acquired in step S2414, and the like may be used. In the fourth embodiment, numbers are assigned based on the following three rules.

(1) If the delete region R is divided into two successive regions (e.g., the regions 2103 and 2104), smaller numbers are assigned to tiles included in one region having a larger area of the two delete regions than other region.

(2) In the successive region, smaller numbers are assigned to those in rows including a larger number of tiles.

(3) In each row, numbers are assigned in turn from the tile at the right or left edge of the image toward the interior of the image. That is, numbers are assigned in turn from the tile at the left edge to the right in the region 2103, and numbers are assigned in turn from the tile at the right edge to the left in the region 2104.

Therefore, upon comparing the regions 2103 and 2104 in FIG. 21, since the region 2103 includes 55 tiles and has a broader area than the region 2104 that includes 36 tiles, numbers are assigned in turn from the tiles in the region 2103. In the region 2103, the uppermost row includes the largest number of tiles, i.e., 10 tiles, and the number of tiles then decreases one by one like nine tiles, eight tiles, . . . , toward the lower rows. Therefore, numbers are assigned in turn from the uppermost row in the region 2103. By contrast, in the region 2104, numbers are assigned in turn from the tiles included in the lowermost row of the image. Furthermore, since numbers are assigned in turn from a tile included in the right or leftmost column in each row, numbers are assigned in turn from the tile at the left edge to the right in the region 2103, and from the tile at the right edge to the left in the region 2104. That is, upon adopting the number assignment method of the fourth embodiment, numbers are assigned in turn from the upper left tile of the region 2103 to the right, and are then assigned in turn from the lower right tile of the region 2104 to the left.

More specifically, tile T_del(1) with data delete order "1" is tile 0, and tile T_del(2) with data delete order "2" is tile 1. Likewise, T_del(10) is tile 9, T_del(11) is tile 15, . . . , T_del(19) is tile 23, T_del(20) is tile 30, . . . , T_del(28) is tile 45, . . . , T_del(35) is tile 60, . . . , T_del(41) is tile 75, . . . , T_del(46) is tile 90, . . . , T_del(50) is tile 105, . . . , T_del(53) is tile 120, . . . , T_del(54) is tile 121, T_del(55) is tile 135, T_del(56) is tile 224, . . . , T_del(63) is tile 217, T_del(64) is tile 209, . . . , T_del(71) is tile 194, T_del(77) is tile 179, . . . , T_del(82) is tile 164, . . . , T_del(86) is tile 149, . . . , T_del(89) is tile 134, T_del(90) is tile 133, and T_del(91) is tile 119.

The flow advances to step S2524 to initialize variable $X_0$ used to count the order of data deletion by substituting "1" in it. The flow advances to step S2525, all cache data except for the tile header field data and packet data of resolution level 0 and layer 1 are deleted from cache data of tile $T\_del(X_0)$ with the delete order $X_0$. At this time, if cache data of $T\_del(X_0)$ contain only the tile header field data, and packet data of resolution level 0 and layer 1, no data can be deleted. In the fourth embodiment, if $X_0=1$ and T_del(1) =tile 0, since cache data of tile 0 are those indicated by 22001 in FIG. 22A, the packet group 705 which forms resolution level 1, and the packet group 22003 which forms resolution level 0 and layer 2 are deleted. The flow advances to step S2526 to add the data size deleted in step S2525 to variable Del that stores the total data size deleted in this data delete process. The flow advances to step S2527 to compare the data size Del deleted in this delete process with the data size Yd to be deleted in this data delete process. If the actually deleted data size (Del) has been equal to or exceeded the data size Yd to be deleted, this flow ends. On the other hand, if not so, the flow advances to step S2528 to increment the delete number $X_0$ by 1 to the next delete number. In this case, for example, if the data size to be deleted is 70 kbytes, and the data size deleted from tile T_del(1) with the delete number "1" is 50 bytes, since the value of the deleted data size Del is 50 bytes in step S2526, Yd=70 kbytes>Del=50 kbytes in step S2527, and the flow advances to step S2528 to increment the delete order $X_0$ by 1 to "2". The flow then returns to step S2525 to execute the delete process of T_del(2)=tile 1.

Figure 25:
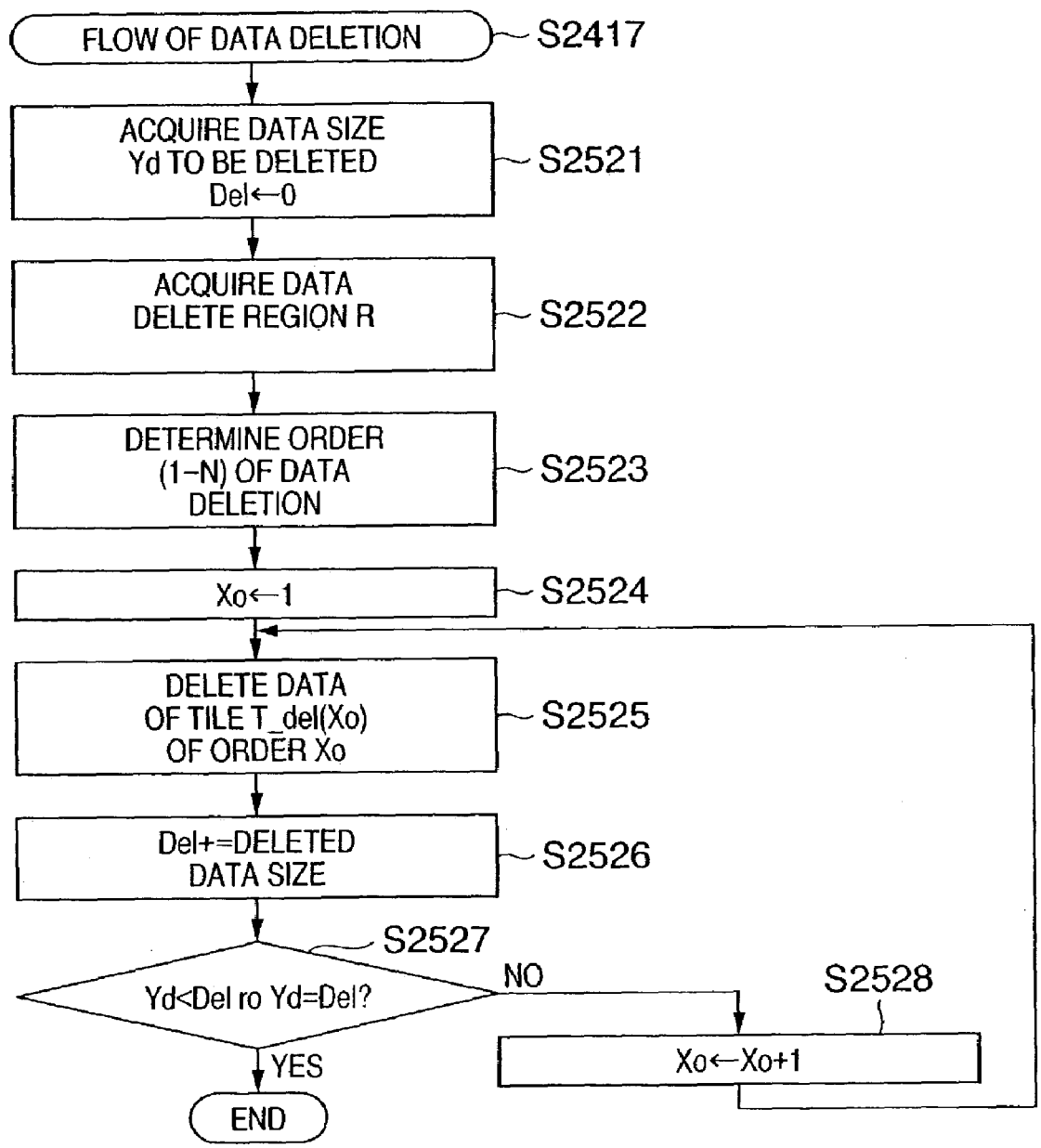
FIG. 25 is a flow chart showing a data delete process in step S2417 in FIG. 24.

FIG. 26 is a flow chart for explaining the process for acquiring the data delete region R in step S2522 in FIG. 25.

In step S2631, a slope delta of the moving direction with reference to tiles is calculated on the basis of the moving direction Z of the screen acquired in step S2414 in FIG. 24. In the fourth embodiment, a coordinate system with reference to tiles is assumed so that the upper left tile of an image is set as an origin, the X-value increases to the right, and the Y-value increases to the bottom. If the moving direction Z acquired in step S2414 is a value in units of tiles, delta can be calculated by dividing the number of tiles moved in the Y-direction by that in the X-direction. On the other hand, if the moving direction Z acquired in step S2414 is a value in units of pixels, such value is converted into the number of tiles to calculate delta. In the fourth embodiment, movement from the region Fpre 2001 to the region F 2002 yields delta=−1.

The flow advances to step S2632 to acquire information indicating if the delete region R consists of one or two successive regions. If the display region moves along the four sides of the image, the number R_Num of successive regions is "1". Since movement of the display region in other directions divides an image into two regions, the value R_Num is "2". In the fourth embodiment, R_Num=2.

Figure 27A:
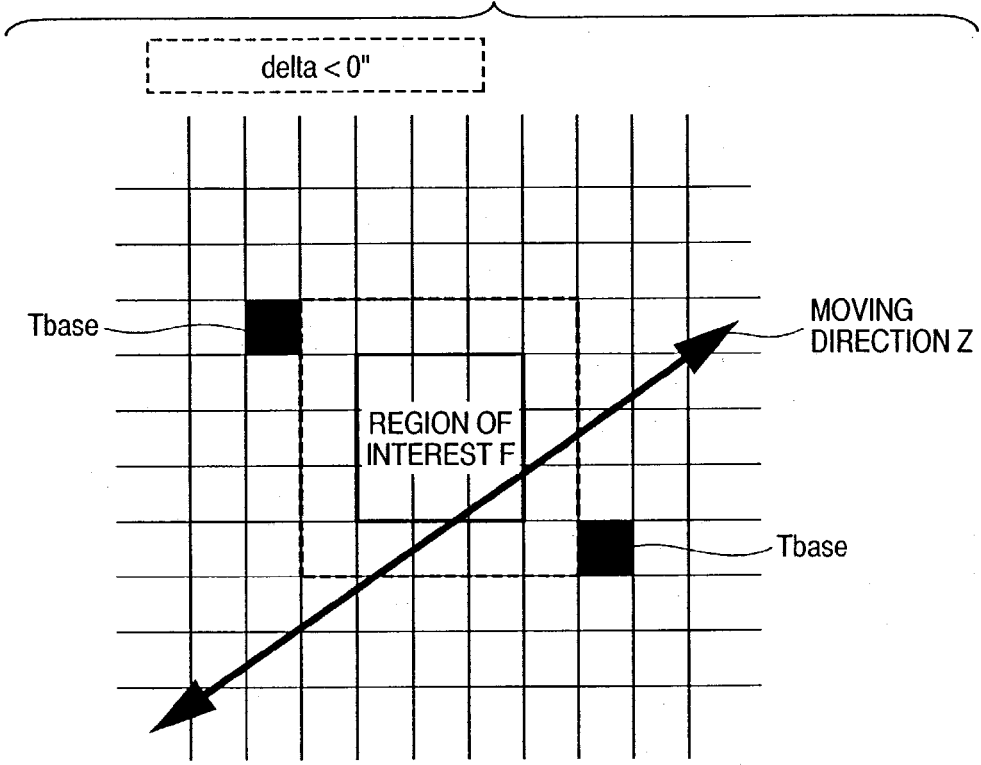
FIGS. 27A and 27B depict views showing the relationship among region F of interest, moving direction Z, and tiles Tbase serving as a reference for a boundary line of a delete region in the fourth embodiment of the present invention.
Figure 27B:
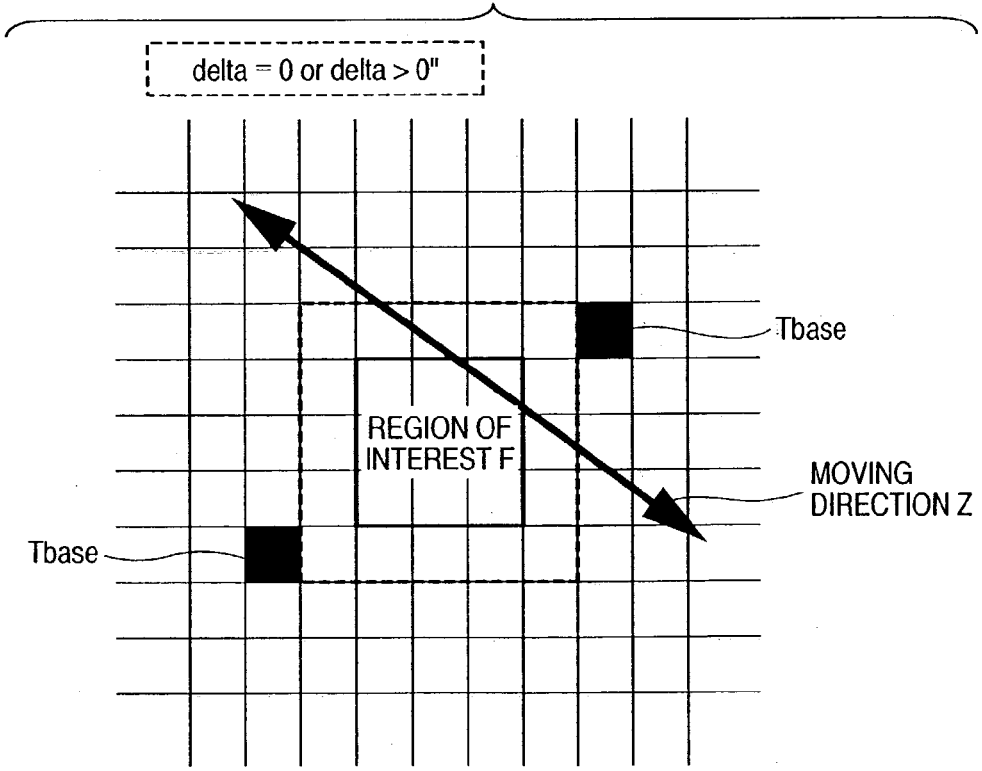

The flow advances to step S2633 to select tiles Tbase outside the region F of interest, which tiles serve as a reference upon obtaining the boundary lines of the delete regions R. In the fourth embodiment, since the delete regions R are defined to contact a region obtained by expanding the region F of interest by one tile, tiles immediately outside those corresponding to corners of a rectangular region obtained by expanding the region F of interest by one tile in the X-direction are selected as reference tiles Tbase, as shown in FIGS. 27A and 27B. The tiles selected at that time have the following relationship with the slope delta calculated in step S2631, as shown in FIGS. 27A and 27B.

If the value delta is negative, tiles Tbase are set with reference to the upper left and lower right tiles of a region obtained by expanding the region F of interest.

If the value delta is "0" or positive, tiles Tbase are set with reference to the upper right and lower left tiles of a region obtained by expanding the region F of interest.

In the fourth embodiment, since delta=−1<0, tiles 51 (X=6, Y=3) and tile 133 (X=13, Y=8) shown in FIG. 21 are selected as Tbase. The flow advances to step S2634 to calculate equations Eq of the boundary lines of the delete regions R using delta obtained in step S2631 and Tbase obtained in step S2633. Since this equation of each boundary line is calculated in the same as the equation of a straight line, if (Xbase, Ybase) represents the coordinate position of Tbase, it is given by:

$$Y = delta \times X + (Ybase - delta \times Xbase)$$

Since boundary equations Eq are obtained in correspondence with the number R_Num of successive regions in the delete region R obtained in step S2632, a number "1" or "2" is assigned to each equation.

In the fourth embodiment, since delta=−1 and Tbase=(6, 3), (13, 8), the following two equations Eq(1) and Eq(2) are obtained:

$$Y = -X + 9 \ldots \text{when Tbase is tile 51 } (X=6, Y=3) \quad \text{Eq(1)}$$

$$Y = -X + 21 \ldots \text{when Tbase is tile 133 } (X=13, Y=8) \quad \text{Eq(2)}$$

The flow then advances to step S2635 to acquire the number Vnum of tiles in the vertical direction of the image.

In the fourth embodiment, since 15 tiles line up vertically, Vnum=15. The flow advances to step S2636 to initialize variable Nv used to count a row number, which is to undergo a calculation of a value, by substituting "0" in it. Furthermore, in step S2636 the (R_Num)-th equation Eq(R_Num) is acquired from the boundary equations calculated in step S2634. The flow advances to step S2637 to calculate the number of tiles included in the delete region R at the (Nv)-th row position. That is, by calculating the number of tiles bounded by Eq(R_Num) that represents the boundary line of the delete region R and the boundary line of the entire image, the number of tiles in the delete region R, which are included in each row, is obtained.

In the fourth embodiment, using equation Eq(2) obtained in step S2634, and X=0, X=14, and Y=0, and Y=14 as boundaries, the number of tiles in each (Nv)-th row can be calculated. The flow then advances to step S2638 to determine whether a value obtained by incrementing variable Nv by "1" becomes equal to the number Vnum of tiles acquired in step S2635, thus determining if the number of tiles included in the delete region R has been calculated for all rows. If Nv=Vnum, since the number of all tiles included in one successive region of this delete region R has been calculated, the flow advances to step S2639. If the value obtained by incrementing Nv by "1" is smaller than Vnum in step S2638, it is determined that rows to be checked still remain, and the flow returns to step S2637. In step S2639, "1" is subtracted from the number R_Num of successive regions of the delete region R, and the flow advances to step S2640 to check if the number R_Num of successive regions is "0". If variable R_Num is "0", it is determined that evaluations using equations Eq of all boundary lines calculated in step S2634 have been done, and this flow ends.

On the other hand, if it is determined in step S2640 that the number R_Num of successive regions is not "0", it is determined that boundary equation Eq to be evaluated still remains, and the flow returns to step S2636. In the fourth embodiment, since the number R_Num of successive regions is "2", the region 2104 formed by boundary line equation Eq(2) is obtained as a part of the delete region R by evaluation of steps S2636 to S2638. After that, the flow advances to step S2639 to obtain the number R_Num of successive regions="1", and the flow returns to step S2636. Hence, the region 2103 formed by boundary line equation Eq(1) is also obtained as a part of the delete region R. Then, the number R_Num of successive regions becomes "0" in step S2639, and it is determined in step S2640 that this process ends.

Figures 28A, 28B:
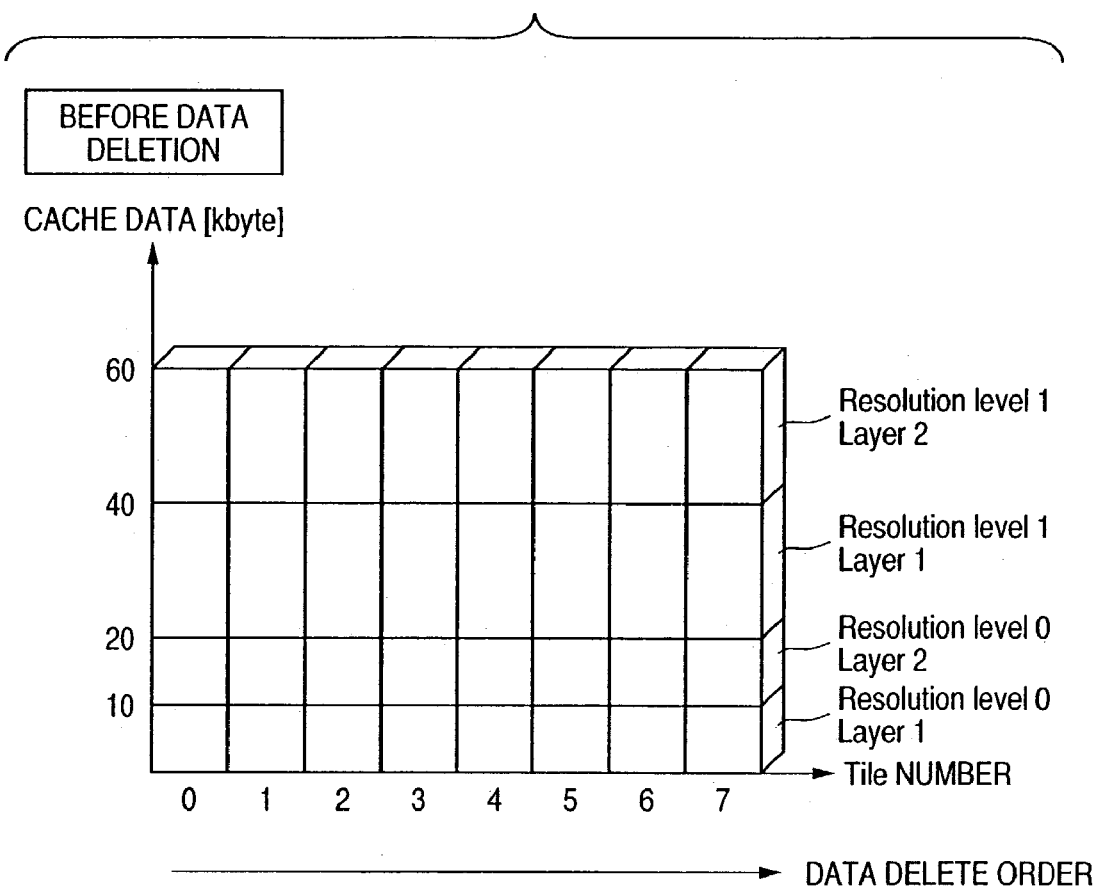
FIGS. 28A and 28B show an example of cache data in a delete region R before data deletion.

Therefore, if the data sizes of packets of tiles 0 to 7 are:
resolution level 1, layer 2 . . . 20 kbytes
resolution level 1, layer 1 . . . 20 kbytes
resolution level 0, layer 2 . . . 10 kbytes
resolution level 0, layer 1 . . . 10 kbytes the state of cache data before deleting cache data in tiles 0 to 7 is as shown in FIGS. 28A and 28B, in the fourth embodiment. That is, data of 50 kbytes per tile is deleted at a time (a total of data of resolution level 1, and resolution level 0 and layer 2). When cache data of 120 kbytes is to be deleted, since delete order "1" of tiles is tile 0, delete order "2" is tile 1, delete order "3" is tile 2, . . . , data of 150 kbytes (=50×3: packet data of tiles 0, 1, and 2) is deleted, and a state 2901 in FIG. 29A is obtained after deletion of cache data.

By adopting such data delete method, the following effects are obtained.

(a) Data of tiles of a partial region corresponding to the region of interest, which is important in current display, are preserved.

(b) Since data of a direction that connects the region previously displayed by the user, and a region which is designated by a new display region by the user by scrolling the image, is held, even when the image region that the user is interested in is broadened in the same direction as the current moving direction, the data size to be newly acquired can be reduced.

(c) Even when the previously displayed region is to be displayed again, it can be quickly displayed since its data is preserved.

(d) Since packet data other than data of resolution level 0 and layer 1 with the smallest data size are deleted at a time for each tile, a large free space can be formed per deletion, and the load imposed by the calculations of the deleted data size can be reduced.

(e) Since data of resolution level 0 and layer 1 of each tile are held without being deleted, all tiles have at least those data as long as they are displayed once. Hence, if the user requests an image of higher resolution, an image decoded from the held data can be temporarily displayed in an enlarged scale, and an image of a given tile portion can be prevented from being not displayed for a while after the image display request of that portion.

(f) An image that allows the user to recognize the whole image can be quickly displayed.

The data delete order is not limited that described in this embodiment, and other orders may be used.

The position of a reference tile used to obtain the boundary line of each delete region is not limited to that described in this embodiment, and other tiles may be used as reference tiles.

In this embodiment, the delete region is specified by tiles for the sake of simplicity. Also, precincts and code-clocks can be used to delete cache data on the basis of the same concept as in the present invention. In case of precincts, a data delete unit corresponds to packets as in tiles. In case of code-blocks, a data delete unit corresponds to encoded data consisting of sub-bands which form data of that code-block.

Fifth Embodiment

In the fourth embodiment, regions which fall outside a direction that connects the region immediately displayed by the user and a region designated by the user as a new display region by scrolling an image are designated as the delete regions R, the delete order is assigned to tiles in these regions, and all packet data except for data of resolution level 0 and layer 1 are deleted from cache data of tiles selected one by one according to the delete order. However, a method of reducing the data size by dropping the total SNR or resolution of all tiles included in the regions in place of all packet data except for data of resolution level 0 and layer 1, which are contained in cache data of a tile specified as a tile to be deleted, may be used. In this case, processes different from those in the fourth embodiment described above are step S2525 and subsequent steps in the flow of the data delete process shown in FIG. 25.

Figure 30:
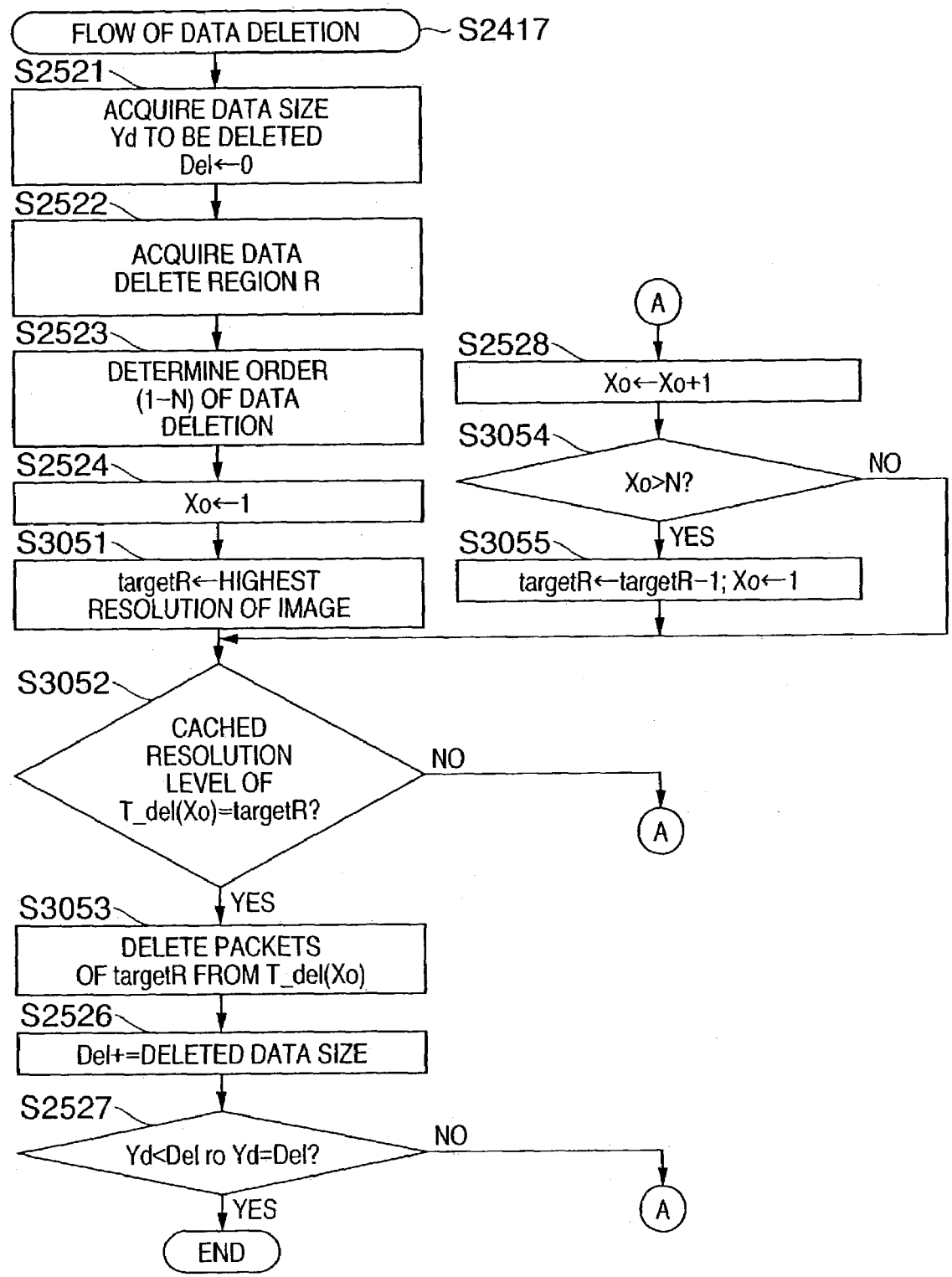
FIG. 30 is a flow chart showing a cache data delete process in the fifth embodiment of the present invention.

FIG. 30 is a flow chart showing the cache data delete process according to the fifth embodiment of the present invention, and the same step numbers in FIG. 30 denote the steps which execute the same operations as in FIG. 25. Since steps S2521 to S2524 are the same as those in the fourth embodiment, a description thereof will be omitted.

In step S3051, the highest resolution level of an original image is substituted in variable targetR that holds resolution level which is to undergo data deletion. The highest resolution level of the original image can be easily obtained by analyzing the image main header data 703, which has already been received and cached. In the fifth embodiment, since the original image is formed of resolution levels 0 to 3, "3" is substituted in targetR. The flow advances to step S3052, and the highest resolution level of data cached in association with tile T_del($X_0$) to be deleted is compared with the value targetR. As a result of comparison, if the highest resolution level of data cached in association with tile T_del($X_0$) to be deleted is equal to the value targetR, the flow advances to step S3053; otherwise, the flow advances to step S2528.

In the fifth embodiment, when $X_0$=1 and T_del(1)=tile 0, the cache data 22001 (FIG. 22A) of tile 0 are checked to compare its highest resolution level 1 with targetR. At this time, since targetR=3, the flow advances to step S2528. In step S2528, delete order $X_0$ is incremented by "1" to acquire the next data delete order. The flow advances to step S3054 to compare the value $X_0$ with the number N of tiles included in the delete region, i.e., last number N of the data delete order. If $X_0$>N, the flow advances to step S3055; otherwise, the flow advances to step S3052. In step S3055, targetR is decremented by "1", and variable $X_0$ used to count the delete order is initialized by substituting "1" in it.

In the fifth embodiment, assume that the aforementioned routine is repeated several times, and $X_0$=1, T_del(1)=tile 0, and targetR=1 are input to step S3052. The cache data of tile 0 have resolution level 1, as indicated by 22001 of FIG. 22A. For this reason, if targetR=1, the flow advances to step S3053 to delete packet data of targetR from tile T_del($X_0$) from which cache data are to be deleted. If targetR=0, a packet group which forms resolution level 0 and layer 1 is left, and packet data which form other layers are deleted in place of deleting all packet data that form resolution level 0.

In the fifth embodiment, if targetR=1 and T_del(1)=tile 0, the packet group 705 which forms resolution level 1 is deleted from the cache data 22001 of tile 0. In step S2526, the data size deleted in step S3053 is added to variable Del that counts the data size deleted in this data delete process. In step S2527, the data size Del deleted in this delete process is compared with the data size Yd to be deleted in this data delete process. If the actually deleted data size has become equal to or exceeded the data size Yd to be deleted, this flow ends. On the other hand, if actually deleted data size has not been equal to or exceeded the data size Yd yet, the flow advances to step S2528.

Therefore, if the data sizes of packets of tiles 0 to 7 are:
resolution level 1, layer 2 . . . 20 kbytes
resolution level 1, layer 1 . . . 20 kbytes
resolution level 0, layer 2 . . . 10 kbytes
resolution level 0, layer 1 . . . 10 kbytes the state of cache data before deleting cache data in tiles 0 to 7 is as shown in FIGS. 28A and 28B, in the fifth embodiment. That is, since cache data is deleted in turn from data of resolution level 1, data of 40 kbytes per tile is deleted at a time. When cache data of 120 kbytes is to be deleted, since delete order "1" of tiles is tile 0, delete order "2" is tile 1, delete order "3" is tile 2, . . . , data of 120 kbytes (=40×3: packet data of tiles 0, 1, and 2) is deleted, and a state 2902 in FIG. 29B is obtained after deletion of cache data.

With the delete method according to the fifth embodiment, data are deleted in the resolution direction little by little from all tiles included in the delete region. Hence, even when a region included in the delete region R is browsed, many tile data included in that region are more likely to remain, and the size of packet data to be requested can be reduced.

The fifth embodiment has exemplified a method of deleting data in the delete region in the resolution direction. Also, substantially the same processes can be implemented by a method of deleting data in the SNR direction. In this case, processes that refer to the resolution level must refer to the layer instead. That is, the value of the highest layer of an original image is substituted in variable targetL which indicates the layer to be deleted in step S3051. This value can also be easily obtained by analyzing the cached image main header data 703. Furthermore, in step S3052 the cached highest layer is compared with the value targetL. In step S3053, data of the highest layer of tile TR_del is deleted. Upon deleting data from the data 22001 in FIG. 22A, packet groups 22003 and 22004 forming layer 2 are deleted.

Alternatively, substantially the same processes can be implemented when the data size to be deleted upon deleting data in the resolution level direction is compared with the data size to be deleted upon deleting data in the layer direction, and the delete method that can assure a larger data size to be deleted is selected. For example, if 12 packets 22001 (FIG. 22A) have been cached, when data are to be deleted in the resolution level direction, data 705 of six packet in FIG. 7 is deleted; when data is to be deleted in the layer direction, a total of six packets 22003 and 22004 in FIG. 22A are deleted. Hence, the data size of the six packets 705 in FIG. 7 is compared with that of a total of six packets 22003 and 22004 in FIG. 22A, and packets are deleted by the method that can assure a larger data size.

Also, in the fifth embodiment, the delete region is specified by tiles for the sake of simplicity. Also, precincts and code-clocks can be used to delete cache data on the basis of the same concept as in the present invention. In case of precincts, a data delete unit corresponds to packets as in tiles. In case of code-blocks, a data delete unit corresponds to encoded data consisting of sub-bands which form data of that code-block.

Furthermore, as for the cache method in the above embodiments, a method of caching data is not particularly limited as long as cached packet data can be individually deleted. However, regardless of the cache method used, data must be physically deleted from the memory since the cache size need be suppressed to fall within a limit range.

For example, as shown in FIG. 17 above, a file is created for each data delete unit such as a tile, packet, code-block, or the like, and a management file that manages such files is also created. Upon deleting data, a method of deleting a file caching data to be deleted, and then updating the management file may be used. In such cache method, it is easy to physically delete data from the memory.

Moreover, a method of saving a plurality of delete units such as a tile, packet, code-block, and the like in a single file together, as indicated by 2201 in FIG. 18A above may be used. In this case, since cache data are managed using a single file, data management is facilitated, but a space which is physically left after cache data has been deleted must be filled, as indicated by a space 2203 in a file 2202 in FIG. 18B. Hence, in the example shown in FIGS. 18A and 18B, subsequent data must be shifted forward by L_nk bytes corresponding to the space 2203 where data of Packet K in Tile N was saved. For this purpose, data must be copied to shift the data.

The flow of the data delete process at that time is the same as that in the flow chart in FIG. 19 above, and a description thereof will be omitted.

Sixth Embodiment

The sixth embodiment of the present invention will be described below. In the sixth embodiment, assume that each original image stored in the server 204 (FIG. 1) has a maximum resolution size of 2048×2048 [pixels], and is segmented into 64 (=8×8) tiles, each of which has the number of components=3 and resolution levels 0 to 3, i.e., has hierarchies in four image size directions, and is divided into two layers. In this embodiment, the system arrangement and data structure are the same as those in the above embodiments.

FIGS. 31A to 31D are views for explaining the data structure of respective hierarchies of the original image.

Figure 31A:
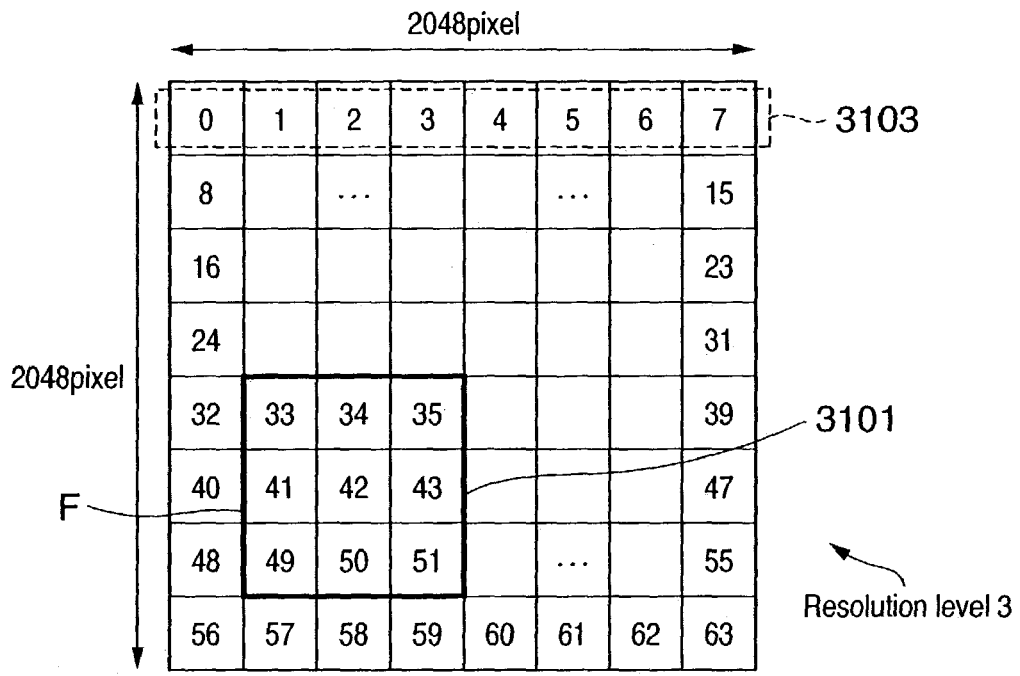
FIGS. 31A to 31D depict views for explaining the data structures of respective hierarchies of an original image according to the sixth embodiment of the present invention.

As shown in FIG. 31A, respective tiles forming the original image are assigned sequential numbers in turn from the upper left tile. Hence, the server 204 saves data 701 in FIG. 7.

The client (user) 201 caches fragmentary JPEG2000 bitstreams sent from the server 204. The user 201 recognizes, in advance, the memory size of a cache memory that can be used to cache data, and erases bitstreams before the cache data of fragmentary JPEG2000 bitstreams sent from the server 204 overflow the size of the cache memory.

Figure 32:
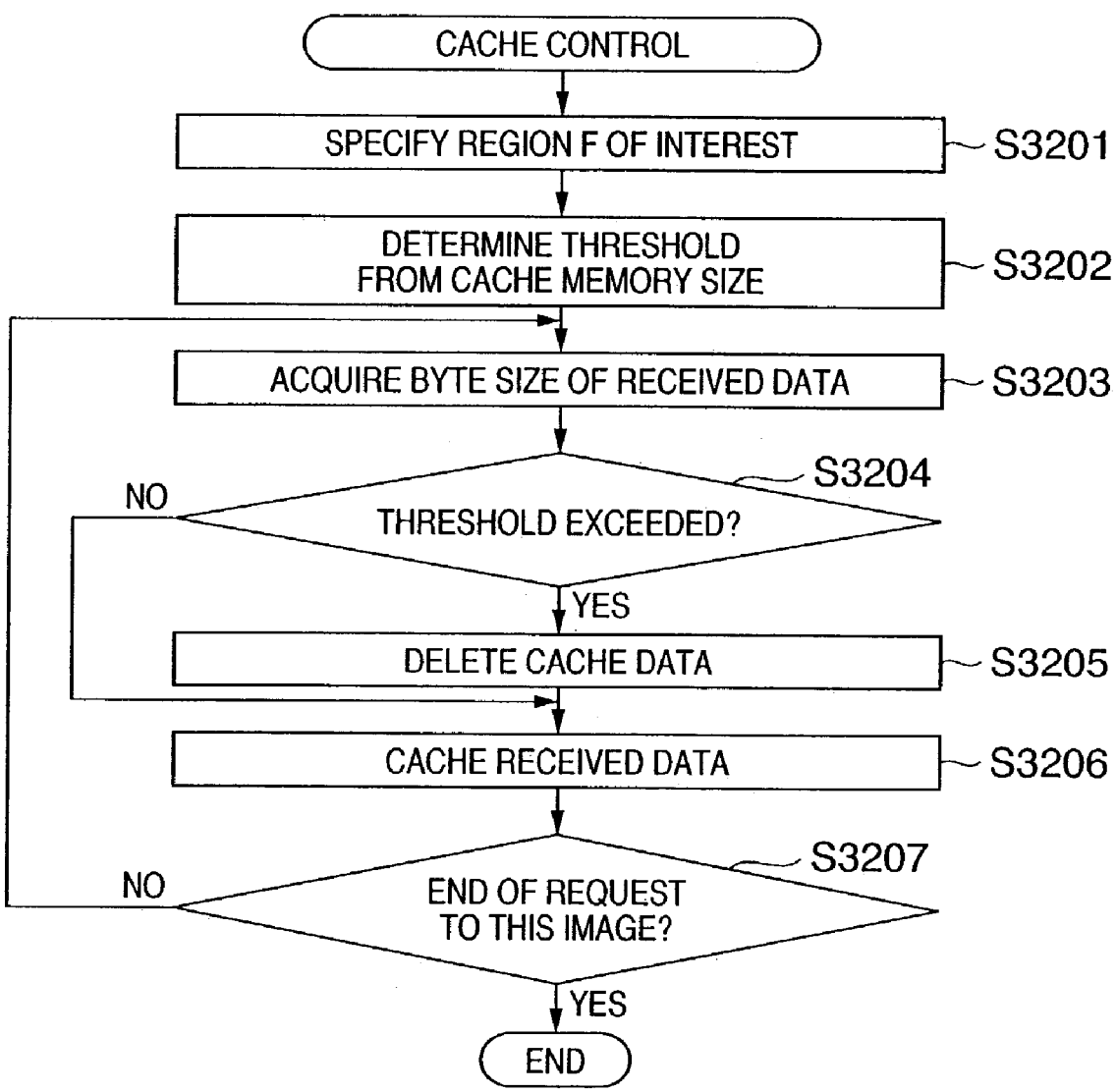
FIG. 32 is a flow chart for explaining cache control of encoded data according to the sixth embodiment of the present invention.

FIG. 32 is a flow chart showing the cache control process of the user (client) according to the sixth embodiment.

In step S3201, a partial region of an image to which image data currently sent from the server 204 corresponds is recognized, and that image region to be displayed is specified as a region F of interest. For example, if currently received data are used to display a region 3101 of a bold frame of resolution level 3, nine tiles, i.e., tiles 33 to 35, 41 to 43, and 49 to 51 are specified as the region F of interest.

The flow advances to step S3202 to acquire the memory size of the user 201 so as to determine a threshold value used to determine whether cache data is to be deleted. If 100% of an available memory size is used to cache received JPEG2000 packet data, the threshold value becomes equal to the memory size. However, if data (e.g., meta information of an image or the like) other than the fragmentarily received JPEG2000 bitstreams is to be saved in the single memory, the available memory size is partially used to cache JPEG2000 encoded data. Or when the single system caches a plurality of JPEG2000 encoded data, the threshold value of the memory size that can be used for a given image is set to be smaller than the available memory size. For example, 2 Mbytes of a 3-Mbyte memory size assigned to the cache memory are set as the threshold value of the cache of this image. Upon determining this threshold value, a secondary storage medium 103 such as a hard disk or the like may be used. However, in the sixth embodiment, the threshold value is determined with reference to the memory size for the sake of simplicity. The flow advances to step S3203 to acquire the byte size of fragmentary JPEG2000 encoded data to be received.

The flow advances to step S3204 to determine whether the threshold value determined in step S3202 is exceeded upon caching the received data with the byte size acquired in step S3203. That is, if the value obtained in step S3203 is larger than a value obtained by subtracting the currently cached data size from the threshold value, it is determined that the threshold value is exceeded; otherwise, it is determined that the threshold value is not exceeded. If it is determined that the threshold value is exceeded, the flow advances to step S3205; otherwise, the flow jumps to step S3206. For example, when the threshold value determined in step S3202 is 2 Mbytes, the already cached JPEG2000 packet data size is 1.95 Mbytes, if the byte size of the received data acquired in step S3203 is 120 kbytes, it is determined that the threshold value is exceeded if the received data is directly cached, and the flow advances to step S3205.

In step S3205, data are deleted from cache data for respective tiles so that the cache size becomes equal to or smaller than the threshold value even when the byte size acquired in step S3203 is cached. For example, if the byte size acquired in step S3203 is 120 kbytes, and the threshold value determined in step S3202 is 2 Mbytes, cache data are deleted in step S3205 until the cached data size becomes equal to or smaller than 1.88 Mbytes (=2 (Mbytes)−120 (kbytes)). The flow advances to step S3206 to cache the received data. It is checked in step S3207 if the request for this image is complete. If the request is not complete yet, the flow returns to step S3203; otherwise, this cache control process ends.

Figure 33:
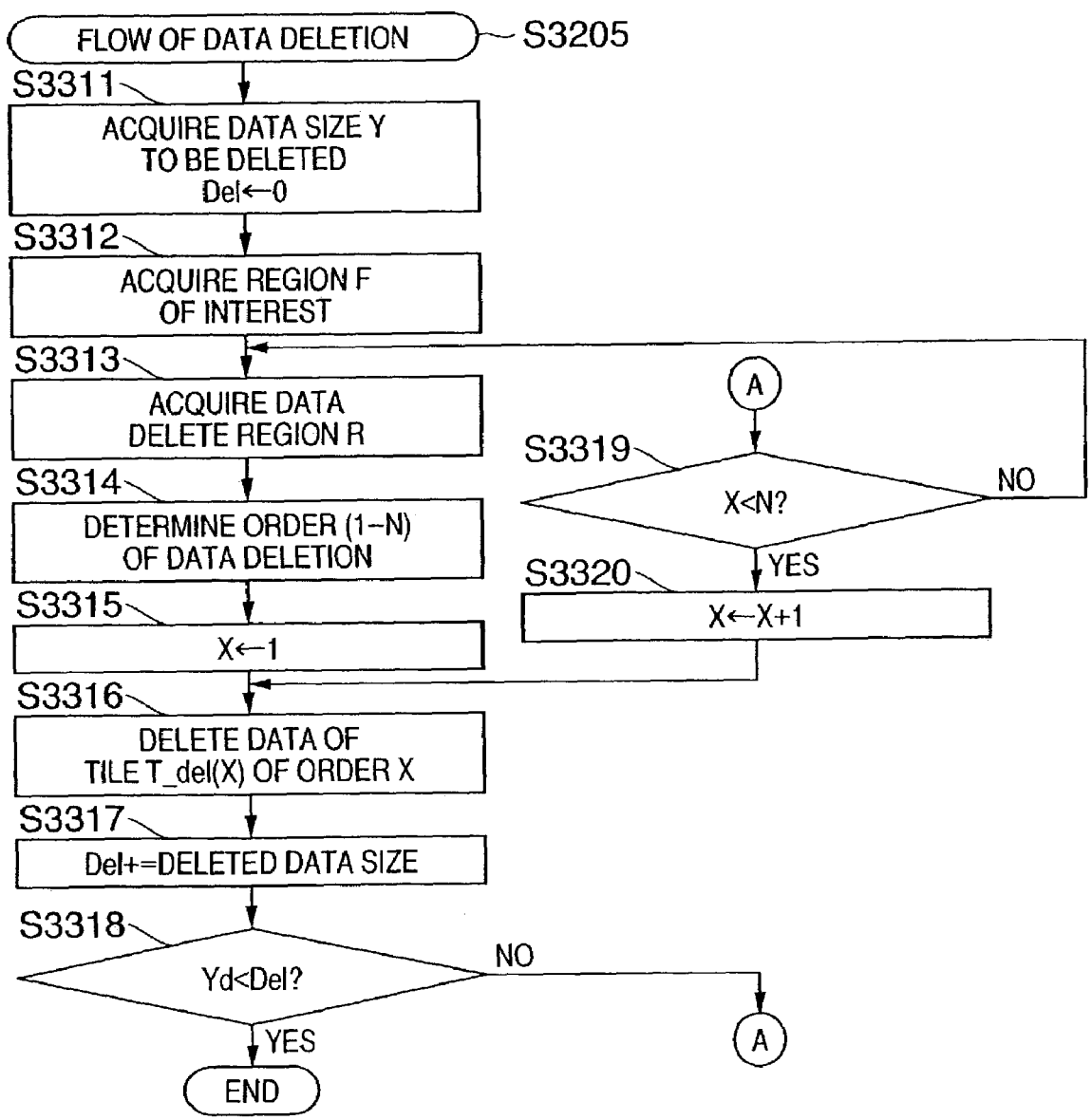
FIG. 33 is a flow chart showing a cache data delete process in step S3205 in FIG. 32.

The cache data delete process in step S3205 in FIG. 32 will be described below with reference to the flow chart in FIG. 33. FIG. 33 is a flow chart showing the process in step S3205.

In step S3311, a data size Y to be deleted is acquired, and "0" is substituted as an initial value in variable Del used to calculate the data size deleted by this cache data delete process. In the sixth embodiment, assume that the user has already displayed the entire image at maximum SNR of resolution level 1, and a region 3102 in FIG. 31B, i.e., a region of 36 tiles bounded by tiles 16 to 21 and 56 to 61 is displayed at maximum SNR. At this time, the cache memory stores data 703 of an image main header field, packet data 704 and 705 forming resolution levels 0 and 1 of all tiles, and packet data 706 and 708 forming resolution level 2 of 36 tiles of the region 3102 (see FIG. 7). That is, as for the 36 tiles of the region 3102, the cache memory of the user 201 saves header data 701 of respective tiles, packet groups 704, 705, and 706 forming resolution levels 0, 1, and 2 of respective tiles, as indicated by 34002 in FIG. 34B. As for other tiles, packet data except for the packet group 706 forming resolution level 2 from cache data 34002 in FIG. 34B are cached, as indicated by 34001 in FIG. 34A. If a total size of these data is 1.95 Mbytes, the threshold value is 2 Mbytes, and the received data size is 120 kbytes, the data size Y to be deleted is calculated by Y=1.95+0.12−2.0=0.07 (M bytes)=70 (kbytes). That is, cache data of 70 kbytes or more must be deleted.

The flow then advances to step S3312 to acquire the region F of interest specified in step S3201 in FIG. 32. For example, when the user who displayed the region 3102 in FIG. 31B at resolution level 2 issues a an enlargement display request having tile 42 as the center, and wants to display a region 3101 at resolution level 3, nine tiles, i.e., tiles 33 to 35, 41 to 43, and 49 to 51 are acquired as the region F of interest.

The flow advances to step S3313 to acquire a region far from the region F of interest acquired in step S3312 as a data delete region R. For example, a region 3103 which is formed of tiles 0 to 7 in FIG. 31A and bounded by the broken line is acquired as the data delete region R.

The flow advances to step S3314 to determine the order of tiles from which data are to be deleted with respect to those included in the data delete region R acquired in step S3313. For example, in case of tiles in the region 3103 in FIG. 31A, numbers are assigned in turn from a rightmost tile as the order of data deletion. That is, tile T_del(1) with the first data delete order is tile 7, and tile T_del(8) with the eighth data delete order is tile 0.

The flow advances to step S3315 to substitute "1" as an initial value in variable X used to count the data delete order. The flow then advances to step S3316 to delete all cache data except for the tile header field 701 and packet data of resolution level 0 and layer 1 from the cache data of tile T_del(X) with delete order X. For example, if X=1 and T_del(1) is tile 7, since cache data of tile 7 are those indicated by 34001 in FIG. 34A, the packet group 705 forming resolution level 1 and a packet group 34003 forming resolution level 0 and layer 2 are deleted.

The flow advances to step S3317 to add the data size deleted in step S3316 to variable Del used to accumulate the data size deleted in this delete process. The flow advances to step S3318 to compare the data size Del deleted in this delete process with the data size Y to be deleted in this delete process, i.e., to determine whether the actually deleted data size Del has been equal to or exceeded the data size Y to be deleted. If the actually deleted data size Del has been equal to or exceeded the data size Y, this process ends.

On the other hand, if not so, the flow advances to step S3319 to determine whether the delete number X of the last tile from which data have been deleted is smaller than the number N tiles included in the data delete region R. If the delete number X is smaller. than the number N of tiles, the flow advances to step S3320; otherwise, it is determined that cache data of all tiles included in the delete region R have been deleted, and the flow returns to step S3313 to acquire a new delete region R. In step S3320, the delete number X is incremented by 1 to acquire the next delete number.

For example, if the data size Y to be deleted is 70 kbytes, and the data size deleted from tile T_del(1) with delete number "1" is 50 kbytes, since the value of the data size Del deleted in step S3317 is 50 kbytes, Y (=70 kbytes)>Del (=50 kbytes) in step S3318, and the flow advances to step S3319. Since X=1<N (=8) in step S3319, the flow advances to step S3320, and the delete number X is incremented by +1 to obtain "2". The flow then returns to step S3316 to delete data of tile 6 as T_del(2).

The process for acquiring the data delete region R in step S3313 in FIG. 33 will be described below with reference to the flow chart in FIG. 35.

Figure 35:
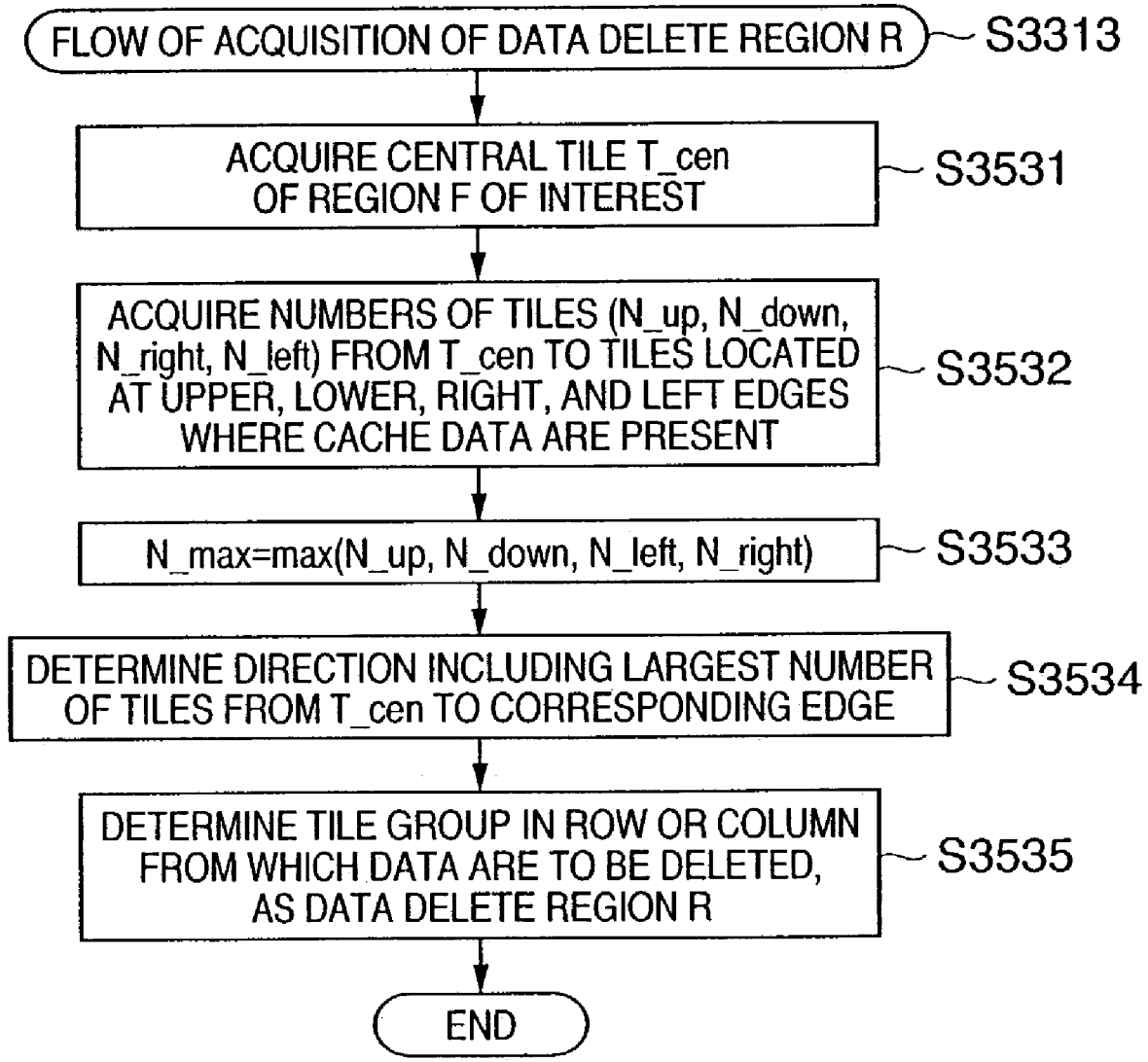
FIG. 35 is a flow chart showing an acquisition process of a delete region R of cache data in step S3313 in FIG. 33.

FIG. 35 is a flow chart showing the process for acquiring the delete region R in step S3313 in FIG. 33 according to the sixth embodiment of the present invention.

In step S3531, tile T_cen which includes the central point of the region F of interest specified in step S3201 in FIG. 32 is specified. In the region F of interest indicated by the region 3101 in FIG. 31A, tile 42 corresponds to this tile T_cen. If an upper left tile of an image is defined as a tile of the 0th row and 0th column, and tile T_cen at the center is represented by (Cy)-th row and (Cx)-th column, the position of tile 42 is represented by Cx=2 and Cy=5. The flow advances to step S3532 to calculate the numbers of tiles from central tile T_cen specified in step S3531 to tiles located at the upper, lower, right, and left edges of a region where cache data are present. That is, when a row or column located at the edge of an image has already been selected as the delete region R in this cache control process, and no cache data that can be deleted are available, the numbers of tiles are calculated by excluding such row or column.

This process will be explained using FIG. 36.

Figure 36:
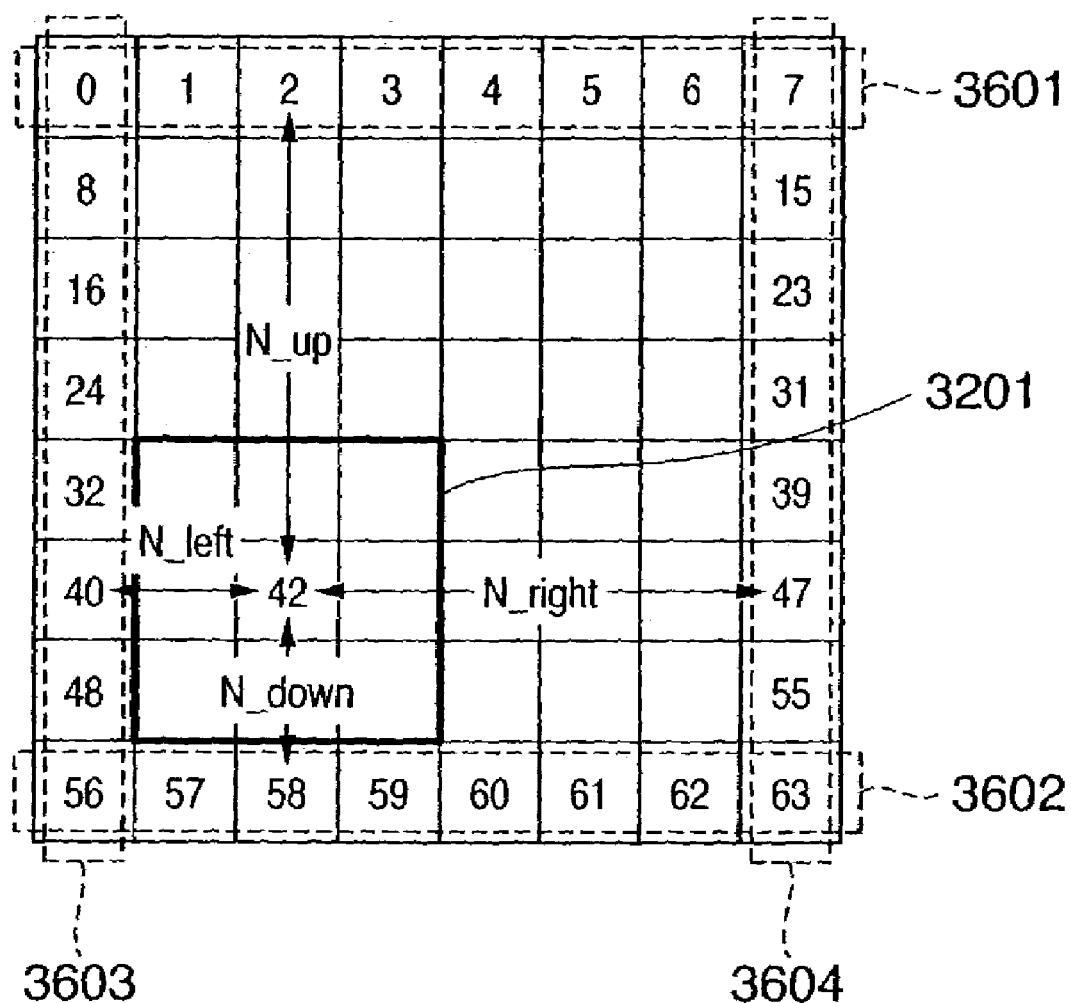
FIG. 36 depicts a view for explaining an acquisition algorithm of the data delete region R according to the sixth embodiment.

In FIG. 36, let N_up, N_down, N_right, and N_left, be the numbers of tiles from tile 42 to the upper, lower, right, and left edges. Then, if the delete region R has not been selected yet, they are calculated by:

$N\_up = Cy$ $N\_down = \text{maximum row number of image} - Cy$ $N\_left = Cx$ $N\_right = \text{maximum column number of image} - Cx$ If the 0th to (X)-th rows of the image have already been selected as the data delete region R, and have no data to be deleted, N_up is adjusted by subtracting X from it. Likewise, if the lowermost row of the image has already undergone deletion, N_down is adjusted by subtracting 1 from it. Also, when several columns at the right and left edges of the image have already undergone deletion, N_right and N_left are respectively adjusted by subtracting the numbers of columns that have undergone data deletion from them. Therefore, if the delete region R has not been designated yet, N_up=5, N_down=2, N_right=5, and N_left=2 for the region 3101 of interest.

The flow advances to step S3533 to acquire a variable with the largest value from the four values N_up, N_down, N_right, and N_left obtained in step S3533 as N_max. Note that both N_up and N_down have "5", i.e., a maximum value, with respect to the region 3101 of interest.

The flow advances to step S3534 to determine a direction in which the number of tiles from central tile T_cen to the image edge from the variables (N_up, N_right) having the maximum value, which are obtained in step S3533. If N_up is selected as the variable with the maximum value, this direction corresponds to the up direction of the image, i.e., a direction in which the row number gets smaller. On the other hand, if N_right is selected, this direction corresponds to the right direction of the image, i.e., a direction in which the column number gets larger. On the other hand, for example, if N_down is selected, this direction corresponds to the down direction of the image, i.e., a direction in which the row number gets larger; if N_left is selected, this direction corresponds to the left direction of the image, i.e., a direction in which the column number gets smaller. However, if there are two variables corresponding to N_max, as described above, the following three conditions are used.

1. N_up and N_down have priority over N right and N_left.
2. N_up has priority over N_down.
3. N_left has priority over N_right.

That is, a vertical value has priority over a horizontal value, and a direction in which the number gets smaller is given priority in both the column and row. Hence, in the aforementioned region 3101 of interest, N_up and N_right correspond to N_max, but N_up in the vertical direction is preferentially selected.

The flow advances to step S3535 to determine a row or column from which cache data are to be deleted as the data delete region R on the basis of the direction selected in step S3534. If N_up is selected in step S3534, as described above, a row indicated by a region 3601 in FIG. 36 is determined as the delete region R. If N_down is selected, a row indicated by a region 3602 is determined as the delete region R. Furthermore, if N_left is selected, a region 3603 is determined as the delete region R; if N_right is selected, a region 3604 is determined as the delete region R.

Therefore, since N_up is selected in step S3534, the uppermost row corresponding to the region 3601 is determined as the delete region R with respect to the region 3101 of interest in step S3535.

In this way, the flow advances to step S3314 in FIG. 33 to assign numbers to basically delete data in turn from a tile separated from the region F of interest as much as possible as the order in which data are to be deleted in the data delete region R.

Figure 37:
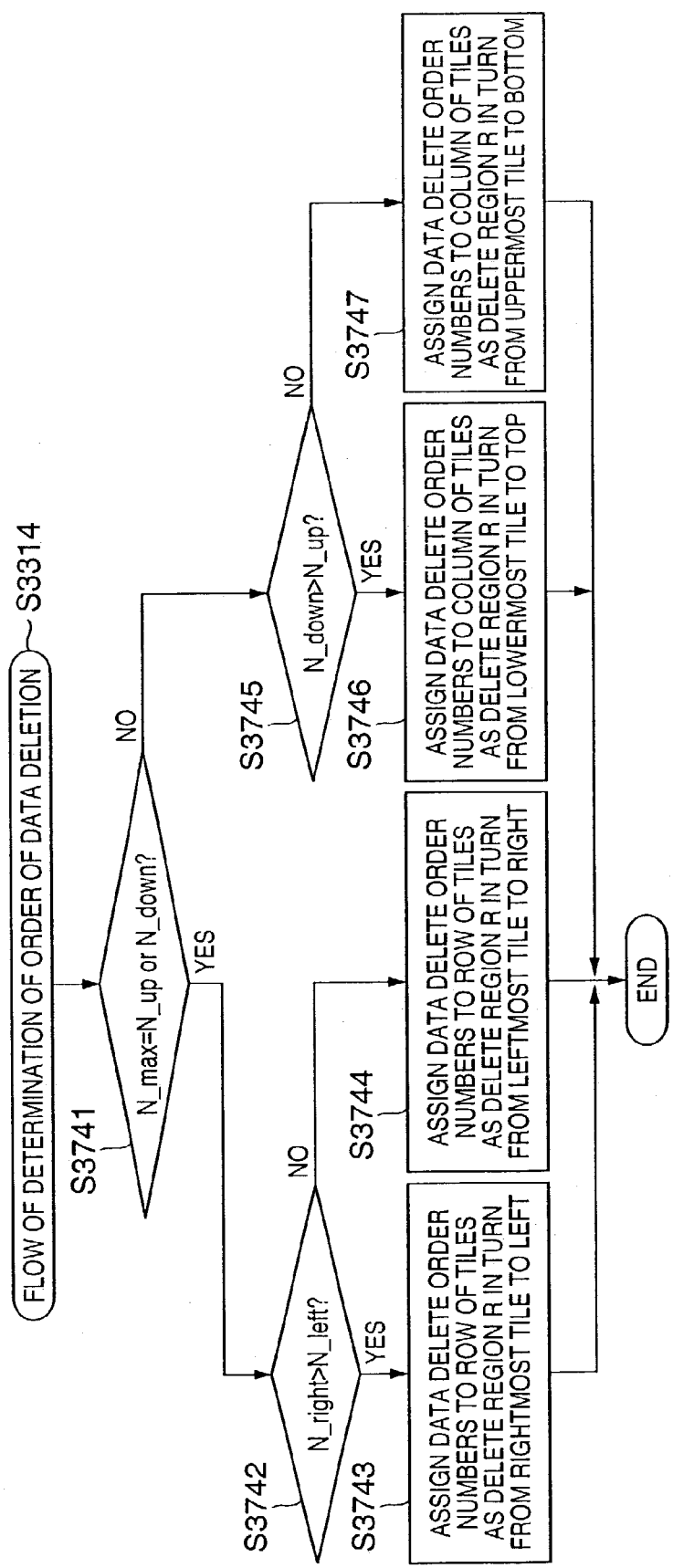
FIG. 37 is a flow chart for explaining a method of determining an order in which cache data are deleted (step S3314.

FIG. 37 is a flow chart for explaining the method of determining the order in which cache data are to be deleted (step S3414: FIG. 33).

It is checked in step S3741 which of N_up, N_down, N_right, and N_left is selected as the value corresponding to N_max in step S3533 in FIG. 35. If either N_up or N_down is selected as N_max, the flow advances to step S3742; if either N_right or N_left is selected, the flow advances to step S3745. That is, if a tile group in the row direction is selected as the delete region R, the flow advances to step S3742; if a tile group in the column direction is selected, the flow advances to step S3745. In the sixth embodiment, since N_up is selected as N max, the flow advances to step S3742.

In step S3742, N_right and N_left are compared to determine a larger value. If the value N_right is larger, the flow advances to step S3743; if the value N_left is larger, the flow advances to step S3744. That is, if the number of tiles on the right side is larger, the flow advances to step S3743; if the number of tiles on the left side is larger, the flow advances to step S3744. If the flow advances to step S3743, since a row of tiles which line up in the horizontal direction is selected, and the region F of interest is offset to the left side, data delete numbers are assigned in turn from a tile at the right edge of the delete region R to the left. On the other hand, if the flow advances to step S3744, since a row of tiles which line up in the horizontal direction is selected, and the region F of interest is offset to the right side, data delete numbers are assigned in turn from a tile at the left edge of the delete region R to the right.

In the sixth embodiment, since N_left=2 and N_right=5, the flow advances from step S3742 to step S3743, and data delete order numbers are assigned in turn from tile 7 to the left in the region 3601 in FIG. 36 as the delete region R. That is, delete data number "1" is assigned to tile 7, and delete data number "2" is assigned to tile 6. Likewise, numbers are assigned to subsequent tiles, and delete data number "8" is assigned to tile 0.

If the flow advances from step S3741 to step S3745, N_down and N_up values are compared to determine a larger value. If N_down is larger, the flow advances to step S3746; if N_up is larger, the flow advances to step S3747. That is, if the number of rows of tiles located below the region F of interest is larger, the flow advances to step S3746; if the number of rows of tiles located above the region F of interest is larger, the flow advances to step S3747. If the flow advances to step S3746, since a column of tiles that line up vertically is selected as the delete region R, and the region F of interest is offset to the top side, data delete numbers are assigned upward in turn from the lowermost tile of the delete region R. On the other hand, if the flow advances to step S3747, since a column of tiles that line up vertically is selected as the delete region R, and the region F of interest is offset to the bottom side, data delete numbers are assigned downward in turn from the uppermost tile of the delete region R.

Therefore, in case of the sixth embodiment, the delete region R corresponds to a row including tiles 0 to 7, and delete numbers are assigned in turn from the rightmost tile to the left like that delete number "1" is assigned to tile 7, delete number "2" is assigned to tile 6, . . . , delete number "8" is assigned to tile 0.

Figure 40A:
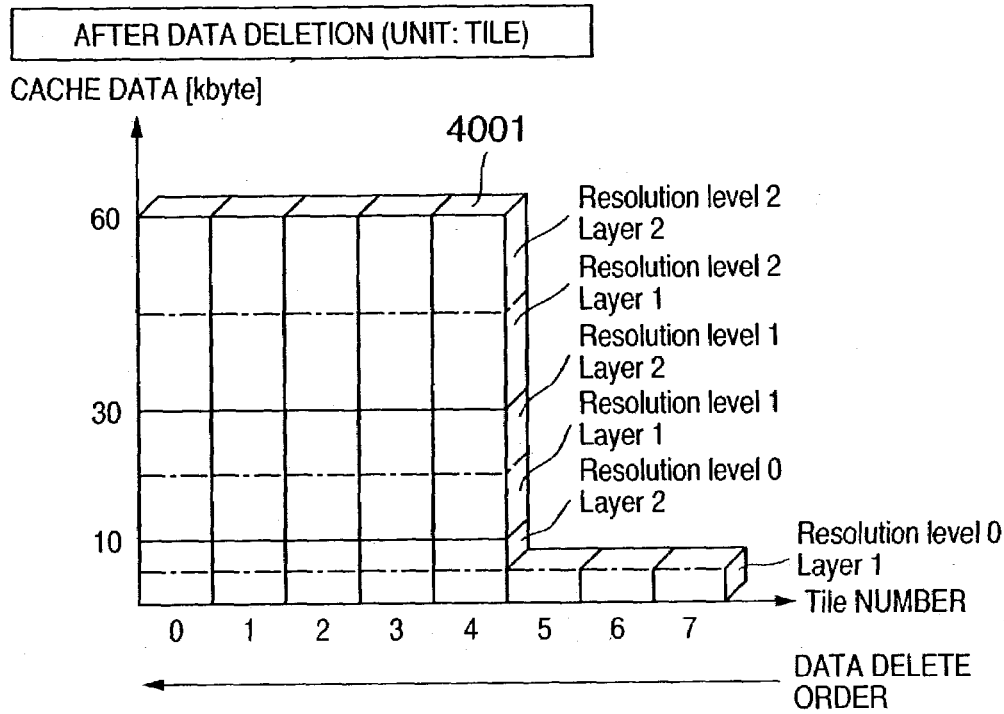
FIGS. 40A and 40B show an example of cache data in a delete region R after data deletion according to the seventh embodiment.

FIGS. 38A and 38B show the cached state of tile data of this delete region R. As indicated by 3802 in FIG. 38A, if respective tile data have been cached up to resolution level 2 and layer 2, data 3802 of a total of 165 kbytes of cache data of tiles 7, 6, and 5 shown in FIG. 38A must be deleted so as to delete data of 120 kbytes. Therefore, cache data after deletion have a state 4001 in FIG. 40A.

With such data deletion method, data of tiles in a partial region, which corresponds to the region of interest that is important for current display, is held, and cache data is deleted in turn from tiles being assumed to have relatively low importance to current display and are far from the region of interest.

Since packet data other than data of resolution level 0 and layer 1, which have the smallest data size, is deleted for each tile, a large free space can be formed in the cache memory, and the load imposed by the calculations of the deleted data size can be reduced.

Since data of resolution level 0 and layer 1 of each tile are held without being deleted, all tiles have at least those data. Hence, if the user requests an image of higher resolution, an image decoded from the held data can be temporarily displayed in an enlarged scale, and an image of a given tile portion can be prevented from being not displayed for a while after the image display request of that portion. Also, an image that allows the user to recognize the whole image can be quickly displayed.

The present invention is not limited to the aforementioned delete order of cache data, but other orders may be used.

Also, in this embodiment, the delete region is specified by tiles for the sake of simplicity. Also, precincts and code-clocks can be used to delete cache data on the basis of the same concept as in the present invention. In case of precincts, a data delete unit corresponds to packets as in tiles. In case of code-blocks, a data delete unit corresponds to encoded data consisting of sub-bands forming data of that code-block.

Seventh Embodiment

[Data Deletion Specified Tile in Packet Unit]

In the above embodiment, a row or column formed of tiles far from the region of interest is designated as the delete region R, a delete order is assigned to the tiles in that region, and all packet data except for data of resolution level 0 and layer 1 are deleted from the tiles in the delete region R one by one according to the delete order.

However, a method of reducing the data size by dropping the total SNR or resolution of all tiles included in the regions in place of all packet data except for data of resolution level 0 and layer 1, which are contained in cache data of a tile specified as a tile to be deleted may be used. In this case, processes different from those in the sixth embodiment described above are step S3316 and subsequent steps in the data delete process shown in FIG. 33.

Figure 39:
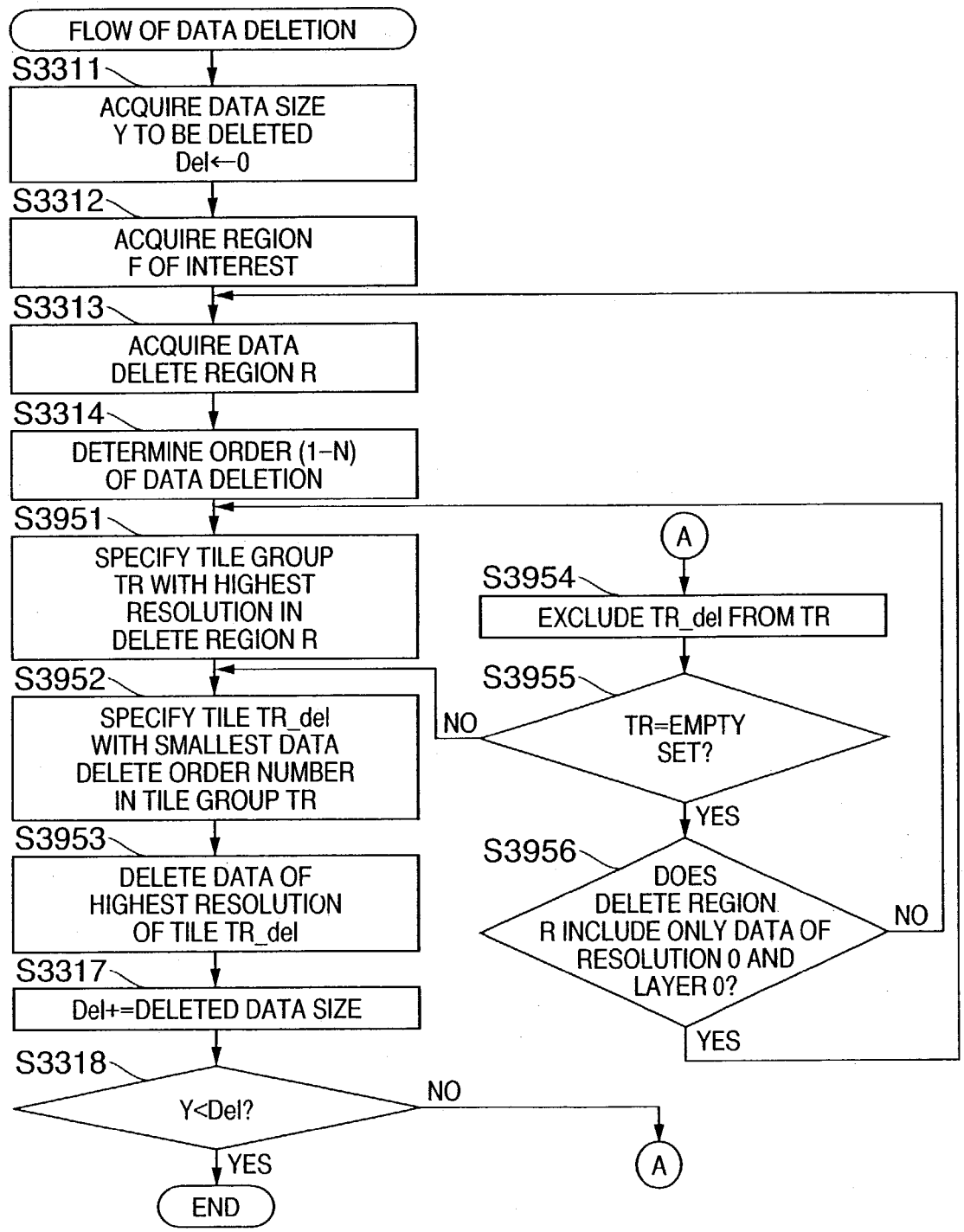
FIG. 39 is a flow chart for explaining a delete process according to the seventh embodiment.

FIG. 39 is a flow chart for explaining the data deletion process according to the seventh embodiment of the present invention. The same step numbers in FIG. 39 denote the steps which execute the same operations as in FIG. 33, and a description thereof will be omitted.

In the seventh embodiment, assume that the user has already cached the entire image as maximum SNR data of resolution level 2. Hence, the cache memory of the user 201 saves data 703 of an image main header field (FIG. 7), header data 707 of respective tiles, a packet group 704 which forms resolution level 0 of respective tiles, a packet group 705 (FIG. 34A) which forms resolution level 1 of respective tiles, and a packet group 706 which forms resolution level 2, as indicated by 34002 in FIG. 34B. Also, the user who displayed a region 3102 in FIG. 31B at resolution level 2 issues an enlargement display request having tile 42 as the center, and wants to display a region 3101 at resolution level 3, thus acquiring nine tiles, i.e., tiles 33 to 35, 41 to 43, and 49 to 51 as the region F of interest. Steps S3311 to S3314 are the same as those in FIG. 33 of the sixth embodiment.

That is, in step S3311 a data size Y to be deleted from the cache is acquired, and "0" is substituted in variable Del used to accumulate the data size deleted by this current data delete process. In step S3312, the region F of interest specified in step S3201 (FIG. 32) is acquired. In step S3313, a region including a tile group far from the region F of interest acquired in step S3312 is acquired as a data delete region R. In the seventh embodiment, a region 3103 in FIG. 31A is acquired as the delete region R. In step S3314, the order of tiles from which data are to be deleted is determined with respect to those included in the data delete region R acquired in step S3313. In the seventh embodiment, delete numbers are assigned like that delete number "1" is assigned to tile 7, delete number "2" is assigned to tile 6, . . . , delete number "8" is assigned to tile 0.

In step S3951, a tile group TR with the highest cached resolution level in the data delete region R is specified. In the seventh embodiment, since data of all tiles included in the delete region R indicated by the region 3103 have been equally cached up to resolution level 2, the tile group TR matches the delete region R. The flow advances to step S3952 to specify tile TR_del with the smallest delete number of the tile group TR specified in step S3951.

In the seventh embodiment, since the delete region R is equal to the tile group TR, tile 7 with the smallest data delete number is specified as TR_del. The flow advances to step S3953 to delete data with the highest resolution of tile TR_del. Since data with the highest resolution cached in tile 7 as TR_del correspond to the packet group 706 (FIG. 7) of resolution level 2, these data 706 are deleted from the cache. Hence, cache data of tile 7 changes from the state 34002 in FIG. 34B to a state 34001 in FIG. 34A.

The flow advances to step S3317 to add the data size deleted in step S3953 to variable Del used to accumulate the data size deleted in this delete process. The flow advances to step S3318 to compare the deleted data size Del with the data size Y to be deleted, i.e., to check if the actually deleted data size Del has been equal to or exceeded the data size Y to be deleted. If the actually deleted data size Del has been equal to or exceeded the data size Y, this process ends.

On the other hand, if not so, the flow advances to step S3954, and tile TR_del from which cache data with the highest resolution have been deleted in step S3953 is excluded from the tile group TR specified in step S3951. That is, tile 7 is excluded from the tile group TR, and seven tiles, i.e., tiles 0 to 6 are left in this tile group TR. The flow advances to step S3955 to determine whether the tile group TR becomes an empty set. If tiles still remain included in the tile group TR, the flow returns to step S3952 to specify the next TR_del, thus repeating the aforementioned process.

On the other hand, if the tile group TR becomes an empty set, the flow advances to step S3956 to determine whether all tiles included in the delete region R consist of only cache data of resolution level 0 and layer 1. If all tiles consist of only cache data of resolution level 0 and layer 1, it is determined that no cache data can be deleted from the delete region R, and the flow returns to step S3313 to acquire the next data delete region R. On the other hand, if cache data other than data of resolution level 0 and layer 1 still remain in the delete region R in step S3956, it is determined that cache data that can be deleted still remain, and the flow returns to step S3951 to repeat the above process.

Figure 40B:
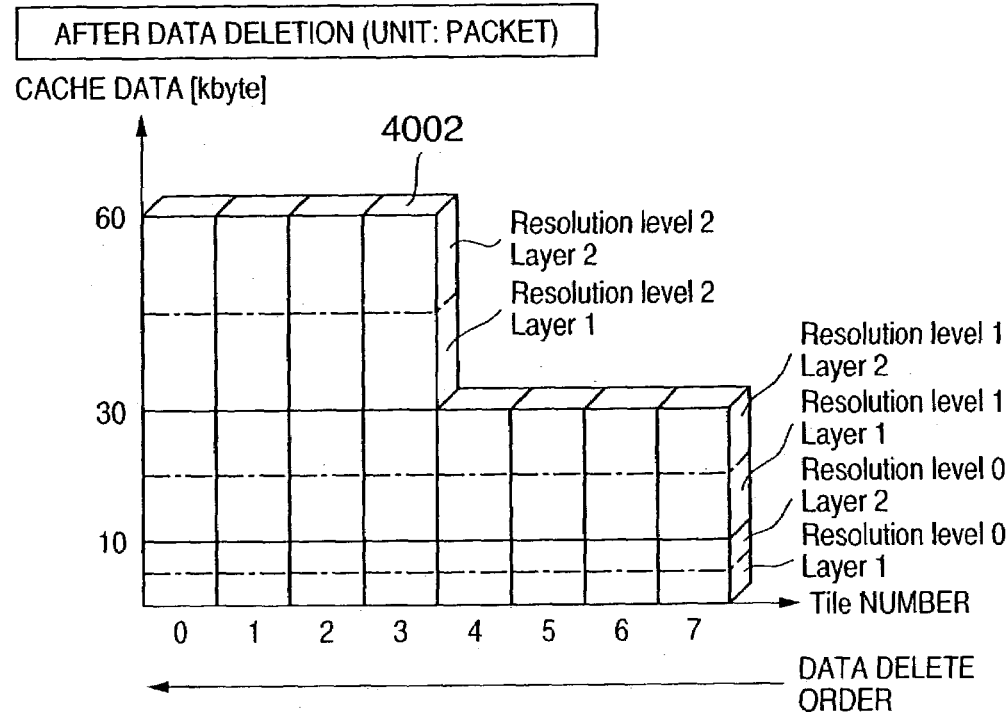

According to the seventh embodiment described above, the delete region R corresponds to a row including tiles 0 to 7, and the delete numbers are assigned in turn to the left like that delete number "1" is assigned to tile 7, delete number "2" is assigned to tile 6, . . . , delete number "8" is assigned to tile 0. As indicated by 3802 in FIG. 38A, if each tile has cached data up to resolution level 2 and layer 2, data of resolution level 2 of cache data of tiles 7, 6, 5, and 4 must be deleted so as to delete data of 120 kbytes. That is, data of 120 kbytes (=30 (kbytes)×4 (tiles)) is deleted, and cache data have a state 4002 in FIG. 40B.

Therefore, according to the seventh embodiment, data are deleted in the resolution direction little by little from all tiles included in the delete region R. Hence, even when a region included in the delete region R is browsed, many tile data included in that region are more likely to remain, and the size of packet data to be requested in correspondence with a newly requested image can be reduced.

The seventh embodiment has exemplified a method of deleting data in the delete region R in the resolution direction. Also, substantially the same processes can be implemented by a method of deleting data in the SNR direction. In this case, the tile group TR specified in step S3951 is a set of tiles which have the highest SNR, i.e., cache many layers.

In step S3953, data of the highest SNR of tile TR_del are deleted. For example, when cache data 34002 in FIG. 34B is stored, since data of the highest SNR of each tile is deleted, packet data 34006, 34005, and 34004 (FIG. 34B) which form layer 2 are erased.

Alternatively, substantially the same processes can be implemented when the data size to be deleted upon deleting data in the resolution level direction is compared with the data size to be deleted upon deleting data in the SNR direction, and the delete method that can assure a larger data size to be deleted is selected. For example, when 18 packets indicated by 34002 in FIG. 34B are saved, if data are to be deleted in the resolution level direction, sixth packets 706 in FIG. 7 are deleted. If data is to be deleted in the layer direction, nine packets 34004, 34005, and 34006 are deleted. Upon comparing the total data size of the sixth packets 706 in FIG. 7 with that of nine packets 34004, 34005, and 34006, packets with a larger data size are deleted.

Also, in the seventh embodiment, the delete region is specified by tiles for the sake of simplicity. Also, precincts and code-clocks can be used to delete cache data on the basis of the same concept as in the present invention. In case of precincts, a data delete unit corresponds to packets as in tiles. In case of code-blocks, a data delete unit corresponds to encoded data consisting of sub-bands forming data of that code-block.

Eighth Embodiment

[Deletion from Data of Tile with Oldest Last Display Time]

In the above embodiments, tiles to be deleted are selected based on the distance from the region F of interest. However, the last display time may be saved for each tile, and a tile with the oldest last access time may be selected as a delete data region. In order to delete data based on the display time, a time management table managing display times of respective tiles is required.

Figure 41:
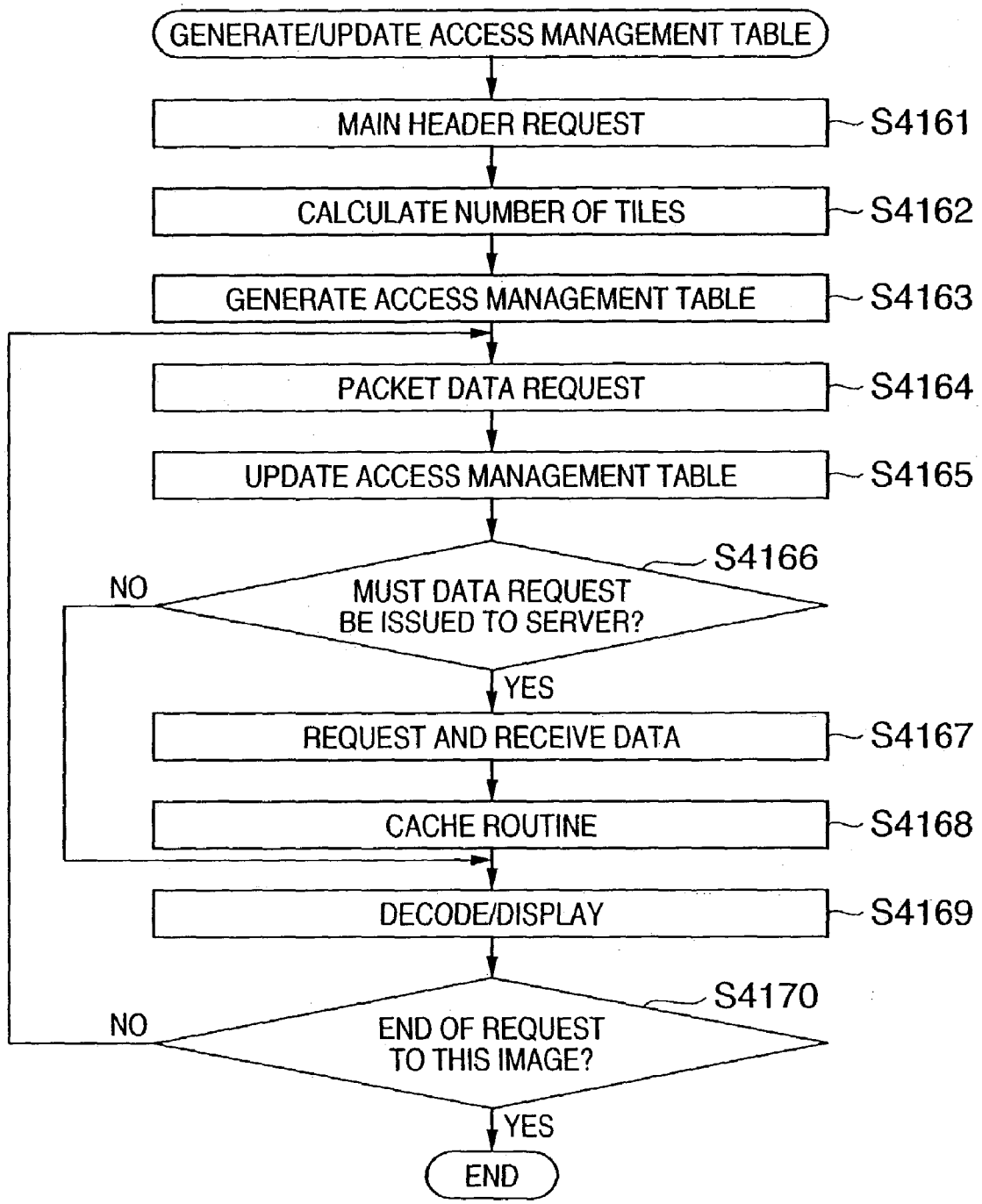
FIG. 41 is a flow chart for explaining a management table generation process according to the eighth embodiment of the present invention.

FIG. 41 is a flow chart for explaining a management table generation process according to the eighth embodiment of the present invention.

In step S4161, a main header 703 (FIG. 7) of a JPEG2000 image to be browsed is requested to the server 204, and the main header sent from the server 204 in response to that request is received. The flow advances to step S4162, and the received main header is analyzed to calculate the number of tiles forming the JPEG2000 image to be browsed. The number of tiles can be calculated based on parameters Xsiz (1801) and Ysiz (1802) which are described in an SIZ marker of the main header 703 and indicate the image size of the highest resolution, and parameters XTsiz (1803) and YTsiz (1804) which indicate the tile size at the highest resolution (FIG. 42B).

In the eighth embodiment, as shown in FIG. 31A, since an original image of 2048×2048 pixels is segmented into 256×256 tiles, i.e., 8 tiles (=2048÷256) line up in the horizontal direction, and 8 tiles (=2048÷256) also line up in the vertical direction. That is, a total of 64 tiles (=8×8) are obtained as the calculation result.

The flow advances to step S4163 to generate an access management table of respective tiles on the basis of the number of tiles calculated in step S4162. For example, an access management table 1901 in FIG. 43A is generated. In an initial state, since none of these tiles are used to display an image, "Last Access Time" fields of all tiles store an initial value (e.g., NULL).

The flow advances to step S4164 to request packet data in accordance with a user's display request. For example, data up to resolution level 1 and layer 2 is requested for all tiles. The flow advances to step S4165 to update the access management table in association with tiles requested in step S4164. For example, when data of resolution level 1 and layer 1 is requested for all tiles, the "Last Access Time" fields of all the tiles in the table are updated to time "10:22:34" corresponding to that access request time, as indicated by a table 1902 in FIG. 43B.

The flow advances to step S4166 to determine whether a request must be issued to the server 204 in association with packet data requested in step S4164. If the already cached packet data can meet the request in step S4164, and no data request is issued to the server 204, the flow jumps to step S4169.

If cached data cannot meet the request in step S4164, the flow advances to step S4167. For example, in an initial image display process, since packet data of any tiles is not received and the data request must be issued to the server 204, the flow advances to step S4167. In step S4167, packet data is requested to the server 204, and those sent in response to that request are received. The flow advances to step S4168, and the data received in step S4167 is cached. The flow advances to step S4169 to decode and display a JPEG2000 bitstream formed by the cached data. The flow advances to step S4170 to check if the request to this image is completed. If the request is not completed, the flow returns to step S4164; otherwise, this processing flow ends.

Figure 44:
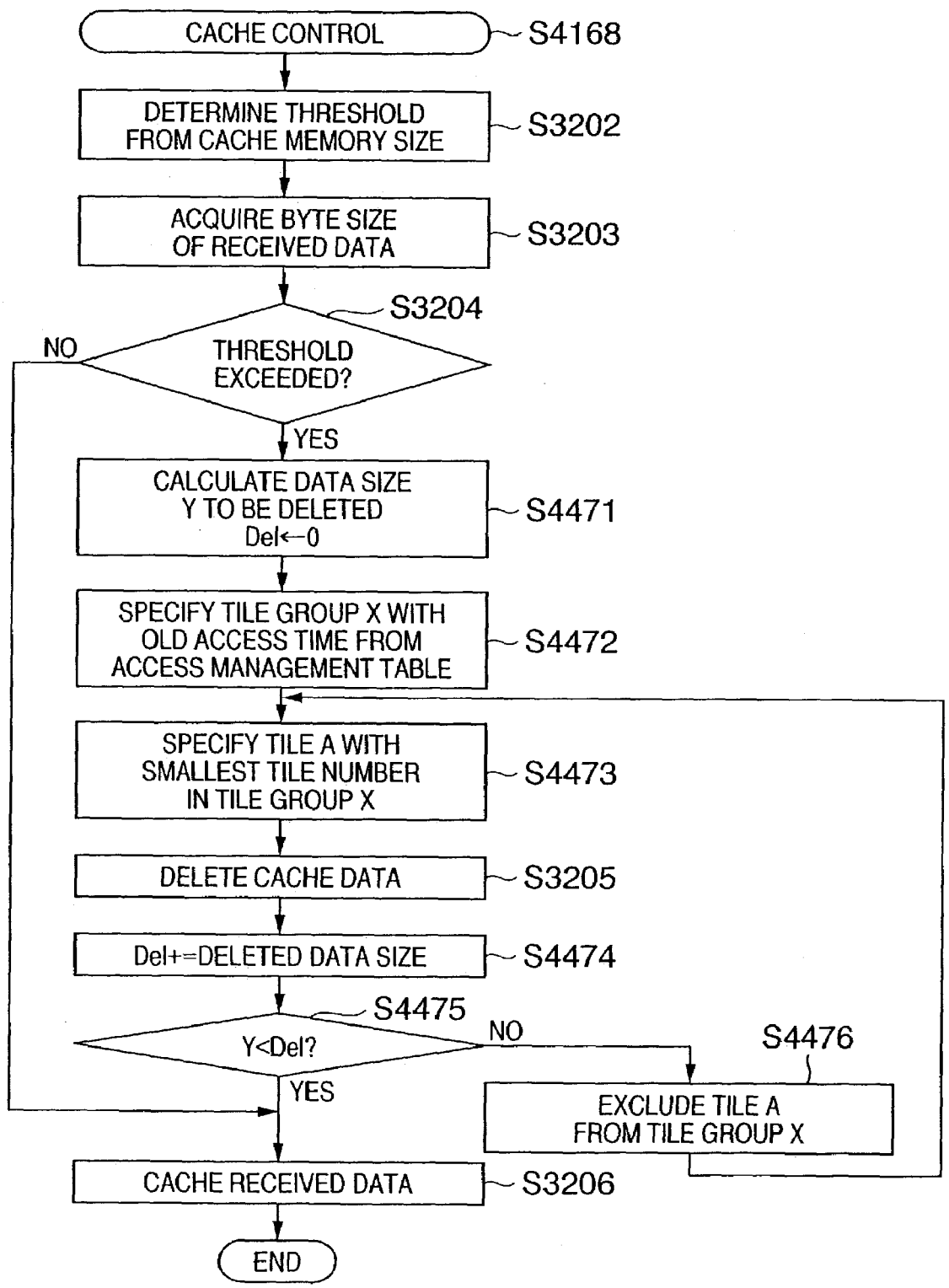
FIG. 44 is a flow chart showing a cache control process in step S4168 in FIG. 41 according to the eighth embodiment.

FIG. 44 is a flow chart showing the cache control process in step S4168 in FIG. 41. This flow chart is substantially the same as that in FIG. 32 of the above embodiment, except that a tile to be deleted is specified based on the value of the access management table. Hence, the same step numbers in FIG. 44 denote the steps that execute the same operations as in FIG. 32.

In step S3202, the memory size of the user 201 is acquired to determine a threshold value used to see if cache data is to be deleted. In step S3203, the byte size of fragmentary JPEG2000 encoded data to be received is acquired. The flow advances to step S3204 to check if the threshold value determined in step S3202 is exceeded upon caching the received data with the byte size acquired in step S3203. That is, if the value obtained in step S3203 is larger than a value obtained by subtracting the currently cached data size from the threshold value, it is determined that the threshold value is exceeded; otherwise, it is determined that the threshold value is not exceeded. If it is determined that the threshold value is exceeded, the flow advances to step S4471; otherwise, the flow jumps to step S3206.

In step S4471, a data size Y to be deleted from the cache is acquired, and "0" is substituted in variable Del used to accumulate the actually deleted data size. The flow then advances to step S4472. In step S4472, the last access times of respective tiles are compared with reference to the access management table shown in FIG. 43C, thus specifying a tile group X of tiles with the last access time farthest from the current time, i.e., the oldest access time. For example, when the user requests to display the entire image at resolution level 1 and then to display a region 3102 in FIG. 31B in an enlarged scale at resolution level 2, the last access time fields of 36 tiles, i.e., tiles 16 to 21, 24 to 29, 32 to 37, 40 to 45, 48 to 53, and 56 to 61 in the access management table are updated, as indicated by 1903 in FIG. 43C. For this reason, the remaining 28 tiles are specified as the tile group X with old access time.

Figure 31B:
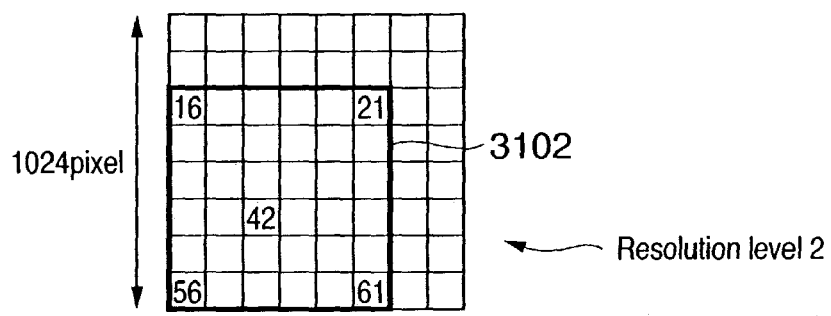
Figure 31C:
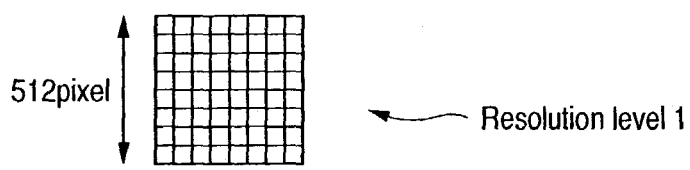
Figure 31D:

The flow advances to step S4473 to specify tile A with the smallest tile number from the tile group X specified in step S4472, and determine that tile as a tile candidate from which cache data are to be deleted. For example, if a region except for the region 3102 in FIG. 31B is specified as the tile group X, tile 0 with the smallest tile number is specified as tile A.

The flow advances to step S3205 to delete all cache data except for packets which form resolution level 0 and layer 1 of cache data of tile A, so that the cache size becomes equal to or smaller than the threshold value upon caching the byte size acquired in step S3203, as in the seventh embodiment. The flow advances to step S4474 to add the data size deleted in step S3205 to variable Del that accumulates the actually deleted data size. The flow advances to step S4475 to compare the data size Y to be deleted with the deleted data size Del. If the deleted data size Del is larger than the data size Y to be deleted, the flow advances to step S3206 to cache the next received data.

On the other hand, if it is determined in step S4475 that the deleted data size Del is smaller, the flow advances to step S4476. In step S4476, tile A from which cache data have been deleted in step S3205 is excluded from the tile group X, and the flow returns to step S4473 to specify new tile A.

In the eighth embodiment, the table shown in FIGS. 43A to 43C is used as the access management table, but the present invention is not limited to such specific table.

Also, in the eighth embodiment, the delete region is specified by tiles for the sake of simplicity. Also, precincts and code-clocks can be used to delete cache data on the basis of the same concept as in the present invention. In case of precincts, a data delete unit corresponds to packets as in tiles. In case of code-blocks, a data delete unit corresponds to encoded data consisting of sub-bands forming data of that code-block.

Furthermore, in the eighth embodiment, the last access times are saved, and tiles from which cache data are to be deleted are specified based on the saved times. Such process can be combined with each of the aforementioned embodiments. That is, upon selecting tile A from which cache data are to be deleted in step S4472 from the tile group X specified in step S4471, a tile farthest from the region F of interest may be specified as tile A, as in the above embodiments.

As for a cache data delete unit, only data with the highest resolution or SNR may be deleted from cache data of tile A specified in step S4472, as in the above embodiments.

As for the cache method in this embodiment, a method of caching data is not particularly limited as long as cached packet data can be individually deleted.

OTHER EMBODIMENTS

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The embodiments of the present invention have explained a case wherein a client receives and caches encoded image data from a server, and plays back the cached image in a network system. However, the present invention is not limited to such specific case. For example, the present invention can also be applied to a case wherein encoded image data stored in a storage medium is input, cached, and played back, or a case wherein encoded data is received from an image sensing device, computer apparatus, or the like, which is functionally connected via a LAN or another interface, and is played back.

As described above, according to the embodiments of the present invention, cached fragmentary encoded data can be efficiently deleted, and upon browsing an original image stored in a server, a client does not require the same memory size as the original image.

Since a region of an image where important data is located is determined in accordance with the type of image or the region of interest ROI, a region where data can be deleted for respective tiles can be specified without any complicated calculations.

Since a region falling outside a direction that connects a region which is previously displayed by the user, and a region which is designated by the user as a new display region by scrolling an image is designated as the delete region R, and cache data are deleted from that region, data losses can be minimized if the user is interested in that direction.

Even when the previously displayed region is to be displayed again, it can be quickly displayed since its data is preserved.

Since data of resolution level 0 and layer 1 remain undeleted upon deleting data of image data, when the client requests an image with a higher resolution and higher SNR than the cached data, and deficient data must be downloaded from the server, an image with a low resolution and low SNR can be temporarily displayed using the cached data.

After the cached data has been deleted, even when the user issues a display request that requires the deleted data, since data of at least resolution level 0 and layer 1 are held without being deleted, the data held in the cache can be temporarily decoded and displayed, while the deleted data are requested again.

Also, data received in response to such re-request can be written in the cache again.

The present invention is not limited to the above embodiments and various changes and modifications can be made within the spirit and scope of the present invention. Therefore, to apprise the public of the scope of the present invention, the following claims are made.

What is claimed is:

1. An image processing method of storing input JPEG 2000 encoded data into a memory, comprising:

an input step of inputting fragmented JPEG 2000 encoded data representing a partial region of an image, wherein the image comprises a plurality of partial regions;

a setting step of setting an upper limit value of a data size to be stored in the memory;

a checking step of checking whether or not a total data size of the fragmented JPEG 2000 encoded data input in said input step is greater than the upper limit value set in said setting step;

a storing step of storing the fragmented JPEG 2000 encoded data input in said input step into the memory, in a case in which it is determined in said checking step that the total data size of the fragmented JPEG 2000 encoded data is less than the upper limit value;

a determination step of determining a priority order of each partial region to be deleted, in accordance with a type of the image;

a delete step of deleting, in a case in which it is determined in said checking step that the total data size of the fragmented JPEG 2000 encoded data input in said input step is greater than the upper limit value, the fragmented JPEG 2000 encoded data of a partial region stored in the memory based on the priority order; and a control step of controlling, after the fragmented JPEG 2000 encoded data of the partial region is deleted in said delete step, to store the fragmented JPEG 2000 encoded data input in said input step in the memory.

2. The method according to claim 1, wherein the memory is a cache memory.

3. The method according to claim 1, wherein said input step includes a step of receiving and inputting the fragmented JPEG 2000 encoded data which is sent from a server.

4. The method according to claim 1, wherein said delete step comprises a step of calculating a data size to be deleted on the basis of the total data size of the JPEG 2000 encoded data which is already stored in the memory, the upper limit value, and the data size of the fragmented JPEG 2000 encoded data input in said input step.

5. The method according to claim 1, wherein said determination step determines that a peripheral region of an image has a higher priority order, in a case where the image is a brochure image.

6. The method according to claim 1, wherein the priority order is determined in a unit of a tile of the JPEG 2000 encoded data.

7. The method according to claim 1, wherein said delete step includes a step of deleting the encoded data for respective JPEG 2000 packets.

8. The method according to claim 1, wherein said delete step includes a step of deleting data for respective tiles, and JPEG 2000 packets to be deleted are packet data except for packets of resolution level 0 and layer 1.

* * * * *

UNITED STATES PATENT AND TRADEMARK OFFICE
CERTIFICATE OF CORRECTION

| | | |
|---|---|---|
| PATENT NO. | : 7,200,272 B2 | |
| APPLICATION NO. | : 10/353026 | |
| DATED | : April 3, 2007 | |
| INVENTOR(S) | : Tomoe Ishikawa | |

It is certified that error appears in the above-identified patent and that said Letters Patent is hereby corrected as shown below:

SHEET 18

FIG. 18A, "DETA" should read --DATA--.

COLUMN 1

Line 48, "JPEG200" should read --JPEG2000--; and
    Line 63, "term" should read --terms--.

COLUMN 2

Line 8, "comprising;" should read --comprising:--.

COLUMN 6

Line 18, "base" should read --based--.

COLUMN 7

Line 9, "are" should read --is--.

COLUMN 8

Line 63, "be" should be deleted.

COLUMN 10

Line 49, "include" should read --includes--.

COLUMN 11

Line 5, "included" should read --included in--.

COLUMN 13

Line 1, "the" should be deleted; and
    Line 33, "need" should read --needs to--.

COLUMN 15

Line 31, "form" should read --forms--.

UNITED STATES PATENT AND TRADEMARK OFFICE
CERTIFICATE OF CORRECTION

PATENT NO. : 7,200,272 B2
APPLICATION NO. : 10/353026
DATED : April 3, 2007
INVENTOR(S) : Tomoe Ishikawa It is certified that error appears in the above-identified patent and that said Letters Patent is hereby corrected as shown below:

COLUMN 16

Line 22, "the-moving" should read --the moving--; and
Line 35, "to" should read --to the--.

COLUMN 17

Line 39, "than" should read --than the--.

COLUMN 21

Line 3, "limited" should read --limited to--; and
Line 10, "code-clocks" should read --code-blocks--.

COLUMN 23

Line 1, "packet" should read --packets--;
Line 20, "need" should read --needs to--.

COLUMN 25

Line 66, "smaller." should read --smaller--.

COLUMN 27

Line 17, "N right" should read --N_right--.

COLUMN 28

Line 37, "like" should read --so--.

COLUMN 29

Line 5, "clocks" should read --blocks--; and
Line 61, "like" should read --so--.

COLUMN 30

Line 46, "like" should read --so--.

UNITED STATES PATENT AND TRADEMARK OFFICE
CERTIFICATE OF CORRECTION

PATENT NO. : 7,200,272 B2
APPLICATION NO. : 10/353026
DATED : April 3, 2007
INVENTOR(S) : Tomoe Ishikawa It is certified that error appears in the above-identified patent and that said Letters Patent is hereby corrected as shown below:

<u>COLUMN 31</u>

Line 13, "sixth" should read --six--;
    Line 16, "sixth" should read --six--; and
    Line 21, "code-clocks" should read --code-blocks--.

<u>COLUMN 33</u>

Line 29, "code-clocks" should read --code-blocks--.

Signed and Sealed this

Fifteenth Day of July, 2008

JON W. DUDAS
*Director of the United States Patent and Trademark Office*